(12) United States Patent
Kamiji et al.

(10) Patent No.: US 9,422,981 B2
(45) Date of Patent: Aug. 23, 2016

(54) ROLLER BEARING CAGE AND MANUFACTURING METHOD THEREFOR AS WELL AS ROLLER BEARING MANUFACTURING METHOD

(71) Applicant: NAKANISHI METAL WORKS CO., LTD., Osaka-shi (JP)

(72) Inventors: Michiyuki Kamiji, Osaka (JP); Masaki Okano, Osaka (JP); Hiroyuki Maeda, Osaka (JP); Yoshio Kawatake, Osaka (JP); Kenji Teshima, Osaka (JP); Yasuki Yabubayashi, Osaka (JP); Tomomi Hosokawa, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 14/383,217

(22) PCT Filed: Mar. 7, 2013

(86) PCT No.: PCT/JP2013/056256
§ 371 (c)(1),
(2) Date: Sep. 5, 2014

(87) PCT Pub. No.: WO2013/133363
PCT Pub. Date: Sep. 12, 2013

(65) Prior Publication Data
US 2015/0023625 A1    Jan. 22, 2015

(30) Foreign Application Priority Data

Mar. 7, 2012 (JP) ................................. 2012-050129
Mar. 7, 2012 (JP) ................................. 2012-050131
May 10, 2012 (JP) ................................. 2012-108116
Jun. 14, 2012 (JP) ................................. 2012-134355
Jul. 31, 2012 (JP) ................................. 2012-169579
Oct. 19, 2012 (JP) ................................. 2012-231299

(51) Int. Cl.
*F16C 33/46* (2006.01)
*F16C 19/26* (2006.01)
(Continued)

(52) U.S. Cl.
CPC ............ *F16C 33/4605* (2013.01); *B21D 53/12* (2013.01); *B21J 15/00* (2013.01);
(Continued)

(58) Field of Classification Search
CPC .... F16C 19/364; F16C 23/086; F16C 33/547; F16C 43/04; F16C 19/26; F16C 33/4605; F16C 33/542; F16C 2220/82; B21D 53/12; B21D 15/00; B21K 25/00; B21J 15/12; B23P 15/003
USPC ......... 28/898.067; 29/898.067; 384/548, 571, 384/565, 568, 572, 574, 580, 618–619, 623, 384/575

See application file for complete search history.

(56) References Cited

U.S. PATENT DOCUMENTS 1,444,326 A  *  2/1923  Buckwalter ............. F16C 19/34
                                                            29/898.067
1,781,241 A  *  11/1930  Ness ....................... B22C 11/00
                                                                  249/109

(Continued)

FOREIGN PATENT DOCUMENTS

GB       190406607 A  *  0/1904
JP       S57-104015       6/1982
(Continued)

OTHER PUBLICATIONS

International Search Report for International Application No. PCT/JP2013/056256 dated May 14, 2013.

*Primary Examiner* — Marcus Charles
(74) *Attorney, Agent, or Firm* — Kratz, Quintos & Hanson, LLP

(57) ABSTRACT

A roller bearing cage (1A) is configured such that a pair of ring parts (4, 6) axially separated from each other is connected by column parts (5) sliding on outer peripheral surfaces of rollers (RA), and pocket holes (P) are evenly formed to store and hold the rollers (RA) in a peripheral wall portion in a circumferential direction. The cage (1A) is manufactured such that a base body (2) including the ring part (4) and the column parts (5) with square columnar convexes (5A) and a connection body (3) including the ring part (6) with square holes (6A) are set as separate members.

14 Claims, 52 Drawing Sheets

(51) Int. Cl.
*F16C 33/54* (2006.01)
*F16C 43/04* (2006.01)
*B21D 53/12* (2006.01)
*B21K 25/00* (2006.01)
*B21J 15/00* (2006.01)
*B21J 15/12* (2006.01)
*B23P 15/00* (2006.01)
*F16C 19/36* (2006.01)
*F16C 23/08* (2006.01)

(52) U.S. Cl.
CPC ............... *B21J 15/12* (2013.01); *B21K 25/00* (2013.01); *B23P 15/003* (2013.01); *F16C 19/26* (2013.01); *F16C 33/542* (2013.01); *F16C 33/547* (2013.01); *F16C 43/04* (2013.01); *F16C 19/364* (2013.01); *F16C 23/086* (2013.01); *F16C 2220/82* (2013.01)

(56) References Cited

U.S. PATENT DOCUMENTS

| | | | | |
|---|---|---|---|---|
| 3,365,255 A * | 1/1968 | Altson | ............... | F16C 33/4664 384/578 |
| 3,387,901 A * | 6/1968 | Williams | ............ | F16C 33/4652 384/576 |
| 3,537,766 A * | 11/1970 | Scheifele | ............ | F16C 33/4664 384/578 |
| 3,944,307 A * | 3/1976 | Bingle | ................... | B29C 65/08 384/576 |
| 4,054,340 A * | 10/1977 | Broshkevitch | ...... | F16C 33/4652 384/576 |
| 4,056,293 A * | 11/1977 | Lobeck | ............... | F16C 33/6651 384/578 |
| 4,684,268 A | 8/1987 | Sahlgren | | |
| 5,538,348 A * | 7/1996 | Honda | ................... | F16C 23/086 384/572 |
| 5,626,426 A * | 5/1997 | Honda | ................... | F16C 23/086 384/568 |
| 8,783,966 B2 * | 7/2014 | Schlegel | ............ | F16C 33/4605 384/576 |
| 2011/0116734 A1 * | 5/2011 | Umemoto | ............ | F16C 23/086 384/558 |

FOREIGN PATENT DOCUMENTS

| | | |
|---|---|---|
| JP | S61-127767 | 8/1986 |
| JP | H62-141313 | 6/1987 |
| JP | H02-92733 | 7/1990 |
| JP | H04-50722 | 4/1992 |
| JP | H07-151154 | 6/1995 |
| JP | H08-326761 | 12/1996 |
| JP | H09-217749 | 8/1997 |
| JP | 2000-2247 | 1/2000 |
| JP | 2001-289250 A1 | 10/2001 |
| JP | 2005-90740 A1 | 4/2005 |
| JP | 2005-195084 A1 | 7/2005 |
| JP | 2007-40522 A1 | 2/2007 |
| JP | 2008-296241 A1 | 12/2008 |

* cited by examiner (a)

(b)

(a)

(b)

(a)

(b)

ROLLER BEARING CAGE AND MANUFACTURING METHOD THEREFOR AS WELL AS ROLLER BEARING MANUFACTURING METHOD

CROSS-REFERANCE TO RELATED APPLICATIONS

This application is a national stage application under §371 of the international application PTC/JP2013/056256, filed on Mar. 7, 2013.

TECHNICAL FIELD

The present invention relates to a cage for rotatably holding rollers in a roller bearing constituting a rotation support part in various mechanical devices while preventing the rollers from dropping out, more specifically, to a roller bearing cage suited to a very large roller bearing.

BACKGROUND ART

Roller bearings have a larger load capability for radial load than ball bearings. A conical roller bearing into which truncated cone-shaped rollers (conical rollers) are embedded as rolling elements, is capable of supporting a combined load of radial load and axial (thrust) load, and thus is widely used at rotation support parts of drive devices, gear reducers, power transmission devices, and the like in various mechanical systems such as automobiles, rail vehicles, and construction machines, and the like. A spherical roller bearing (automatic self-aligning roller bearing) into which barrel-shaped rollers (spherical rollers) are embedded as rolling elements, has the advantage of being usable for its self-aligning property even if an outer ring and an inner ring are inclined due to an attachment error or shock load, and thus is widely used at rotation support axis parts of various industrial mechanical systems and the like under vibration and shock load.

Cages used for such roller bearings are generally press cages that are formed by pressing a steel plate such as a cold-rolled steel plate or a hot-rolled steel plate. Finished products are fabricated from disc-shaped intermediate materials formed by pressing and punching a metal plate through a large number of press steps (refer to Patent Document 1, FIGS. 5 and 6, for an example of a conical roller bearing cage, and refer to Patent Document 2, FIG. 16, for an example of a spherical roller bearing cage).

In addition, structures of press cages frequently used as cages for spherical roller bearings are broadly classified into: (1) a press cage that is formed from a bowl-shaped main part including pockets for storing spherical rollers and a small diameter-side inward flange extended inward in a radial direction from a small diameter-side end edge of the main part, the main part being positioned on the radially outer side of the pitch circle diameters of the spherical rollers, that is, the rotation center axes of the spherical rollers reside on the inner diameter-side across the column parts (hereinafter, referred to as "bowl-shaped cage." For example, refer to Patent Documents 3 and 4); and (2) a press cage that is formed from a conical main part including pockets for storing spherical rollers, a large diameter-side outward flange extended outward in a radial direction from a large diameter-side end edge of the main part, and a small diameter-side inward flange extended inward in a radial direction from a small diameter-side end edge of the main part, or a conical main part including pockets for storing spherical rollers and a large diameter-side outward flange extended outward in a radial direction from a large diameter-side end edge of the main part, the main part being positioned on the radially inner side of the pitch circle diameters of the spherical rollers, that is, the rotation center axes of the spherical rollers reside on the outer diameter-side across the column parts (hereinafter, referred to as "outward flange-type cage." For example, refer to Patent Documents 2 and 5).

The outward flange-type cage is pressed into an integral form including the large diameter-side outward flange, and thus is high in rigidity and load capacity.

In addition, there is also a conical roller bearing cage that is manufactured by fabricating separately a first member including a small-diameter ring part and a column part and a second member including a large-diameter ring part, and then joining and fixing the first and second members by laser welding (for example, refer to Patent Document 6).

Here, the first member is fabricated through a first punching step at which a circular material is formed from a belt-shaped plate-like material, a second punching step at which an intermediate material is formed by punching out a plurality of fan-shaped parts from the circular material, a surface pressing step at which tapered conical roller abutment surfaces are formed at both edges of an upper surface of a column-formed plate part in the intermediate material, a folding step at which a base end of the column-formed plate part is folded and erected, and a third punching step at which an inner peripheral portion of central plate is cut in a circular shape. The second member is fabricated through an abutment portion processing step at which abutment portions for abutment and joint with leading ends of the column parts of the first member are formed in a band-like elongated member, and a deforming and fixing step at which the elongated member is cut in a predetermined length and deformed in a circular shape, and ends of the cut portions are joined and fixed to each other by joining means such as welding or the like (for example, refer to Patent Document 6, FIGS. 6 and 18 to 20).

Further, there is a conical roller bearing cage that is manufactured by fabricating separately a first member including a large-diameter ring part and a column part and a second member including a small-diameter ring part, and joining and fixing the first and second members by laser welding (for example, refer to Patent Document 6).

Here, the first member is fabricated through a first punching step at which a belt-like plate-shaped material is punched into a disc-shaped central portion and a plurality of fan-shaped portions continued to the central portion to form an intermediate material, a surface pressing step at which an intermediate material is formed by forming tapered conical roller abutment surfaces at both edges of a lower surface of a column-formed plate portion formed in the intermediate material, a folding step at which a base end of the column-formed plate portion is folded and erected, and a second punching step at which an outer peripheral portion of the intermediate material is cut into a circular shape. The second member is fabricated through an abutment portion processing step at which abutment portions for abutment and joint with leading ends of the column parts of the first member are formed in a band-like elongated member, and a deforming and fixing step at which the elongated member is cut in a predetermined length and deformed in a circular shape, and ends of the cut portions are joined and fixed to each other by joining means such as welding or the like (for example, refer to Patent Document 6, FIGS. 1 to 6).

Besides, to join and fix together the first and second members (or their equivalents), there are methods using rivets to swage the axis ends, which are not used for press cages though (for example, refer to Patent Documents 7 and 8).

CITATION LIST

Patent Literatures

Patent Document 1: JP-A No. H08-326761
Patent Document 2: JP-A No. 2005-90740
Patent Document 3: JP-UM-A No. H04-50722
Patent Document 4: JP-A No. H07-151154
Patent Document 5: JP-A No. 2000-2247
Patent Document 6: JP-A No. 2007-40522
Patent Document 7: JP-A No. 2001-289250
Patent Document 8: JP-UM-A No. S57-104015
Patent Document 9: JP-A No. 2005-195084
Patent Document 10: JP-A No. H09-217749

SUMMARY OF INVENTION

Technical Problem

With upsizing of mechanical devices, roller bearings used in the mechanical devices have been also increased in size. As for cages for roller bearings, there is demand for supersized cages that are about 1 to 3 m in diameter and have a thickness of steel plate as a material of about 8 to 16 mm (hereinafter, referred to as "supersized cages").

In addition, a large-sized roller bearing used in a large-sized mechanical device is in the state in which a rotation shaft is horizontal in many cases. In such a usage mode, the cage is erected and thus a ring part in the cage (for example, a large-diameter ring part in a conical roller bearing cage) tends to sag under its own weight, and the cage needs to be enhanced in rigidity.

In addition, since the supersized cages and the bearings using the same are heavy in weight and are frequently used at high altitudes or in remote locations, there is a great need for unnecessity of maintenance check and replacement work over a long period of time.

Further, since production volume of supersized cages is limited, it is necessary to suppress expense of metal molds for cages and reduce manufacturing costs as much as possible.

The manufacturing method of roller bearing cage as described in Patent Document 1 does not target at supersized cages. Thus, in the case of manufacturing supersized cages by the manufacturing method as described in Patent Document 1, there are problems in terms of manufacture and manufacturing facilities. Specifically, the weight of an intermediate part having undergone a drawing process becomes large, and thus a large-scaled chucker (handling device and positioning device for intermediate part) is needed to punch pocket holes one by one in sequence at an annular peripheral wall portion of the intermediate part by a pocket punching device. In addition, large pressurizing force is used for the pocket punching process, which requires a press machine with an oversized press capacity.

Further, the cage is manufactured by performing a drawing process, a pocket punching process, an edge cutting process, and a surface pressing process on a circular material plate punched out from a steel plate, and thus an upper edge-side ring part having undergone the edge cutting process is an almost annular in shape extending in an almost axial direction and thus is lower in rigidity in a radial direction. Accordingly, in the foregoing usage mode in which the rotation shaft is horizontal, it is difficult to achieve enhancement of rigidity required for supersized cages.

In addition, the spherical bearings may cause a phenomenon called skew that the rolling spherical rollers become unstable in behavior and both ends of the spherical rollers are swung and inclined to the normal rotational axis. Thus, a spherical roller bearing using a bowl-shaped cage is generally structured such that, for prevention of skew in the spherical rollers, a guide ring (also called guidance ring, guiding ring, and floating ring) is guided and arranged in the inner ring between the double-row rollers (for example, refer to Patent Documents 3 and 4). In such a structure, there is a problem that a slippage occurs between the guide ring and the inner ring or the rollers and the temperature of the bearing increases due to frictional heat. In addition, the guide ring as a separate member is fabricated by milling or the like, which results in an increase of manufacturing costs.

Patent Document 4 includes the description on a configuration of a bowl-shaped cage for eliminating a guide ring. In the case of supersized cages, however, it is difficult to readily assure desired strength and rigidity of the supersized cage in the foregoing configuration, and thus the cage cannot be provided with sufficient load capacity.

Further, in the case of manufacturing an outward flange-type cage by press processing, for example, as shown in FIG. 16 of Patent Document 2, there is needed a large number of press steps: a metal plate is pressed and punched to form a disc-shaped first intermediate material; the first intermediate material is drawn to form a bottomed, truncated cone-shaped second intermediate material; the bottom part of the second intermediate material is pressed and punched to form a third intermediate material; the conical part in the third intermediate material is sequentially pressed and perforated with through holes, and a tongue piece element is formed at a widthwise middle portion of one end edge of each of the through holes to form a fourth intermediate material; the tip half portion of the conical part in the fourth intermediate material is pressed and folded by a predetermined amount outward in the radial direction to form a fifth intermediate material; the leading end portion in the fifth intermediate material is pressed and folded by a predetermined amount outward in the radial direction to form a sixth intermediate material with a large diameter-side flange part element; the large diameter-side flange part element in the sixth intermediate material is trimmed and adjusted in outer diameter to make a large diameter-side flange part (large diameter-side outward flange) and the entire remaining bottom part in the sixth intermediate material is pressed and punched to form a seventh intermediate material; one side surface, as a butt surface, of the large diameter-side flange part of the seventh intermediate material is surface-pressed and adjusted into a desired shape to form an eighth intermediate material; the peripheral edges of the pockets in the eighth intermediate material are surface-pressed and adjusted to a desired shape and size to form a ninth intermediate material; and the leading ends of the tongue piece elements in the ninth intermediate material are folded by a predetermined amount in a direction protruding from the other side surface of the large diameter-side flange part to make tongue pieces, thereby completing the cage. This causes a problem of increase in metal mold costs and manufacturing costs.

Further, the outward flange-type cage is high in load capacity and thus is designed with a lowered total height. Thus, it is necessary to, at formation of the large diameter-side outward flange by press work, make the flange thinner than the steel plate. The flange needs to be formed by a press machine with a high pressing force.

Moreover, there are problems in manufacturing and facilities especially to manufacture supersized spherical roller cages, extra-large press molds are required in a large number of press steps and in particular, a press machine with an extra-large press capacity is required to form large diameter-side outward flanges.

Therefore, conventional outward flange-type cages are only middle-or small-sized with an outer diameter of about 300 mm or less. Under present circumstances, spherical roller bearing cages with an outer diameter of about 300 mm or more are bowl-shaped cages or machined cages. Thus, for supersized spherical roller cages in particular, there is room for improvement in both terms of cost and performance such as load capacity and the like.

In the case of manufacturing an supersized cage by the manufacturing method described in Patent Document 6 by which to separately fabricate the first member including the small-diameter ring part and the column parts and the second member including the large-diameter ring part, and then join and fix the first member and the second member by laser welding, the second punching step is performed such that, while a first punch including a pair of fan-shaped part punching parts is rotated at a predetermined angle around a central part as an axis, the first punch is driven into a circular material to form a plurality of fan-shaped parts (a plurality of column parts). At the foregoing step, after one fan-shaped part is punched by the first punch, the first punch is then rotated to punch the next adjacent fan-shaped part (column part). Thus, at the time of punching, the column part is prone to escape toward the adjacent part, and the shape accuracy of the fan-shaped parts (column parts) and the accuracy of forming the fan-shaped parts (column parts) at equal intervals (evenly in the circumferential direction) (pitch accuracy) tend to be deteriorated.

In addition, the second member (large-diameter ring part) is fabricated from a belt-like elongated member through the abutment portion processing step and the deforming and fixing step, and thus at manufacture of supersized cages, it is difficult to perform the deforming and fixing step at which the elongated member is cut and deformed in a circular shape and the cut ends thereof are joined and fixed to each other while maintaining desired rigidity.

Further, the second member (large-diameter ring part) is formed in an annular ring shape by deforming the elongated member in a circular shape. When the annular ring-shaped second member (large-diameter ring part) is attached to leading ends of the column parts of the first member which are erected at a predetermined taper angle with respect to the axial center through the folding step, the column parts and the second member are not orthogonal to each other. Accordingly, the edge portion of the second member (large-diameter ring part) contacts and slides on the large diameter-side end surfaces of the conical rollers stored in the pocket holes, and thus abrasion tends to advance at the portion.

Further, in the case of manufacturing an supersized cage by the manufacturing method described in Patent Document 6 by which to separately fabricate the first member including the large-diameter ring part and the column parts and the second member including the small-diameter ring part, and then join and fix the first member and the second member by laser welding, the first punching step is performed such that, while a punch including a pair of fan-shaped part punching parts is rotated at a predetermined angle around a central part as an axis, the first punch is driven into a plate-like material to form a plurality of fan-shaped parts (a plurality of column parts). At the foregoing step, after one fan-shaped part is punched by the first punch, the first punch is then rotated to punch the next adjacent fan-shaped part. Thus, at the time of punching, the column part is prone to escape toward the adjacent part, and the shape accuracy of the fan-shaped parts (column parts) and the accuracy of forming the fan-shaped parts (column parts) at equal intervals (evenly in the circumferential direction) (pitch accuracy) tend to be deteriorated.

In addition, the second member (small-diameter ring part) is fabricated from a belt-like elongated member through the abutment portion processing step and the deforming and fixing step, and thus at manufacture of supersized cages, it is difficult to perform the deforming and fixing step at which the elongated member is cut and deformed in a circular shape and the cut ends thereof are joined and fixed to each other while maintaining desired rigidity.

Further, the second member (small-diameter ring part) is formed in an annular ring shape by deforming the elongated member in a circular shape. When the annular ring-shaped second member (small-diameter ring part) is attached to leading ends of the column parts of the first member which are erected at a predetermined taper angle with respect to the axial center through the folding step, the column parts and the second member are not orthogonal to each other. Accordingly, the edge portion of the second member (small-diameter ring part) contacts and slides on the small diameter-side end surfaces of the conical rollers stored in the pocket holes, and thus abrasion tends to advance at the portion.

Further, according to the configuration in which the first member and the second member are separately fabricated as in Patent Document 6, if the first member and the second member are joined and fixed together by welding joint such as laser welding or arc welding, the second member (large-diameter ring part or small-diameter ring part) may be deformed, warped, or the like to deteriorate the accuracy of the cage under influence of high heat resulting from welding operations, and the strength of the joints may decrease due to age deterioration of the welded parts. This results in a problem that it is not possible to assure the strength of the cage for a long period of time to meet the above-mentioned need for long-term unnecessity of maintenance check and replacement work.

In light of the foregoing problems, it is conceivable that the cage is manufactured such that the first member and the second member are joined and fixed together not using welding joint but by inserting leading ends of square column parts into square holes in the large-diameter ring part and projecting the same from the large-diameter ring, and then swaging the leading end portions.

However, the leading ends of the column parts are rectangular in shape, and thus if a concave metal mold tailored to the leading end shape is used to perform a swaging process such that the column parts is pressed with application of a shock load in a vertical axis direction as in pressing process and the leading end portions of the column parts are plastically deformed (entire-surface compression method using a press machine), the column parts may be deformed, warped, or the like to deteriorate the accuracy of the cage.

The inventors of the invention of the subject application have conducted earnest studies on configuration of a supersized cage that allows compatibility between provision of desired rigidity and accuracy of the cage and long-term assurance of reliability of joined and fixed parts of the first member and the second member to eliminate the need for maintenance check and replacement work over a long period of time (one aspect of the present invention).

As a result, the inventors have produced an idea for performing a swaging process such that: the first member (base body) formed from one ring part and column parts and the second member (connection body) formed from the other ring part are separately fabricated based on blanks obtained by cutting steel plates; and these members are joined and fixed together by inserting leading ends of the square column parts into square holes in the other ring part and protruding the leading ends of the column parts from the other ring part, and swaging the leading end portions of the square columns by a swing swaging method, whereby the leading end portions of the column parts can be plastically deformed and swaged while suppressing warpage, deformation, or the like in the column parts without a shock load on the column parts in the vertical axis direction.

The swing swaging method is also called spinning swage method or swing riveting method by which mainly rivets with a small-diameter circular section are swaged and formed. That is, according to this method, a swing swaging jig having at its leading ends a conical press surface with a large apex angle (swing swaging punch) is used to press the press surface against the rivet axis as an object to be swaged while rotating the press surface around the center line of the rivet axis and subject the leading end portion of the rivet axis to plastic deformation to a round head shape or a flat head shape.

In the technical field of bearings, such a swing swaging method is applied to hub unit bearing devices such that a swing swaging jig is pressed against a cylindrical concave portion (cylindrical portion to be swaged) at a shaft end part to bend the cylindrical portion outward in the radial direction and press the cylindrical portion against the inner ring while increasing the diameter of the cylindrical portion, thereby to fix the inner ring and apply a pre-load to the roller bearing for retention of the roller bearing (for example, refer to Patent Document 9).

The present invention is configured to be suited to supersized cages, such that the first member (base body) and the second member (connection body) are manufactured on the basis of blanks cut and processed from steel plates as described later. The leading ends of the column parts are square in shape, and are inserted into square holes in the other ring part and protruded from the other ring part, and then subjected to a swing swaging process. Thus, unlike in conventional swing swaging methods, the subjects to be swaged are not circular shafts such as rivets or circular cross sections of cylindrical portions to be swaged in hub unit bearing devices.

The inventors have conducted evaluation tests of a swing swaging process for rotation rate of a swing swaging jig, feeding rate and thrust force and the like of a swaging machine, and different amounts of protrusion of the leading ends of column parts from a ring part surface in a prototyped roller bearing cage, and the like. As the result, the inventors have confirmed effectiveness of the swing swaging process on the leading ends of the square column parts without normal circular cross sections.

Meanwhile, the inventors have also found from the evaluation tests that the joining and fixing of the base body and the connection body by a swing swaging process was effective in establishing compatibility between provision of desired rigidity and accuracy of the supersized cage and long-term assurance of reliability of joined and fixed parts to eliminate the need for maintenance check and replacement work for a long period of time, but had the following problems. Specifically, the thrust force of the swaging machine acts directly on the column parts of the base body during the swing swaging process, and thus it is necessary to suppress the action of the excessive thrust force so as not to subject the column parts to buckling distortion. With a smaller thrust force, however, the processing time becomes longer to decrease productivity, and thus there is room for improvement from the viewpoint of enhancing productivity.

In addition, the inventors have found that the cage in which the base body (first member) and the connection body (second member) are joined and fixed together by laser welding as described in Patent Document 6, and the cage in which the base body and the connection body are joined and fixed together by a swing swaging process as one aspect of the present invention, were also structured such that, when an axial load (thrust load) acts on the cage, the load acts directly on the joined and fixed parts. Thus, there is room for improvement also from the viewpoint of further enhancing reliability of the joined and fixed parts of the base body and the connection body.

Further, the inventors have revealed that the cage in which the base body and the connection body are joined and fixed together by a swing swaging process as one aspect of the present invention, was structured such that the circumferential width dimension of the square columnar convexes at the leading ends of the column parts of the base body was smaller than the circumferential width dimension of the column parts at the base-end sides of the same for the purpose of positioning the base body and the connection body, that is, the transverse area of the square columnar convexes was smaller than the transverse area of the column parts at the base end side, and thus the strength of the joined and fixed parts of the base body and the connection body might be insufficient.

Moreover, in the configuration of the cage described in Patent Document 6, the attachment seats (protruded parts) at the leading ends of the base body are made small in transverse area to position the base body (first member) and the connection body (second member) (refer to Patent Document 6, FIG. 23 and paragraph [0072]), which may result in insufficient strength of the joined and fixed parts of the base body and the connection body.

There is a conical roller bearing cage configured to increase the transverse area of the leading ends of the column parts, such that a flat-plate article with radially extended T-shaped protrusions is punched out from a steel plate, and the article is folded by a drawing process to bring the T-shaped protrusions into abutment with each other, and, for holding the shapes of pocket holes to be formed in this state, place and crimp ring-shaped reinforcement edges folded in advance in a cap shape onto the T-shaped protrusions (for example, refer to Patent Document 10).

However, the conical roller bearing cage described in Patent Document 10 is simply structured such that the cap-shaped reinforcement edges are placed and crimped onto the T-shaped protrusions at the leading ends of the columns parts, and thus the cage is susceptible to vibration and impact. Accordingly, when being applied to a supersized cage, the cage described in Patent Document 10 cannot provide desired rigidity and accuracy or assure strength, durability, and the like.

In light of the foregoing circumferences, an object of the present invention is to provide a roller bearing cage suited to supersized roller bearings in particular and a manufacturing method therefor as well as roller bearing manufacturing method, wherein the roller bearing cage is manufactured by separately fabricating a first member (base body) formed from one ring part and column parts and a second member (connection body) formed from the other ring part, and then joining and fixing together the first member and the second member, is easy to improve rigidity, realizes reduction in manufacturing costs, facilitates dimension management and accuracy management for a pitch circle diameter, pocket size, and the like, has conical rollers or spherical rollers hard to be worn at end surfaces, and enhances strength and reliability of the joined and fixed parts of the base body and the connection body, thereby bringing about improvement of productivity.

Solutions to Problems

To solve the foregoing problems, a roller bearing cage according to the present invention is a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rolling elements, wherein a base body including one of the ring parts and the column parts with square columnar convexes at leading ends thereof and a connection body including the other ring part with square holes for fitting with the square columnar convexes of the column parts are set as separate members, these members are manufactured based on blanks obtained by cutting and processing steel plates, the column parts of the base body are formed by folding along an outer peripheral portion of the ring part of the base body or are formed by folding along an inner peripheral portion of the ring part of the base body, and when the column parts of the base body are formed by folding along the outer peripheral portion of the ring part of the base body, tongue pieces are formed so as to be protruded from the outer peripheral portion of the ring part of the base body to between the column parts, and inclined surfaces to be in surface contact with end surfaces of the rolling elements are formed in the tongue pieces, and when the column parts of the base body are formed by folding along the inner peripheral portion of the ring part of the base body, tongue pieces are formed so as to be protruded from the inner peripheral portion of the ring part of the base body to between the column parts, and inclined surfaces to be in surface contact with the end surfaces of the rolling elements are formed in the tongue pieces, and the base body and the connection body are joined and fixed together while the square columnar convexes of the base body are fitted into the square holes of the connection body.

According to the foregoing configuration, since the base body and the connection body as separate members are assembled into the cage, the materials for and the shapes of the base body and the connection body can be easily changed, which facilitates acquisition of desired strength and rigidity.

In addition, the base body and the connection body are manufactured based on their respective blanks obtained by cutting and processing steel plates through laser-cutting or the like, which eliminates the need for a metal mold for punching pocket holes at manufacture of supersized cages and facilitates assurance of shape accuracy.

Further, when the column parts of the base body are formed by folding along the outer peripheral portion of the ring part of the base body, the tongue pieces are formed so as to be protruded from the outer peripheral portion of the ring part of the base body to between the column parts, and the inclined surfaces to be in surface contact with the end surfaces of the rolling elements are formed in the tongue pieces, whereas when the column parts of the base body are formed by folding along the inner peripheral portion of the ring part of the base body, the tongue pieces are formed so as to be protruded from the inner peripheral portion of the ring part of the base body to between the column parts, and the inclined surfaces to be in surface contact with the end surfaces of the rolling elements are formed in the tongue pieces, and thus the end surfaces of the rolling elements (conical rollers or spherical rollers) stored in the pocket holes do not contact the edge portions of the ring part of the base body, which makes it possible to suppress progression of abrasion of the end surfaces unlike in the case where the end surfaces of the rolling elements contact and slide on the edge portions, and thus further stabilize the holding state of the rolling elements.

In addition, since the column parts of the base body are formed by folding along the outer peripheral portion of the ring part of the base body or are formed by folding along the inner peripheral portion of the ring part of the base body, no erected portions (window seats of pocket holes) are formed between the column parts of the base body and thus the pocket holes can be made long.

This makes it possible to extend the entire length of the rolling elements and increase the load capacity of the roller bearing.

In addition, when the column parts of the base body are formed by folding along the inner peripheral portion of the ring part of the base body, the base body blank formed by cutting a steel plate is smaller in size than that with the column parts by folding along the outer peripheral portion of the ring part of the base body, which makes it possible to increase the yield of the material and thus reduce material costs.

Further, when the column parts of the base body are formed by folding along the inner peripheral portion of the ring part of the base body, the small-diameter ring part is the connection body in the spherical roller bearing cage. Thus, when the base body and the connection body are joined and fixed together in the state where the square columnar convexes of the base body are fitted into the square holes of the connection body, the large-diameter ring part has no joined and fixed part. Accordingly, when two spherical roller bearing cages are used with their large-diameter ring parts butted back to back, the joined and fixed parts do not interfere with the use of the cages. Therefore, even if the joined and fixed parts include projections such as swaged portions, there is no need for removing such projections.

It is preferred that the inclined surfaces are formed by a press process after the base body and the connection body are integrated.

According to this configuration, after the base body and the connection body are joined and fixed together and integrated by a jointing process such as welding or pressing, for example, the inclined surfaces to be in surface contact with the end surfaces of the rolling elements are formed in the tongue pieces, which makes it possible to adjust length dimensions of the pocket holes for storing and holding the rolling elements.

It is also preferred that the ring part of the connection body is formed in a disc-spring shape so as to be orthogonal to the column parts of the base body.

According to this configuration, the ring part of the connection body is formed in a disc-spring shape so as to be orthogonal to the column parts, and the end surfaces of the rolling elements stored in the pocket holes do not contact the edge portions of the ring part of the connection body. This makes it possible to suppress progression of abrasion of the end surfaces unlike in the case where the end surfaces of the rolling elements contact and slide on the edge portions, and thus further stabilize the holding state of the rolling elements.

It is also preferred that press-fit portions to be press-fitted into the square holes of the connection body are formed at the base end-side portions on both circumferential side surfaces of the square columnar convexes of the base body.

According to this configuration, it is easy to form press-fit portions at the base end-side portions in both circumferential side surfaces of the square columnar convexes during cutting and processing of the base body blank. When the press-fit portions in both circumferential side surfaces of the square columnar convexes are press-fitted into the square holes of the connection body, the base body and the connection body are joined and fixed together firmly in particular in the circumferential direction. Therefore, it is possible to suppress circumferential position shifts of the column parts caused by a circumferential force acting on the column parts during rotation of the roller bearing, and thus maintain accuracy over a long period of time.

It is also preferred that protrusion pieces protruded from circumferential front-back surfaces are formed at the base-end sides of the square columnar convexes in the column parts of the base body, and a clearance is formed between a pair of protrusion pieces protruded from one to the other of the adjacent column parts.

According to this configuration, the protrusion pieces protruded from circumferential front-back surfaces are formed at the base-end sides of the square columnar convexes in the column parts, even if an axial load (thrust load) acts on the cage, the protrusion pieces receive the load and thus the load does not act directly on the joined and fixed parts of the base body and the connection body, which makes it possible to further improve reliability of the joined and fixed parts of the base body and the connection body.

In addition, the clearance is formed between a pair of protrusion pieces protruded from one to the other of the adjacent column parts, and thus a space is formed in the pocket holes at the connection body side. This space can act as a flow path for lubricant oil to reduce abrasion and temperature increase of the rolling elements, the flange part of the outer ring, and the cage.

It is also preferred that circumferential width dimension of the square columnar convexes is set equal to or larger than circumferential width dimension of the column parts at the base-end sides across the protrusion pieces.

According to this configuration, the provision of the protrusion pieces makes it possible to set the circumferential width dimension of the square columnar convexes to be equal or more than the circumferential width dimension of the column parts at the base-end sides across the protrusion pieces, and thus the transverse area of the square columnar convexes does not become smaller than the transverse area of the column parts at the base-end side across the protrusion pieces. Accordingly, as compared to the case where the transverse area of the square columnar convexes is smaller than the transverse area of the column parts at the base-end side (as in Patent Document 6, for example), the strength of the joined and fixed parts becomes large and thus the joined and fixed parts are improved in reliability.

It is also preferred that the rolling elements are spherical rollers, and retaining projections to be inserted into retaining concaves in end surfaces of the spherical rollers are formed at the ring part of the base body or the ring part of the connection body.

According to this configuration, by inserting the retaining projections into the retaining concaves in the end surfaces of the spherical rollers, it is possible to retain the spherical rollers in an easy and reliable manner.

To solve the foregoing problems, a roller bearing cage according to the present invention is a roller bearing cage configured such that a pair of a small-diameter ring part and a large-diameter ring part axially separated from each other is connected by a plurality of column parts sliding on outer peripheral surfaces of spherical rollers as rolling elements, and a plurality of pocket holes is evenly formed in a circumferential direction to store and hold the rolling elements in a bowl-shaped or inverted cone-shaped peripheral wall portion while the small-diameter ring part is on the lower side and an axial direction is vertically located, wherein a base body including the small-diameter ring part and the column parts with square columnar convexes at leading ends thereof and a connection body including the large-diameter ring part with square holes for fitting with the square columnar convexes of the column parts are set as separate members, these members are manufactured based on blanks obtained by cutting and processing steel plates, and the large-diameter ring part is provided with large diameter-side end surface receivers that slide on large diameter-side end surfaces of the rolling elements to guide the rolling elements.

According to this configuration, since the base body and the connection body as separate members are assembled into the cage, the materials for and the shapes of the base body and the connection body can be easily changed, which facilitates acquisition of desired strength and rigidity and provide a sufficient load capacity even to the supersized spherical roller cage.

In addition, the base body and the connection body are manufactured based on their respective blanks obtained by cutting and processing steel plates through laser-cutting or the like, which eliminates the need to perform a large number of press processes unlike in the case of conventional integrated outward flange-type cages. This makes it possible to reduce metal mold costs and manufacturing costs.

Further, the base body and the connection body are fabricated as separate members, which eliminates the need for a metal mold for punching pocket holes at manufacture of a supersized spherical roller cage and facilitates assurance of shape accuracy.

Moreover, the large diameter-side end surface receivers slide on the large diameter-side end surfaces of the rolling elements to guide the rolling elements, which makes it possible to stabilize the holding state of the spherical rollers.

It is also preferred that inclined surfaces to be in surface contact with the large diameter-side end surfaces of the rolling elements are formed in the large diameter-side end surface receivers.

According to this configuration, the large diameter-side end surfaces of the spherical rollers stored in the pocket holes do not contact the edge portions of the large-diameter ring part, but the large diameter-side end surfaces of the spherical rollers are brought into surface contact with the large diameter-side end surface receivers at the large-diameter ring part. This makes it possible to suppress progression of abrasion of the end surfaces unlike in the case where the large diameter-side end surfaces of the spherical rollers contact and slide on the edge portions, and thus further stabilize the holding state of the spherical rollers.

It is also preferred that tongue pieces are formed so as to be protruded from the outer peripheral portion of the small-diameter ring part of the base body to between the column parts, and inclined surfaces to be in surface contact with small diameter-side end surfaces of the rolling elements are formed in the tongue pieces.

According to this configuration, the small diameter-side end surfaces of the spherical rollers stored in the pocket holes do not contact or slide on the edge portions of the small-diameter ring part, and the small diameter-side end surfaces of the spherical rollers are brought into surface contact with the tongue pieces protruded from the small-diameter ring part to between the column parts. This suppresses progression of abrasion of the small diameter-side end surfaces of the spherical rollers unlike in the case where the small diameter-side end surfaces of the spherical rollers contact and slide on the edge portions, and thus further stabilizes the holding state of the spherical rollers.

It is also preferred that rotation center axes of the spherical rollers are located at the inner-diameter side across the column parts, and the large diameter-side end surface receivers are formed at an inner diameter-side end portion of the large-diameter ring part or at the inner diameter-side end portion and outer diameter-side end portion of the large-diameter ring part.

According to this configuration, even though the rotation center axes of the spherical rollers are located at the inner-diameter side across the column parts as in conventional bowl-shaped cages, there is no need for a guide ring unlike in the conventional bowl-shaped cages. This causes no situation in which slippage occurs between the guide ring and the inner ring or the spherical rollers and the temperature of the bearing increases due to frictional heat, which eliminates the need to fabricate the guide ring as a separate member by shaving or the like. This realizes a reduction in manufacturing costs.

In addition, the large-diameter ring part fabricated separately from the base body is joined and fixed to the base body, which leads to significant improvement of rigidity as compared to the conventional bowl-shaped cages.

It is also preferred that the rotation center axes of the spherical rollers are located at the outer-diameter side across the column parts, and the large diameter-side end surface receivers are formed at the outer diameter-side end portion of the large-diameter ring part.

According to this configuration, when the rotation center axes of the spherical rollers are located at the outer-diameter side across the column parts as in conventional outward flange-type cages, in the case of a supersized spherical roller cage in particular, it is not necessary to form a thinner large diameter-side outward flange by pressing by a press machine with a high pressing force or form a large diameter-side outward flange by a press machine with extra-large press capacity, unlike in the case of the conventional outward flange-type cages. Accordingly, it is possible to solve the manufacturing and facility problems with the conventional outward flange-type cages.

It is also preferred that the base body and the connection body are joined and fixed together by inserting the square columnar convexes of the base body into the square holes of the connection body, and protruding leading ends of the square columnar convexes from the surface of the connection body, and then performing a swing swaging process on the leading ends of the square columnar convexes for plastic deformation to increase the square columnar convexes in diameter, and swaged portions are evenly formed in the circumferential direction, which are protruded from the surface of the connection body and are approximately rectangular in shape as seen from the axial direction.

According to this configuration, the base body and the connection body are joined and fixed together by the swing swaging process, no shock load acts on the column parts in the vertical axis direction, and thus it is possible to suppress warpage, deformation, or the like in the column parts. This makes it possible to facilitate assurance of accuracy of the supersized cage manufactured on the basis of the blanks obtained by cutting and processing steel plates, and avoid deterioration of accuracy of the cage under influence of high heat unlike in the case of joining and fixing the base body and the connection body by welding joint.

Further, since the base body and the connection body are joined and fixed together by the swing swaging process, there is no fear of age deterioration of welded parts unlike in the case of joining and fixing the base body and the connection body by welding joint. This makes it possible to assure reliability of the joined and fixed parts of the base body and the connection body over a long period of time.

To solve the foregoing problems, a manufacturing method for a roller bearing cage according to the present invention is a manufacturing method for a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rollers, the manufacturing method including: a base body blank cutting step to obtain a base body blank by cutting a steel plate such that portions to be the column parts are protruded outward in the radial direction from an outer peripheral portion of a disc-shaped member having a central hole, and square columnar convexes are formed at leading ends of the portions to be the column parts; a rough surface pressing step performed to surface-press surfaces of contact with the rolling elements in the portions to be the column parts by a surface pressing amount smaller than a final surface pressing amount, or a laser-cut inclined surface forming step to form through laser cutting inclined surfaces equivalent to the inclined surfaces formed at the rough surface pressing step; a folding step performed on the base body blank to fold the portions to be the column parts along the outer peripheral portion of the disc-shaped member; a connection body blank cutting step to obtain a connection body blank by cutting a steel plate into an annular-ring shape so as to form square holes evenly in the circumferential direction for fitting with the square columnar convexes; a joining and fixing step to join and fix a base body formed from the base body blank and a connection body formed from the connection body blank while the square columnar convexes of the base body are fitted into the square holes of the connection body; a finished surface pressing step to surface-press the surfaces of contact with the rolling elements in the column parts by the final surface pressing amount; and an inner-diameter removing step to remove an excessive thick portion of the inner-diameter part of the disc-shaped member having the central hole of the base body so as to meet a predetermined inner diameter, wherein the base body blank formed at the base body blank cutting step has tongue pieces that are protruded outward in the radial direction between the adjacent portions to be the column parts, and the manufacturing method further includes an inclined surface forming step to form inclined surfaces in the tongue pieces to be in surface contact with small diameter-side end surfaces of the rolling elements.

To solve the foregoing problems, a manufacturing method for a roller bearing cage according to the present invention is a manufacturing method for a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rollers, the manufacturing method including: a base body blank cutting step to obtain a base body blank by cutting a steel plate such that portions to be the column parts are protruded outward in the radial direction from an outer peripheral portion of a disc-shaped member having a central hole, and square columnar convexes are formed at leading ends of the portions to be the column parts; a rough surface pressing step to surface-press surfaces of contact with the rolling elements in the portions to be the column parts by the final surface pressing amount, or a laser-cut inclined surface forming step to form through laser cutting inclined surfaces equivalent to the inclined surfaces surface-pressed by the final surface pressing amount; a folding step performed on the base body blank to fold the portions to be the column parts along the outer peripheral portion of the disc-shaped member; a connection body blank cutting step to obtain a connection body blank by cutting a steel plate into an annular-ring shape so as to form square holes evenly in the circumferential direction for fitting with the square columnar convexes; a joining and fixing step to join and fix a base body formed from the base body blank and a connection body formed from the connection body blank while the square columnar convexes of the base body are fitted into the square holes of the connection body; and an inner-diameter removing step to remove an excessive thick portion of the inner-diameter part of the disc-shaped member having the central hole of the base body so as to meet a predetermined inner diameter, wherein the base body blank formed at the base body blank cutting step has tongue pieces that are protruded outward in the radial direction between the adjacent portions to be the column parts, and the manufacturing method further includes an inclined surface forming step to form inclined surfaces in the tongue pieces to be in surface contact with small diameter-side end surfaces of the rolling elements.

According to the manufacturing methods for a roller bearing cage, the base body and the connection body are manufactured based on their respective blanks obtained by cutting and processing steel plates through laser-cutting or the like at the base body blank cutting step and the connection body blank cutting step, respectively, which eliminates the need for a metal mold for punching pocket holes at manufacture of supersized cages and facilitates assurance of shape accuracy.

In addition, since the base body and the connection body as separate members are assembled into the cage, the materials for and the shapes of the base body and the connection body can be easily changed, which facilitates acquisition of desired strength and rigidity.

Further, the tongue pieces are formed so as to be protruded from the outer peripheral portion of the ring part of the base body to between the column parts at the base body blank cutting step, and inclined surfaces to be in surface contact with the end surfaces of the rolling elements are formed in the tongue pieces at the inclined surface forming step, the end surfaces of the rolling elements (conical rollers or spherical rollers) stored in the pocket holes do not contact the edge portions of the ring part of the base body, which makes it possible to suppress progression of abrasion of the end surfaces unlike in the case where the end surfaces of the rolling elements contact and slide on the edge portions, and thus further stabilize the holding state of the rolling elements.

Moreover, according to the configuration in which the laser-cut inclined surface forming step is performed, the portions to be the column parts are not extended or deformed unlike in the case where the surface pressing process is performed using a press mold.

To solve the foregoing problems, a manufacturing method for a roller bearing cage according to the present invention is a manufacturing method for a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rollers, the manufacturing method including: a base body blank cutting step to obtain a base body blank by cutting a steel plate through laser cutting such that portions to be the column parts are protruded outward in the radial direction from an outer peripheral portion of a disc-shaped member having a central hole, surfaces of contact with the rolling elements in the portions to be the column parts are surface-pressed to form inclined surfaces equivalent to inclined surfaces formed by a surface pressing amount smaller than a final surface pressing amount, and square columnar convexes are formed at leading ends of the portions to be the column parts; a folding step performed on the base body blank to fold the portions to be the column parts along the outer peripheral portion of the disc-shaped member; a connection body blank cutting step to obtain a connection body blank by cutting a steel plate into an annular-ring shape so as to form square holes evenly in the circumferential direction for fitting with the square columnar convexes; a joining and fixing step to join and fix a base body formed from the base body blank and a connection body formed from the connection body blank while the square columnar convexes of the base body are fitted into the square holes of the connection body; a finished surface pressing step to surface-press the surfaces of contact with the rolling elements in the column parts by the final surface pressing amount; and an inner-diameter removing step to remove an excessive thick portion of the inner-diameter part of the disc-shaped member having the central hole of the base body so as to meet a predetermined inner diameter, wherein the base body blank formed at the base body blank cutting step has tongue pieces that are protruded outward in the radial direction between the adjacent portions to be the column parts, and the manufacturing method further includes an inclined surface forming step to form inclined surfaces in the tongue pieces to be in surface contact with small diameter-side end surfaces of the rolling elements.

To solve the foregoing problems, a manufacturing method for a roller bearing cage according to the present invention is a manufacturing method for a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rollers, the manufacturing method including: a base body blank cutting step to obtain a base body blank by cutting a steel plate through laser cutting such that portions to be the column parts are protruded outward in the radial direction from an outer peripheral portion of a disc-shaped member having a central hole, surfaces of contact with the rolling elements in the portions to be the column parts are surface-pressed to form inclined surfaces equivalent to inclined surfaces surface-pressed by a final surface pressing amount, and square columnar convexes are formed at leading ends of the portions to be the column parts; a folding step performed on the base body blank to fold the portions to be the column parts along the outer peripheral portion of the disc-shaped member; a connection body blank cutting step to obtain a connection body blank by cutting a steel plate into an annular-ring shape so as to form square holes evenly in the circumferential direction for fitting with the square columnar convexes; a joining and fixing step to join and fix a base body formed from the base body blank and a connection body formed from the connection body blank while the square columnar convexes of the base body are fitted into the square holes of the connection body; and an inner-diameter removing step to remove an excessive thick portion of the inner-diameter part of the disc-shaped member having the central hole of the base body so as to meet a predetermined inner diameter, wherein the base body blank formed at the base body blank cutting step has tongue pieces that are protruded outward in the radial direction between the adjacent portions to be the column parts, and the manufacturing method further includes an inclined surface forming step to form inclined surfaces in the tongue pieces to be in surface contact with small diameter-side end surfaces of the rolling elements.

According to the manufacturing methods for a roller bearing cage, in addition to the advantages of the foregoing methods for a roller bearing cage, the inclined surfaces equivalent to the inclined surfaces formed at the surface pressing step can be formed through laser cutting in the course of the base body blank cutting step. This makes it possible to significantly simplify the manufacturing process.

It is also preferred that the manufacturing method includes a shaping step to form the ring part of the connection body in a disc-spring shape so as to be orthogonal to the column parts of the base body.

According to this configuration, the connection body is formed in a disc-spring shape such that the ring part of the connection body is orthogonal to the column parts at the shaping step, and thus the end surfaces of the rolling elements stored in the pocket holes do not contact the edge portions of the ring part of the connection body. This makes it possible to suppress progression of abrasion of the end surfaces unlike in the case where the end surfaces of the rolling elements contact and slide on the edge portions, and thus further stabilize the holding state of the rolling elements.

It is also preferred that the portions to be the column parts protruded outward in the radial direction in the base body blank formed at the base body blank cutting step have at base-end portion sides thereof concaves formed by concaving circumferential front-back side surfaces.

According to this configuration, even if, when the portions to be the column parts are folded at the folding step, the folded portions are bulged, the bulged portions do not contact the press mold, which makes it possible to assure the normal folding dimension at the folding step. In addition, the bulged portions do not interfere with the rolling elements.

In addition, the portions to be the column parts are pressed by a shorter length at the rough surface pressing step or the surface pressing step, which makes it possible to reduce the absolute amount of extension of the portions to be the column parts at the rough surface pressing step or the surface pressing step, and thus facilitate dimension setting.

It is also preferred that the portions to be the column parts protruded outward in the radial direction in the base body blank formed at the base body blank cutting step have at free-end portion sides thereof concaves formed by concaving circumferential front-back side surfaces.

According to this configuration, the portions to be the column parts are pressed by a further shorter length at the rough surface pressing step or the surface pressing step, which makes it possible to further reduce the absolute amount of extension of the portions to be the column parts at the rough surface pressing step or the surface pressing step, and further facilitate dimension setting.

In addition, the areas of the portions pressed at the rough surface pressing step, the finished surface pressing step, and the surface pressing step are small, which makes it possible to decrease pressing force of a press machine. This allows the surface pressing process of the column parts by not only a large-sized press machine but also a middle-sized press machine.

To solve the foregoing problems, a manufacturing method for a roller bearing cage according to the present invention is a manufacturing method for a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rollers, the manufacturing method including: a base body blank cutting step to obtain a base body blank by cutting a steel plate such that portions to be the column parts are protruded inward in the radial direction from an inner peripheral portion of an annular ring-shaped member, and square columnar convexes are formed at leading ends of the portions to be the column parts; a rough surface pressing step to surface-press surfaces of contact with the rolling elements in the portions to be the column parts by a surface pressing amount smaller than a final surface pressing amount, or a laser-cut inclined surface forming step to form through laser cutting inclined surfaces equivalent to the inclined surfaces formed at the rough surface pressing step; a folding step performed on the base body blank to fold the portions to be the column parts along the inner peripheral portion of the annular ring-shaped member; a connection body blank cutting step to obtain a connection body blank by cutting a steel plate into an annular-ring shape so as to form square holes evenly in the circumferential direction for fitting with the square columnar convexes; a joining and fixing step to join and fix a base body formed from the base body blank and a connection body formed from the connection body blank while the square columnar convexes of the base body are fitted into the square holes of the connection body; and a finished surface pressing step to surface-press the surfaces of contact with the rollers in the column parts by the final surface pressing amount, wherein the base body blank formed at the base body blank cutting step has tongue pieces that are protruded inward in the radial direction between the adjacent portions to be the column parts, and the manufacturing method further includes an inclined surface forming step to form inclined surfaces in the tongue pieces to be in surface contact with large diameter-side end surfaces of the rolling elements.

To solve the foregoing problems, a manufacturing method for a roller bearing cage according to the present invention is a manufacturing method for a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rollers, the manufacturing method including: a base body blank cutting step to obtain a base body blank by cutting a steel plate such that portions to be the column parts are protruded inward in the radial direction from an inner peripheral portion of an annular ring-shaped member, and square columnar convexes are formed at leading ends of the portions to be the column parts; a surface pressing step to surface-press surfaces of contact with the rolling elements in the portions to be the column parts by a final surface pressing amount, or a laser-cut inclined surface forming step to form through laser cutting inclined surfaces equivalent to the inclined surfaces surface-pressed by the final surface pressing amount; a folding step performed on the base body blank to fold the portions to be the column parts along the inner peripheral portion of the annular ring-shaped member; a connection body blank cutting step to obtain a connection body blank by cutting a steel plate into an annular-ring shape so as to form square holes evenly in the circumferential direction for fitting with the square columnar convexes; and a joining and fixing step to join and fix a base body formed from the base body blank and a connection body formed from the connection body blank while the square columnar convexes of the base body are fitted into the square holes of the connection body, wherein the base body blank formed at the base body blank cutting step has tongue pieces that are protruded inward in the radial direction between the adjacent portions to be the column parts, and the manufacturing method further includes an inclined surface forming step to form inclined surfaces in the tongue pieces to be in surface contact with large diameter-side end surfaces of the rolling elements.

According to the foregoing manufacturing methods for a roller bearing cage, the base body and the connection body are manufactured based on their respective blanks obtained by cutting and processing steel plates through laser-cutting or the like at the base body blank cutting step and the connection body blank cutting step, which eliminates the need for a metal mold for punching pocket holes at manufacture of a super-sized cage and facilitates assurance of shape accuracy.

In addition, since the base body and the connection body as separate members are assembled into the cage, the materials for and the shapes of the base body and the connection body can be easily changed, which facilitates acquisition of desired strength and rigidity.

Further, since the tongue pieces are formed so as to be protruded from the inner peripheral portion of the ring part of the base body to between the column parts at the base body blank cutting step and the inclined surfaces to be in surface contact with the end surfaces of the rolling elements are formed in the tongue pieces at the inclined surface forming step, the end surfaces of the rolling elements (conical rollers or spherical rollers) stored in the pocket holes do not contact the edge portions of the ring part of the base body, which makes it possible to suppress progression of abrasion of the end surfaces unlike in the case where the end surfaces of the rolling elements contact and slide on the edge portions, and thus further stabilize the holding state of the rolling elements.

Moreover, according to the configuration in which the laser-cut inclined surface forming step is performed, the portions to be the column parts are not extended or deformed unlike in the case where the surface pressing process is performed using a press mold.

Furthermore, since the base body blank is formed by protruding the portions to be the column parts inward in the radial direction from the inner peripheral portion of the annular ring-shaped member, the base body blank formed by cutting a steel plate is smaller in size than the base body blank formed by protruding the portions to be the column parts outward in the radial direction from the outer peripheral portion of the annular ring-shaped member, thereby making it possible to reduce material costs.

In addition, according to the foregoing manufacturing method in which, after the joining and fixing step of joining and fixing the base body and the connection body, no finished surface pressing step of surface-pressing the surfaces of contact with the rolling elements in the column parts is performed, that is, according to the configuration in which, after the base body blank cutting step, the surface pressing step of surface-pressing surfaces of contact with the rolling elements in the portions to be the column parts by a final surface pressing amount, or the laser-cut inclined surface forming step of forming through laser cutting inclined surfaces equivalent to the inclined surfaces surface-pressed by the final surface pressing amount is performed, the joining and fixing step is performed after the rolling elements are incorporated into the base body, which eliminates the need to perform a swaging step or the like to decrease the diameter of the cage after the rolling elements are incorporated into the cage. This makes it possible to improve dimension accuracy and reduce manufacturing costs.

Further, in manufacture of the spherical roller bearing cage, the small-diameter ring part is the connection body. Thus, when the base body and the connection body are joined and fixed together in the state where the square columnar convexes of the base body are engaged with the square holes of the connection body, the large-diameter ring part has no joined and fixed part. Accordingly, when two spherical roller bearing cages are used with their large-diameter ring parts butted back to back, the joined and fixed parts do not interfere with the use of the cages. Therefore, even if the joined and fixed parts include projections such as swaged portions, there is no need to perform a removing process step for shaving off such projections.

To solve the foregoing problems, a manufacturing method for a roller bearing cage according to the present invention is a manufacturing method for a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rollers, the manufacturing method including: a base body blank cutting step to obtain a base body blank by cutting a steel plate through laser cutting such that portions to be the column parts are protruded inward in the radial direction from an inner peripheral portion of an annular ring-shaped member, surfaces of contact with the rolling elements in the portions to be the column parts are surface-pressed to form inclined surfaces equivalent to inclined surfaces surface-pressed by a surface pressing amount smaller than a final surface pressing amount, and square columnar convexes are formed at leading ends of the portions to be the column parts; a folding step performed on the base body blank to fold the portions to be the column parts along the inner peripheral portion of the annular ring-shaped member; a connection body blank cutting step to obtain a connection body blank by cutting a steel plate into an annular-ring shape so as to form square holes evenly in the circumferential direction for fitting with the square columnar convexes; a joining and fixing step to join and fix a base body formed from the base body blank and a connection body formed from the connection body blank while the square columnar convexes of the base body are fitted into the square holes of the connection body; and a finished surface pressing step to surface-press the surfaces of contact with the rollers in the column parts by the final surface pressing amount, wherein the base body blank formed at the base body blank cutting step has tongue pieces that are protruded inward in the radial direction between the adjacent portions to be the column parts, and the manufacturing method further includes an inclined surface forming step to form inclined surfaces in the tongue pieces to be in surface contact with large diameter-side end surfaces of the rolling elements.

To solve the foregoing problems, a manufacturing method for a roller bearing cage according to the present invention is a manufacturing method for a roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rollers, the manufacturing method including: a base body blank cutting step to obtain a base body blank by cutting a steel plate through laser cutting such that portions to be the column parts are protruded inward in the radial direction from an inner peripheral portion of an annular ring-shaped member, surfaces of contact with the rolling elements in the portions to be the column parts are surface-pressed to form inclined surfaces equivalent to inclined surfaces surface-pressed by a final surface pressing amount, and square columnar convexes are formed at leading ends of the portions to be the column parts; a folding step performed on the base body blank to fold the portions to be the column parts along the inner peripheral portion of the annular ring-shaped member; a connection body blank cutting step to obtain a connection body blank by cutting a steel plate into an annular-ring shape so as to form square holes evenly in the circumferential direction for fitting with the square columnar convexes; and a joining and fixing step to join and fix a base body formed from the base body blank and a connection body formed from the connection body blank while the square columnar convexes of the base body are fitted into the square holes of the connection body, wherein the base body blank formed at the base body blank cutting step has tongue pieces that are protruded inward in the radial direction between the adjacent portions to be the column parts, and the manufacturing method further includes an inclined surface forming step to form inclined surfaces in the tongue pieces to be in surface contact with large diameter-side end surfaces of the rolling elements.

According to the foregoing manufacturing methods for a roller bearing cage, in addition to the advantages of the foregoing methods for a roller bearing cage, the inclined surfaces equivalent to the inclined surfaces formed at the surface pressing step can be formed through laser cutting in the course of the base body blank cutting step. This makes it possible to significantly simplify the manufacturing process.

It is also preferred that the manufacturing method includes a shaping step to form the connection body blank in a disc-spring shape so as to be orthogonal to the column parts of the base body.

According to the foregoing manufacturing methods for a roller bearing cage, the connection body is formed in a disc-spring shape such that the connection body is orthogonal to the column parts at the shaping step, and thus the end surfaces of the rolling elements stored in the pocket holes do not contact the edge portions of the connection body, which makes it possible to suppress progression of abrasion of the end surfaces unlike in the case where the end surfaces of the rolling elements contact and slide on the edge portions, and thus further stabilize the holding state of the rolling elements.

It is also preferred that the portions to be the column parts protruded inward in the radial direction in the base body blank formed at the base body blank cutting step have at base-end portion sides thereof concaves formed by concaving circumferential front-back side surfaces.

According to the foregoing manufacturing methods for a roller bearing cage, even if, when the portions to be the column parts are folded at the folding step, the folded portions are bulged, the bulged portions do not contact the press mold, which makes it possible to assure the normal folding dimension at the folding step. In addition, the bulged portions do not interfere with the rolling elements.

Further, the portions to be the column parts are pressed by a shorter length at the rough surface pressing step or the surface pressing step, which makes it possible to reduce the absolute amount of extension of the portions to be the column parts at the rough surface pressing step or the surface pressing step, and thus facilitate dimension setting.

It is also preferred that the portions to be the column parts protruded inward in the radial direction in the base body blank formed at the base body blank cutting step have at free-end portion sides thereof concaves formed by concaving circumferential front-back side surfaces.

According to the foregoing manufacturing methods for a roller bearing cage, the portions to be the column parts are pressed by a further shorter length at the rough surface pressing step or the surface pressing step, which makes it possible to further reduce the absolute amount of extension of the portions to be the column parts at the rough surface pressing step or the surface pressing step, and further facilitate dimension setting.

In addition, the areas of the portions pressed at the rough surface pressing step, the finished surface pressing step, and the surface pressing step are small, which makes it possible to decrease pressing force of a press machine. This allows the surface pressing process of the column parts by not only a large-sized press machine but also a middle-sized press machine.

It is also preferred that, at the base body blank cutting step, protrusion pieces protruded from the circumferential front-back surfaces are formed at the base-end sides of the square columnar convexes.

According to this configuration, since the roller bearing cage manufactured by the manufacturing method is provided with the protrusion pieces protruded from the circumferential front-back surfaces at the base-end sides of the square columnar convexes in the column parts, even if an axial load (thrust load) acts on the cage, the protrusion pieces receive the load and thus the load does not act directly on the joined and fixed parts of the base body and the connection body, which makes it possible to further improve reliability of the joined and fixed parts of the base body and the connection body.

It is also preferred that the rolling elements are spherical rollers, and the manufacturing method includes a retaining projection forming step for forming retaining projections to be inserted into retaining concaves in end surfaces of the spherical rollers at the ring part of the base body or the ring part of the connection body.

According to the foregoing manufacturing method for a roller bearing cage, the retaining projections are formed at the retaining projection forming step, and thus, by inserting the retaining projections into the retaining concaves in the end surfaces of the spherical rollers, it is possible to retain the spherical rollers in an easy and reliable manner.

It is also preferred that, at the joining and fixing step, the base body formed from the base body blank and the connection body formed from the connection body blank are joined and fixed together by inserting the square columnar convexes of the base body into the square holes of the connection body, and protruding leading ends of the square columnar convexes from the surface of the connection body, and then performing a swing swaging process on the leading ends of the square columnar convexes for plastic deformation to increase the square columnar convexes in diameter.

According to the foregoing manufacturing method for a roller bearing cage, the base body and the connection body are joined and fixed together by the swing swaging process, no shock load acts on the column parts in the vertical axis direction, and thus it is possible to suppress warpage, deformation, or the like in the column parts. This facilitates assurance of accuracy of the supersized cage manufactured on the basis of the blanks obtained by cutting and processing steel plates, and avoids deterioration of accuracy of the cage under influence of high heat unlike in the case of joining and fixing the base body and the connection body by welding joint.

Further, since the base body and the connection body are joined and fixed together by the swing swaging process, there is no fear of age deterioration of welded parts unlike in the case of joining and fixing the base body and the connection body by welding joint. This makes it possible to assure reliability of the joined and fixed parts of the base body and the connection body over a long period of time.

It is also preferred that at the base body blank cutting step, press-fit portions to be press-fitted into the square holes of the connection body are formed at the base end-side portions on both circumferential side surfaces of the square columnar convexes, and the step of press-fitting the press-fit portions of the square columnar convexes into the square holes of the connection body is performed using a thrust force for the swing swaging process in the course of the swing swaging process.

According to the foregoing manufacturing method for a roller bearing cage, the step of press-fitting the press-fit portions of the square columnar parts into the square holes of the connection body is not separated from the swing swaging process but is performed using a thrust force for the swing swaging process in the course of the swing swaging process, which makes it possible to simplify the manufacturing process and improve productivity.

It is also preferred that, at the base body blank cutting step, protrusion pieces protruded from the circumferential front-back surfaces are formed at the base-end sides of the square columnar convexes, and, at the joining and fixing step, the base body formed from the base body blank and the connection body formed from the connection body blank are joined and fixed together by inserting the square columnar convexes of the base body into the square holes of the connection body, and protruding leading ends of the square columnar convexes from the surface of the connection body, and then performing a swing swaging process on the leading ends of the square columnar convexes for plastic deformation to increase the square columnar convexes in diameter, and the swing swaging process is performed such that lower surfaces of the protrusion pieces are supported by receivers and a thrust force of a swaging machine performing the swing swaging process is received by the receivers.

According to the foregoing manufacturing method for a roller bearing cage, when the base body and the connection body are joined and fixed together by the swing swaging process, the thrust force of the swaging machine is received by the receivers, and thus there is no need to suppress the thrust force such that the column parts are not subjected to buckling distortion unlike in the configuration in which the thrust force of the swaging machine acts directly on the column parts of the base body. Accordingly, the thrust force of the swaging machine can be increased to shorten the processing time and improve productivity.

In addition, when the roller bearing cage is a conical roller bearing cage in which the largest outer-diameter portion is cylindrical in shape, by inclining the upper surfaces of the receivers for supporting the lower surfaces of the protrusion pieces in accordance with the inclination of the large diameter-side end surfaces of the conical rollers incorporated into the cage, the surface pressing process to be performed on the lower surfaces of the protrusion pieces by the thrust force of the swaging machine performing the swing swaging process can be completed. This makes it possible to simplify the manufacturing process and improve productivity.

To solve the foregoing problems, a manufacturing method for a roller bearing cage according to the present invention is a manufacturing method for a roller bearing cage, wherein the joining and fixing step in the manufacturing method for a roller bearing cage is performed to join and fix the base body and the connection body by a swaging process or join and fix the base body and the connection body by tightening, before the joining and fixing step of joining and fixing the base body and the connection body in a roller bearing cage manufactured by the manufacturing method for a roller bearing cage, the step of incorporating the rolling elements into the pocket holes of the base body and the step of assembling the rolling elements in the base body into an inner ring of the roller bearing are performed, and after the assembly of the rolling elements in the base body into the inner ring of the roller bearing, the joining and fixing step is performed by the swaging process or the tightening.

According to the foregoing manufacturing method for a roller bearing cage, the joining and fixing step is performed to join and fix the base body and the connection body by a swaging process or by tightening, and thus there is no occurrence of spatters unlike in the case where the base body and the connection body are joined and fixed together by welding joint.

Accordingly, even if the joining and fixing step is performed to join and fix the base body and the connection body after the step of incorporating the rolling elements into the pocket holes of the base body is performed and the step of assembling the rolling elements in the base body into the inner ring of the roller bearing and then the rolling elements and the inner ring of the roller bearing are set to the base body, no spatters adhere to the rolling elements or the inner ring, and thus no adverse influence is exerted on the lifetime of the roller bearing.

In addition, as for a supersized roller bearing using a supersized cage in particular, there is no need to perform a bottom spreading process on the cage using a supersized bottom spreading mold for setting of the rolling elements or perform a swaging process on the column parts using a supersized swaging mold after the inner ring is assembled into the cage storing the rolling elements, unlike in the case where the rolling elements are set into the cage after the joining and fixing of the base body and the connection body. This makes it possible to significantly reduce manufacturing costs.

Advantageous Effects of Invention

As described above, according to the roller bearing cage and manufacturing method therefor as well as roller bearing manufacturing method according to the present invention, it is possible to produce significant advantages such as: (A) the cage is manufactured by a combination of a cutting process of blanks by laser cutting or the like and a press process of the blanks, which allows easy processing and reduces mold costs in particular at manufacture of supersized cages that are small in production volume; (B) since the base body and the connection body as separate members are assembled into the cage, the materials for and the shapes of the base body and the connection body can be easily changed, which facilitates acquisition of desired strength and rigidity; (C) the base body and the connection body are manufactured based on their respective blanks obtained by cutting and processing steel plates through laser-cutting or the like, which eliminates the need for a metal mold for punching pocket holes at manufacture of supersized cages and facilitates assurance of shape accuracy; (D) since the base body has the tongue pieces protruded from the ring part of the base body to between the column parts and the tongue pieces have the inclined surfaces to be in surface contact with the end surfaces of the rolling elements, the end surfaces of the rolling elements stored in the pocket holes do not contact the edge portions of the ring part of the base body, which makes it possible to suppress progression of abrasion of the end surfaces unlike in the case where the end surfaces of the rolling elements contact and slide on the edge portions, and thus further stabilize the holding state of the rolling elements; (E) since the column parts are formed by folding along the outer peripheral portion of the ring part of the base body or are formed by folding along the inner peripheral portion of the ring part of the base body, no erected portions are formed between the column parts of the base body and thus the pocket holes can be made long, which makes it possible to extend the entire length of the rolling elements and increase the load capacity of the roller bearing; (F) when the column parts of the base body are formed by folding along the inner peripheral portion of the ring part of the base body, the base body blank formed by cutting a steel plate is smaller in size than that with the column parts formed by folding along the outer peripheral portion of the ring part of the base body, which makes it possible to increase the yield of the material and thus reduce material costs; (G) in the case where the column parts of the base body are formed by folding along the inner peripheral portion of the ring part of the base body, when two spherical roller bearing cages are used with their large-diameter ring parts butted back to back, the joined and fixed parts do not interfere with the use of the cages, and thus, even if the joined and fixed parts include projections such as swaged portions, there is no need for removing such projections; (H) when the column parts have the protrusion pieces protruded from the circumferential front-back surfaces at the base-end sides of the square columnar convexes, even if an axial load (thrust load) acts on the cage, the load does not act directly on the joined and fixed parts of the base body and the connection body, which makes it possible to further improve reliability of the joined and fixed parts of the base body and the connection body; and (I) when the base body and the connection body are joined and fixed together by the swing swaging process, no shock load acts on the column parts in a vertical axis direction, thereby to suppress warpage, deformation, or the like in the column parts, which facilitates assurance of accuracy of the supersized cage manufactured on the basis of the blanks obtained by cutting and processing steel plates and prevents deterioration of accuracy of the cage under influence of high heat unlike in the case of joining and fixing the base body and the connection body by welding joint, and there is no fear of age deterioration of welded parts unlike in the case of joining and fixing the base body and the connection body by welding joint, and thus it is possible to assure reliability of the joined and fixed parts of the base body and the connection body over a long period of time, and the like.

BRIEF DESCRIPTION OF THE DRAWINGS

FIG. 11(a) shows the case in which protrusion of a tongue piece is long; and FIG. 11(b) shows the case in which protrusion of the tongue piece is short;

FIG. 18(a) shows an example in which the base body and the connection body are joined and fixed together by a swaging process; and FIG. 18(b) shows an example in which the base body and the connection body are joined and fixed together by tightening;

FIG. 26(a) is a plane view of a base body blank; and FIG. 26(b) is an enlarged longitudinal sectional front view of major components;

FIG. 33(a) shows the state in the course of the process; and FIG. 33(b) shows the state in which the process is completed;

FIG. 45(a) shows the state in the course of the process; and FIG. 45(b) shows the state in which the process is completed;

FIG. 49(a) is a plane view; and FIG. 49(b) is a longitudinal sectional front view;

FIG. 60(a) is a plane view; and FIG. 60(b) is a longitudinal sectional front view;

DESCRIPTION OF EMBODIMENTS

Next, embodiments of the present invention will be described in detail with reference to the attached drawings. However, the present invention is not limited to the embodiments shown in the attached drawings but includes all of embodiments meeting the requirements described in the claims.

When a roller bearing cage is attached to a roller bearing, an axial direction of the bearing is designated as an axial direction and a radial direction of the same as a radial direction. The front view of a roller bearing cage according to first and fourth to seventh embodiments is seen from a lateral side while a large-diameter ring part is located on the upper side (a small-diameter ring part is located on the lower side) and the axial direction is set perpendicular. The front view of a roller bearing cage according to second and third embodiments is seen from a lateral side while a small-diameter ring part is located on the upper side (a large-diameter ring part is located on the lower side) and the axial direction is set perpendicular.

First Embodiment

Figure 1:
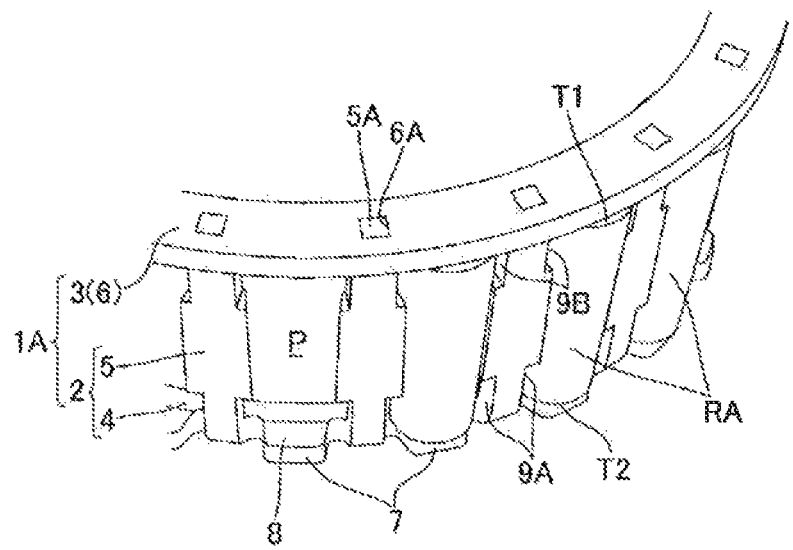
FIG. 1 is an enlarged perspective view of major components of a roller bearing cage (conical roller bearing cage) according to a first embodiment of the present invention, in which conical rollers are attached to only some of pockets for convenience of illustration.

As shown in the enlarged perspective view of major components of FIG. 1, a roller bearing cage (conical roller bearing cage) 1A according to a first embodiment of the present invention is configured such that a pair of a small-diameter ring part 4 and a large-diameter ring part 6 axially separated from each other is connected by a plurality of column parts 5, 5, . . . sliding on outer peripheral surfaces of conical rollers RA as rolling elements, and a plurality of pocket holes P, P, . . . is evenly formed in a peripheral wall portion in a circumferential direction to store and hold the conical rollers RA, RA, . . . .

The conical roller bearing cage 1A is formed by a base body 2 including the small-diameter ring part 4 and the column parts 5, 5, . . . with square columnar convexes 5A, 5A, . . . at leading ends thereof, and a connection body 3 including a large-diameter ring part 6 with square holes 6A, 6A, . . . for fitting with the square columnar convexes 5A, 5A, . . . at the leading ends of the column parts 5, 5, . . . . The base body 2 and the connection body 3 are each fabricated from a steel plate such as a hot-rolled steel plate (e.g., SPHD).

Next, a manufacturing method of the conical roller bearing cage 1A according to the first embodiment of the present invention will be described in detail.

First, processing of the base body 2 will be described.

(Base Body Blank Cutting Step)

Figure 2:
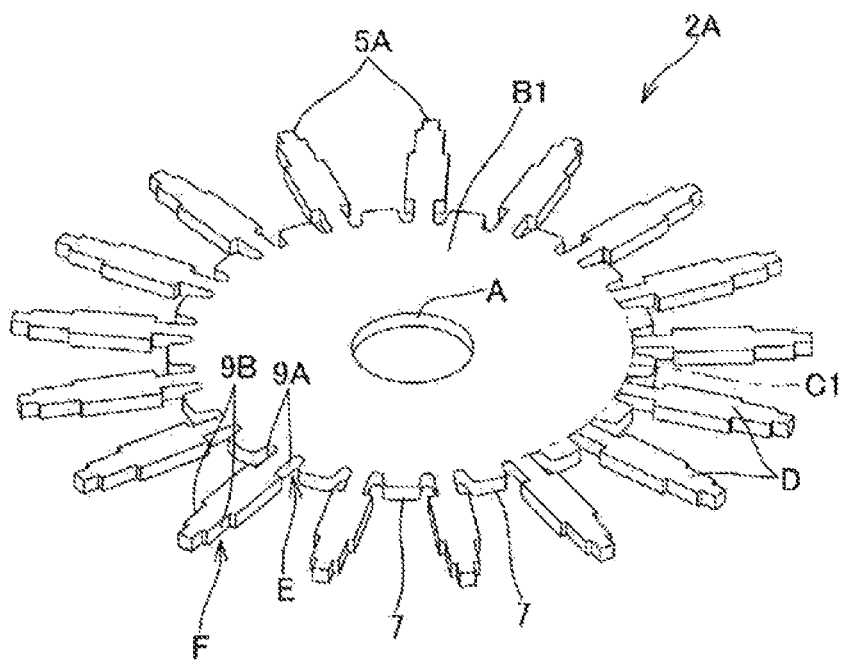
FIG. 2 is a perspective view of a base body blank processed at a base body blank cutting step.
Figure 3:
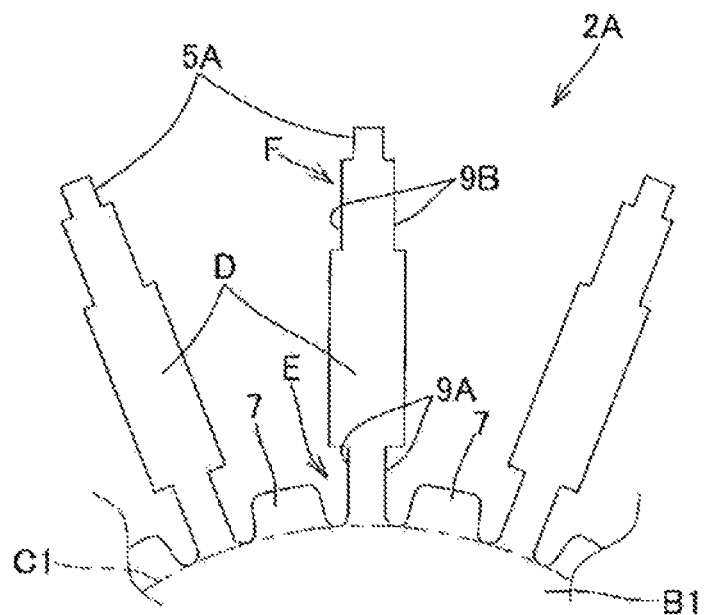
FIG. 3 is an enlarged plane view of major components of the base body blank.

As shown in the perspective view of FIG. 2 and the enlarged plane view of major components of FIG. 3, a base body blank cutting step is performed to obtain a base body blank 2A by cutting a steel plate through laser cutting such that portions D, D, . . . to be the column parts 5, 5, . . . are protruded outward in the radial direction from an outer peripheral portion C1 of a disc-shaped member B1 having a central hole A, concaves (step-down portions) 9A, 9A concaved in circumferential front-back side surfaces are formed at base-end portion sides E of the portions D, D, . . . to be the column parts 5, 5, . . . , concaves (step-down portions) 9B, 9B concaved in circumferential front-back side surfaces are formed at free-end portion sides F of the portions D, D . . . to be the column parts 5, 5, . . . , square columnar convexes 5A, 5A, . . . are formed at the leading ends of the portions D, D, . . . to be the column parts 5, 5, . . . , and tongue pieces 7 are formed to protrude outward in the radial direction between the adjacent portions D, D, . . . to be the column parts.

The foregoing cutting process is not limited to laser cutting but may be plasma cutting, wire-cut discharge machining, or the like.

Radial lengths of the concaves (step-down portions) 9A, 9A and 9B, 9B are set to be about 10 to 30% of entire longitudinal length of pocket holes P in the cage 1A having undergone a joining and fixing step described later (for example, refer to FIG. 1). The concaves (step-down portions) 9A, 9B are separated at cutting of the base body blank 2A such that the surface-pressing portions of the column parts 5 are positioned at the longitudinal centers of the pocket holes P.

Circumferential length (step-down amount) of the concaves (step-down portions) 9A at the base-end portion sides E is set so as not to contact small diameter-side peripheral surfaces T2 of the conical rollers RA, taking into account the matter that the pocket holes P become smaller in width at the small-diameter ring 4 side due to bulging of folded portions of the column parts 5 at a folding step described later. Circumferential length (step-down amount) of the concaves (step-down portions) 9B at the free-end portion sides F is set smaller than the minimum circumferential length of the finished and surface-pressed column parts 5 so as not to interfere with predetermined inclined surfaces 10B formed at a finished surface pressing step described later.

The square columnar convexes 5A at the leading ends of the portions D to be the column parts 5, 5, . . . are shaped such that projections are formed at circumferential center portions and seat surfaces are provided at circumferential front-back portions. The square columnar convexes 5A are preferably tapered taking into account ease of connection with the connection body 3 at a joining and fixing step described later.

(Rough Surface Pressing Step or Laser-Cut Inclined Surface Forming Step)

Figure 4:
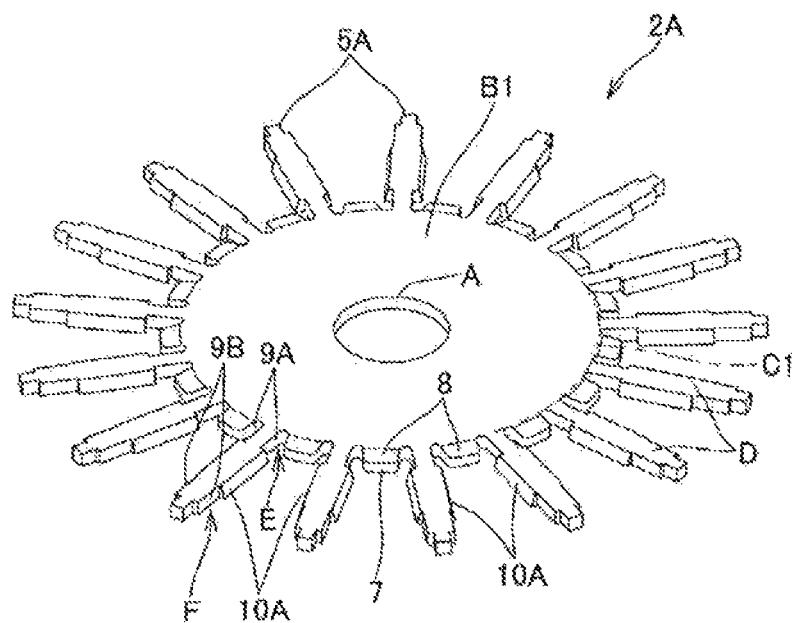
FIG. 4 is a perspective view of the base body blank processed at a rough surface pressing step and a tongue piece-inclined surface forming step.

Next, a rough surface pressing step is performed on intermediate sections between the concaves (step-down portions) 9A and 9B in the portions D to be the column parts (portions with about 40 to 80% of the entire length (radial length) of the portions D to be the column parts 5) by surface-pressing surfaces of contact with the conical rollers RA by a surface pressing amount smaller than a final surface pressing amount (for example, about 90 to 98% of the final surface pressing amount), thereby to form predetermined inclined surfaces 10A, 10A, . . . as shown in the perspective view of FIG. 4.

In this manner, the base body blank 2A is subjected to the rough surface pressing process by a press mold using the central hole A as a guide hole, and thus the base body blank 2A can be precisely processed in a stable state without position shift.

Instead of the rough surface pressing step, a laser-cut inclined surface forming step may be performed to form through laser cutting inclined surfaces 10A, 10A, . . . equivalent to the inclined surfaces 10A, 10A, . . . formed at the rough surface pressing step. According to the laser-cut inclined surface forming step, the portions D to be the column parts 5 are not extended or deformed unlike in the case where the rough surface pressing step is performed using a press mold.

In the case of performing the foregoing base body blank cutting step through laser cutting, a laser processing machine capable of three-dimensional processing may be used to radiate a laser beam to a steel plate in a direction vertical to the steel plate (in a plate thickness direction) to cut the concaves (step-down portions) 9A or 9B in the portions D to be the column parts 5, and radiate a laser beam to the steel plate obliquely (from the plate thickness direction) to cut the surface pressing sections between the concaves (step-down portions) 9A and 9B at the base body blank cutting step, thereby to fabricate the base body blank 2A with the inclined surfaces 10A, 10A, . . . shown in FIG. 4.

Therefore, the base body blank 2A having undergone the foregoing base body blank cutting step and the laser-cut inclined surface forming step can be fabricated by using a laser processing machine capable of three-dimensional process at one and the same step. This makes it possible to significantly simplify the manufacturing process.

(Tongue Piece-Inclined Surface Forming Step)

As shown in FIG. 4, an inclined surface forming step is performed on the tongue pieces 7, 7, . . . of the base body blank 2A to form using a press mold inclined surfaces 8, 8, . . . to be in surface contact with small diameter-side end surfaces T2 of the conical rollers RA, RA, . . . (refer to FIG. 1).

(Folding Step)

Figure 5:
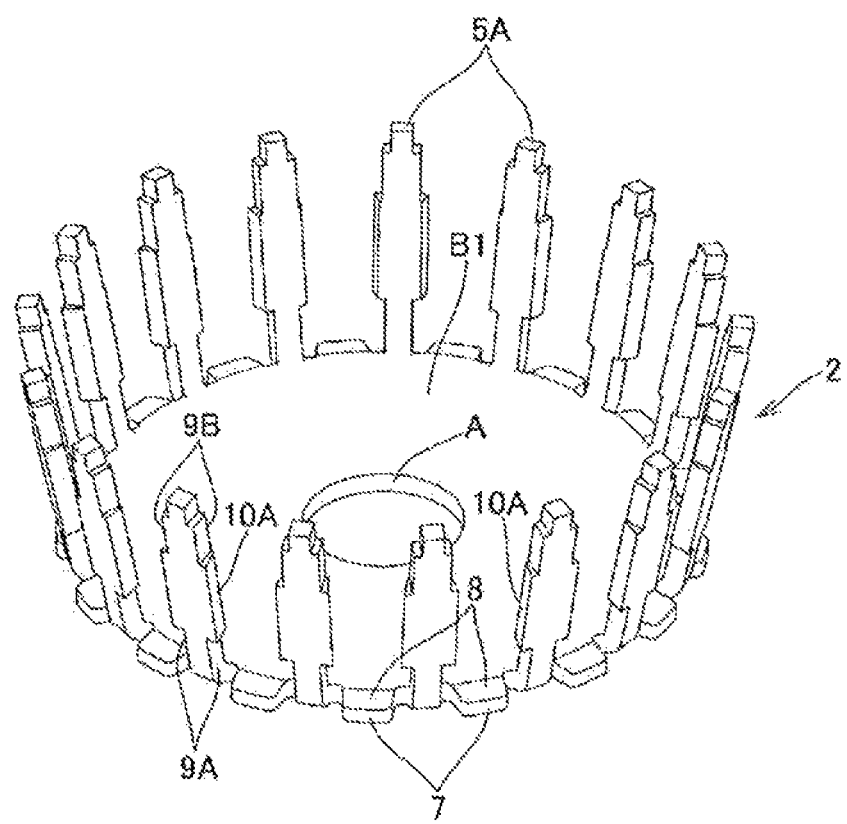
FIG. 5 is a perspective view of the base body blank processed at a folding step.

Next, a folding step is performed on the base body blank 2A to fold using a drawing mold the portions D, D, . . . to be the column parts to have an inverted truncated cone side surface, along the outer peripheral portion C1 of the disc-shaped member B1, as shown in the perspective view of FIG. 5.

The disc-shaped member B1 has at a center thereof the central hole A with a diameter smaller than the inner diameter of the cage, and the central hole A can function as a guide hole in the pressing process. In addition, the disc-shaped member B1 has a relatively large thick portion and thus facilitates acquisition of rigidity at the small-diameter side in the drawing process.

Next, processing of the connection body 3 will be described.

(Connection Body Blank Cutting Step)

Figure 6:
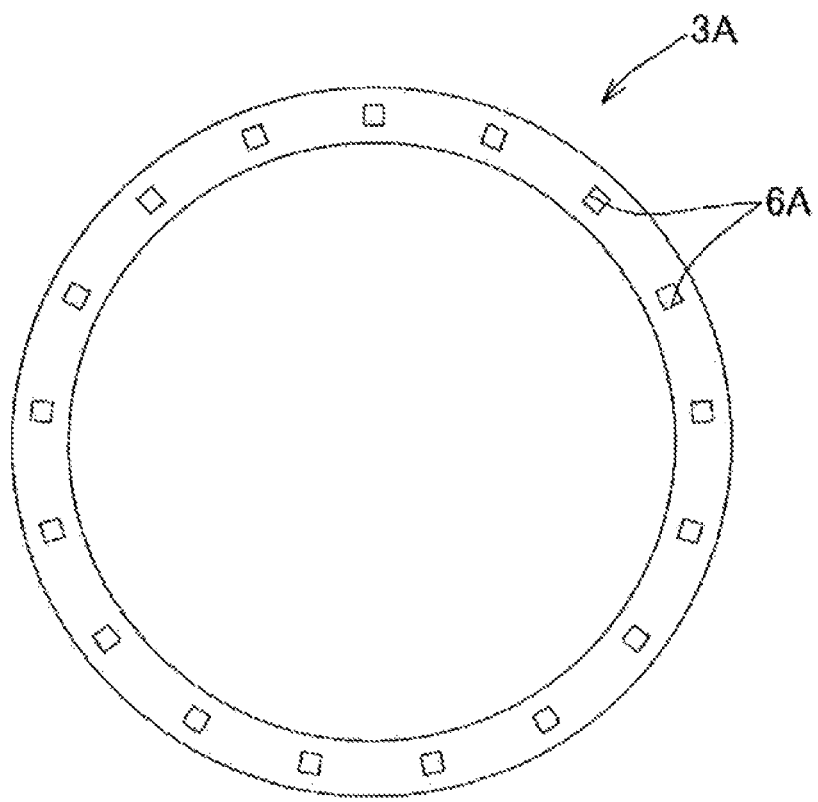
FIG. 6 is a plane view of a connection body blank processed at a connection body blank cutting step.

A connection body blank cutting step is performed to obtain a connection body blank 3A by cutting a steel plate through laser cutting to form a horizontal annular ring part extending in the radial direction and having the square holes 6A, 6A, . . . formed evenly in the circumferential direction for fitting with the square columnar convexes 5A, 5A, . . . , as shown in the plane view of FIG. 6.

The foregoing cutting process is not limited to laser cutting but may be plasma cutting, wire-cut discharge machining, or the like.

(Shaping Step)

Next, a shaping step is performed to shape the connection body blank 3A by a press process or roll process into a disc-spring shape high at an innerdiameter part and low at an outer-diameter part as shown in the enlarged plane view of major components of FIG. 7(a) and the enlarged cross-section view of major components of FIG. 7(b) so as to be orthogonal to the column parts 5, 5, . . . of the base body 2 shown in FIG. 1 (so as to be in surface contact with the large diameter-side end surfaces T1 of the conical rollers RA, RA, . . . (refer to FIG. 1)), thereby to obtain the connection body 3.

Next, integration of the base body 2 and the connection body 3 will be described.

(Joining and Fixing Step)

Figure 8:
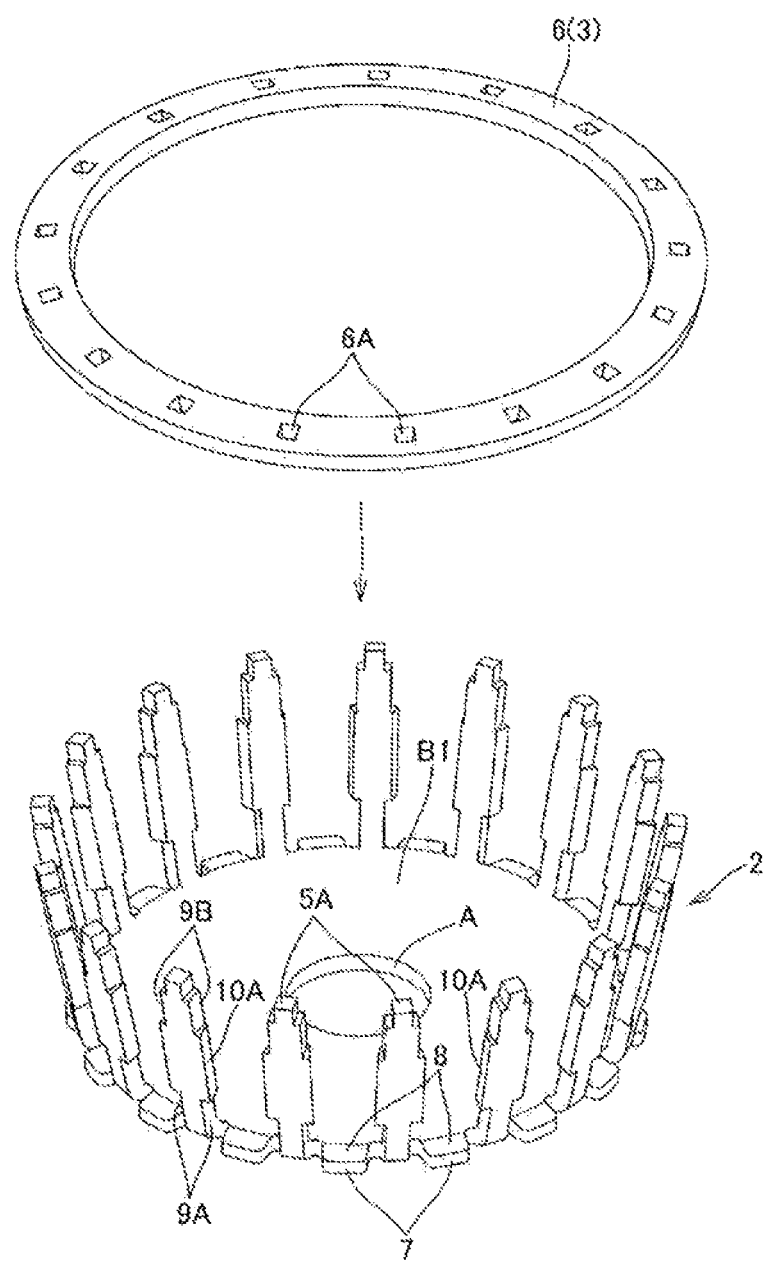
FIG. 8 is a perspective diagram showing a joining and fixing step.

A joining and fixing step is performed to integrate the base body 2 and the connection body 3 such that the square columnar convexes 5A, 5A, . . . of the base body 2 shown in the perspective diagram of FIG. 8 having undergone the base body blank cutting step, the rough surface pressing step or laser-cut inclined surface forming step, the tongue piece-inclined surface forming step, and the folding step are fitted into the square holes 6A, 6A, . . . of the connection body 3 shown in the perspective diagram of FIG. 8 having undergone the connection body blank cutting step and the shaping step, and in that state, the base body 2 and the connection body 3 are joined and fixed together by a welding process such as laser welding or spot welding, or a joint process through a press process such as swaging, or the like.

Next, processing of the base body 2 after the integration of the base body 2 and the connection body 3 will be described.

(Finished Surface Pressing Step)

Figure 9:
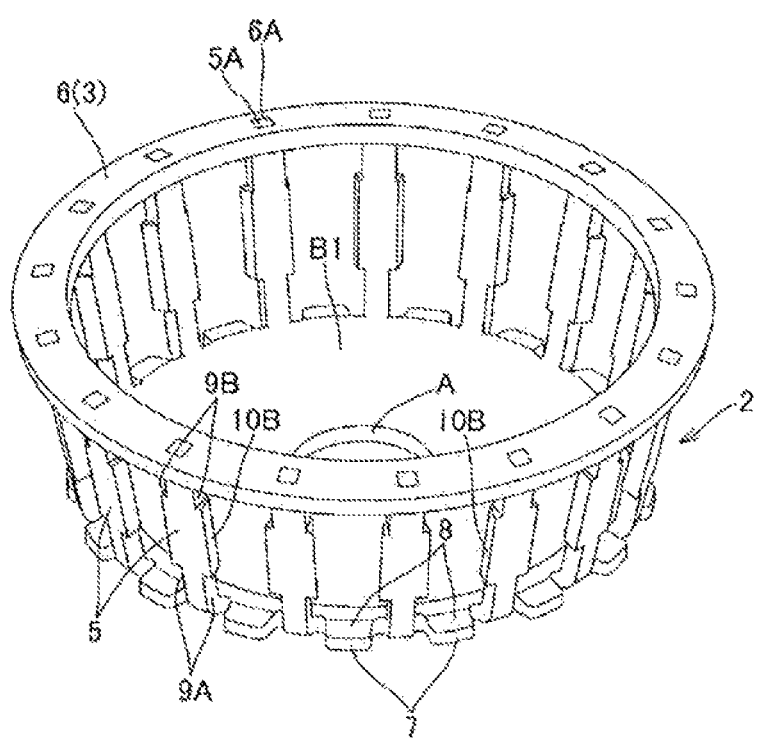
FIG. 9 is a perspective view of the two bodies processed at a finished surface pressing step.

A finished surface pressing step is performed on each of the column parts 5, 5, . . . by surface-pressing using a press mold the surfaces of contact with the conical rollers RA by the final surface pressing amount, thereby completing the predetermined inclined surfaces 10B, 10B, . . . as shown in the perspective view of FIG. 9.

As in the foregoing, the inclined surfaces 10A, 10A, . . . are formed at the portions D, D, . . . to be the column parts 5, 5, . . . in the state of the base body blank 2A shown in FIG. 2 at the rough surface pressing step or the laser-cut inclined surface forming step, and the predetermined inclined surfaces 10B, 10B, . . . shown in FIG. 9 are formed by surface-pressing the inclined surfaces 10A, 10A, . . . in the column parts 5, 5, . . . having undergone the folding step and the joining and fixing step for joining and fixing with the connection body 3 by the remaining pressing amount at the finished surface pressing step, which allows fine-adjustment of dimension accuracy and thus facilitates acquisition of the predetermined dimension accuracy.

In addition, in the case of forming the inclined surfaces 10A, 10A, . . . through laser cutting, even if the inclined surfaces 10A, 10A, . . . are rough, favorable surface press surfaces can be formed in the column parts 5, 5, . . . by transferring the smooth surfaces of a press mold to the rough surfaces of the inclined surfaces 10A, 10A, . . . at the finished surface pressing step.

(Innerdiameter Removing Step)

Figure 10:
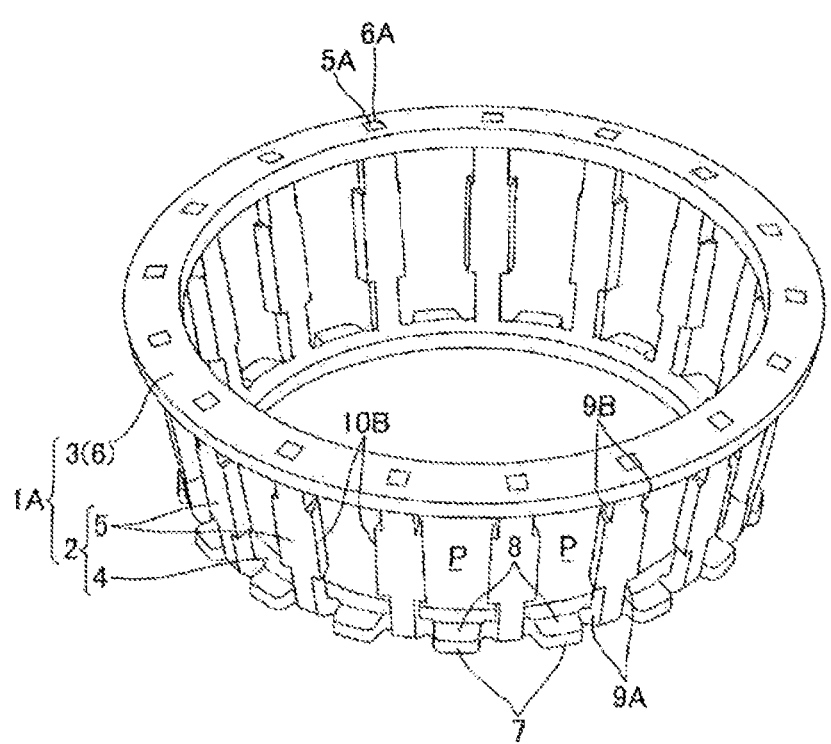
FIG. 10 is a perspective view of the two bodies processed at an inner-diameter removing step.

Next, an inner-diameter removing step is performed to remove an excessive thick portion of the innerdiameter part of the disc-shaped member B1 by a turning process, a laser cutting process, a press process, or the like so as to meet a predetermined inner diameter as shown in the perspective view of FIG. 10, thereby to obtain the final shape of the base body 2.

In the example of the manufacturing method for the conical roller bearing cage 1A described above, the tongue piece-inclined surface forming step for forming the inclined surfaces 8, 8, . . . in the tongue pieces 7, 7, . . . is performed between the rough surface pressing step or the laser-cut inclined surface forming step and the folding step. Alternatively, the tongue piece-inclined surface forming step may be performed after the base body blank cutting step, after the folding step, after the joining and fixing step, or after the finished surface pressing step.

In addition, in the example of the manufacturing method for the conical roller bearing cage 1A described above, the base body blank 2A is subjected to the rough surface pressing step to surface-press the surfaces of contact with the conical rollers RA in the portions D to be the column parts 5 by the surface pressing amount smaller than the final surface pressing amount, or the laser-cut inclined surface forming step to form through laser cutting the inclined surfaces 10A equivalent to the inclined surfaces 10A formed at the rough surface pressing step, and then the base body 2 integrated with the connection body 3 at the joining and fixing step is subjected to the finished surface pressing step to surface-press the surfaces of contact with the conical rollers RA in the column parts 5 by the final surface pressing amount, thereby forming the predetermined inclined surfaces 10B. Alternatively, the base body 2 integrated with the connection body 3 at the joining and fixing step may not be subjected to the finished surface pressing step, but the base body blank 2A may be subjected to the surface pressing step to surface-press the surfaces of contact with the conical rollers RA in the portions D to be the column parts 5 by the final surface pressing amount, or the laser-cut inclined surface forming step to form through laser cutting the inclined surfaces 10B equivalent to the predetermined inclined surfaces 10B surface-pressed by the final surface pressing amount.

According to the manufacturing method for the conical roller bearing cage 1A described above, the base body 2 and the connection body 3 are manufactured based on their respective blanks 2A and 3A obtained by cutting and processing steel plates through laser-cutting or the like at the base body blank cutting step and the connection body blank cutting step, which eliminates the need for a metal mold for punching pocket holes at manufacture of supersized cages and facilitates assurance of shape accuracy.

In addition, since the base body 2 and the connection body 3 as separate members are assembled into the cage 1A, the materials for and the shapes of the base body 2 and the connection body 3 can be easily changed, which facilitates acquisition of desired strength and rigidity.

Further, since the connection body 3 is formed in a disc-spring shape at the shaping step and the large-diameter ring part 6 is orthogonal to the column parts 5, 5, . . . , the large diameter-side end surfaces T1 of the conical rollers RA, RA, . . . stored in the pocket holes P, P, . . . do not contact edge portions of the large-diameter ring part 6. This suppresses progression of abrasion of the large diameter-side end surfaces T1 of the conical rollers RA, RA, . . . unlike in the case where the large diameter-side end surfaces T1 of the conical rollers RA, RA, . . . contact and slide on the edge portions, and thus further stabilizes the holding state of the conical rollers RA, RA, . . . .

Moreover, the base body blank 2A formed at the base body blank cutting step has the tongue pieces 7 protruded outward in the radial direction between the adjacent portions D, D, to be the column parts, and the inclined surfaces 8, 8, . . . to be in surface contact with the small diameter-side end surfaces T2 of the conical rollers RA, RA, . . . formed in the tongue pieces 7, 7, . . . protruded outward in the radial direction at the inclined surface forming step. Accordingly, the small diameter-side end surfaces T2 of the conical rollers RA, RA, . . . stored in the pocket holes P, P, . . . do not contact edge portions of the small-diameter ring part 4. This suppresses progression of abrasion of the small diameter-side end surfaces T2 of the conical rollers RA, RA, . . . unlike in the case where the small diameter-side end surfaces T2 of the conical rollers RA, RA, . . . contact and slide on the edge portions, and thus further stabilizes the holding state of the conical rollers RA, RA, . . . .

Figure 11:
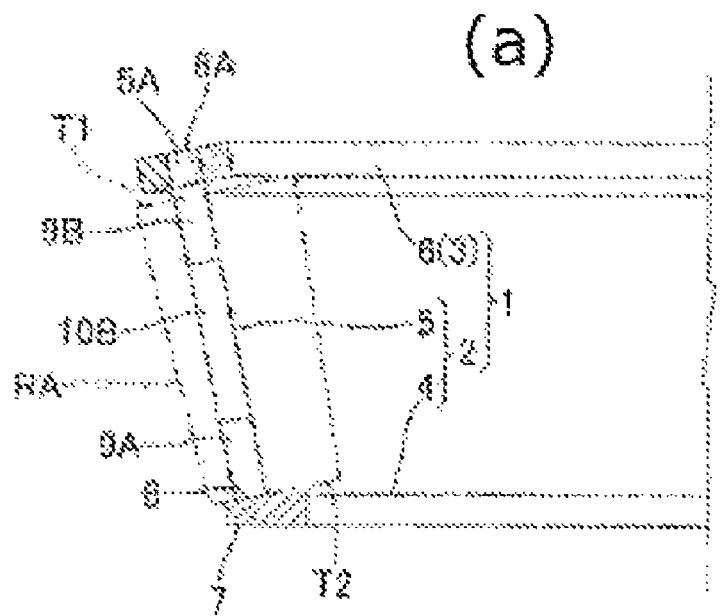
FIG. 11 is an enlarged longitudinal sectional front view of major components.
Figure 11:
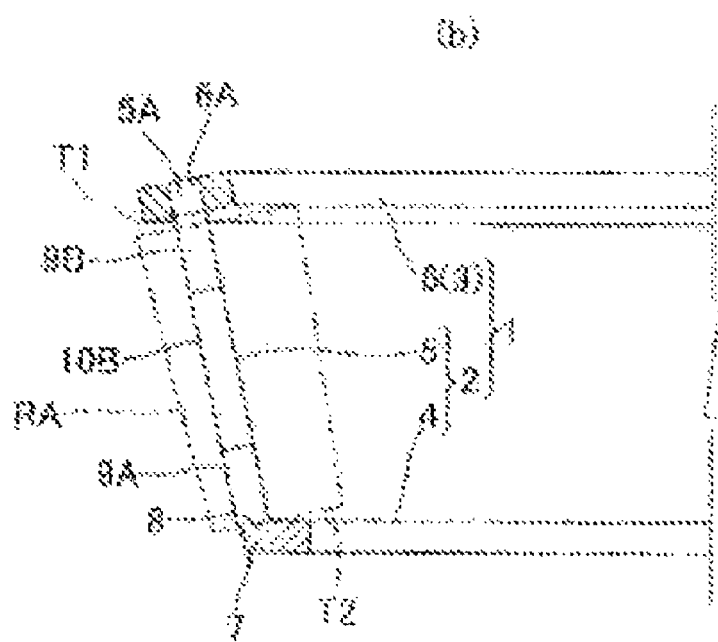

As compared to the case where the leading ends of the tongue pieces 7, 7, . . . are protruded more outward than the outer diameters of the lower end portions of the column parts 5 as shown in the longitudinal sectional front view of FIG. 11(a), when the leading ends of the tongue pieces 7, 7, . . . are protruded less outward than the outer diameters of the lower end portions of the column parts 5 as shown in the longitudinal sectional front view of FIG. 11(b), there is no need to provide the drawing mold die for use at the foregoing folding step with escape portions for the tongue pieces 7, 7, . . . . This can simplify the mold structure to reduce mold costs.

In addition, the concaves 9A, 9A concaved in circumferential front-back side surfaces are formed at the base-end portion E sides of the portions D to be the column parts 5 protruded outward in the radial direction in the base body blank 2A formed at the base body blank cutting step. Thus, even if, when the portions D to be the column parts 5 are folded at the folding step, the folded portions are bulged, the bulged portions do not contact the press mold, which makes it possible to assure the normal folding dimension at the folding step. In addition, the bulged portions do not interfere with the conical rollers RA, RA, . . . , and the portions D to be the column parts 5 are pressed by a shorter length at the rough surface pressing step or the surface pressing step, which makes it possible to reduce the absolute amount of extension of the portions D to be the column parts 5 at the rough surface pressing step or the surface pressing step, and thus facilitate dimension setting.

Further, besides the concaves 9A, 9A, the concaves 9B, 9B concaved in circumferential front-back side surfaces are formed, at the free-end portion sides F of the portions D to be the column parts 5 protruded outward in the radial direction. Accordingly, the portions D to be the column parts 5 are pressed by a further shorter length at the rough surface pressing step or the surface pressing step, which makes it possible to further reduce the absolute amount of extension of the portions D to be the column parts 5 at the rough surface pressing step or the surface pressing step, and further facilitate dimension setting. In addition, it is possible to decrease the pressing force of press machines at the rough surface pressing step, the finished surface pressing step, and the surface pressing step. This allows the surface pressing process of the column parts by not only large-sized press machines but also middle-sized press machines.

Next, descriptions will be given to an example of a manufacturing method for the conical roller bearing cage 1A according to the first embodiment of the present invention by which the tongue piece-inclined surface forming step shown in FIG. 4 is not performed on the base body blank 2A shown in FIG. 2 but the tongue piece-inclined surface forming step is performed after the joining and fixing step.

Figure 7:
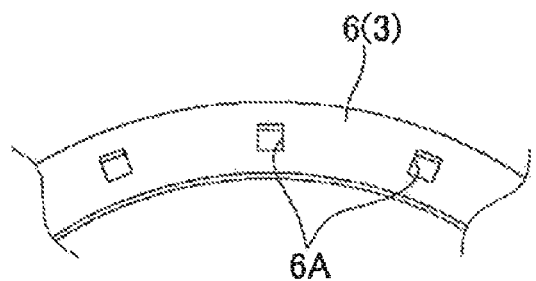
FIG. 7(a) is an enlarged plane view of major components of the connection body processed at a shaping step.
FIG. 7(b) is an enlarged cross-section view of major components of the connection body processed at the shaping step, taken along a plane including a radial direction and an axial direction.
Figure 7:
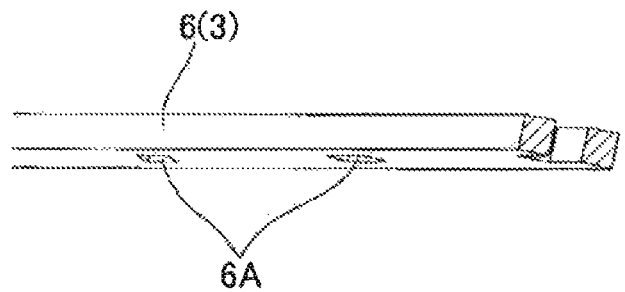
Figure 12:
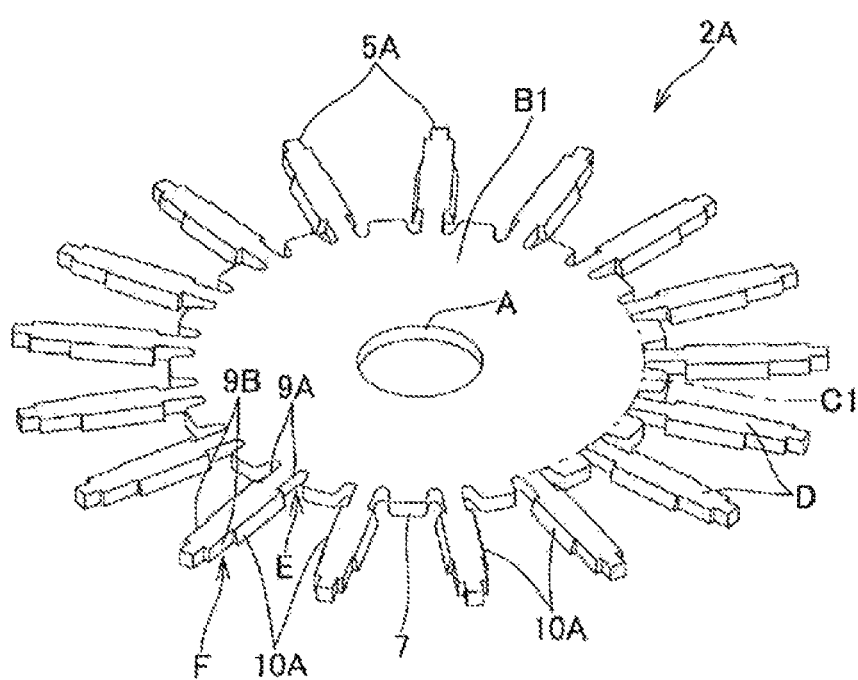
FIG. 12 is a perspective view of a base body blank processed at a rough surface processing step in another example of a manufacturing method for a roller bearing cage according to the first embodiment of the present invention.
Figure 13:
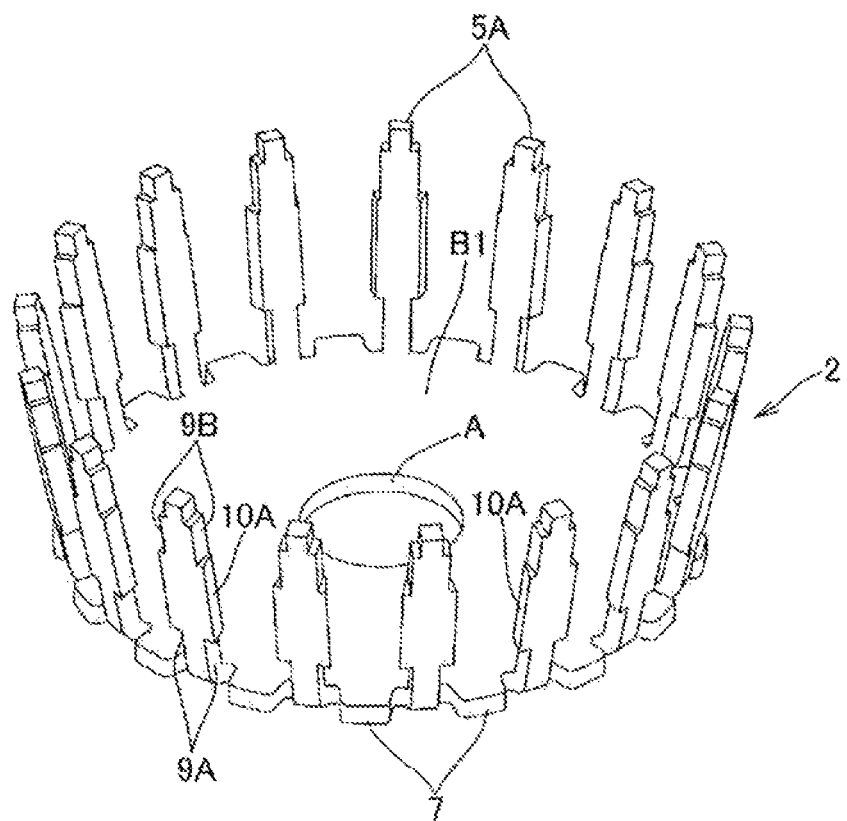
FIG. 13 is a perspective view of the base body blank processed at a folding step in the same.
Figure 14:
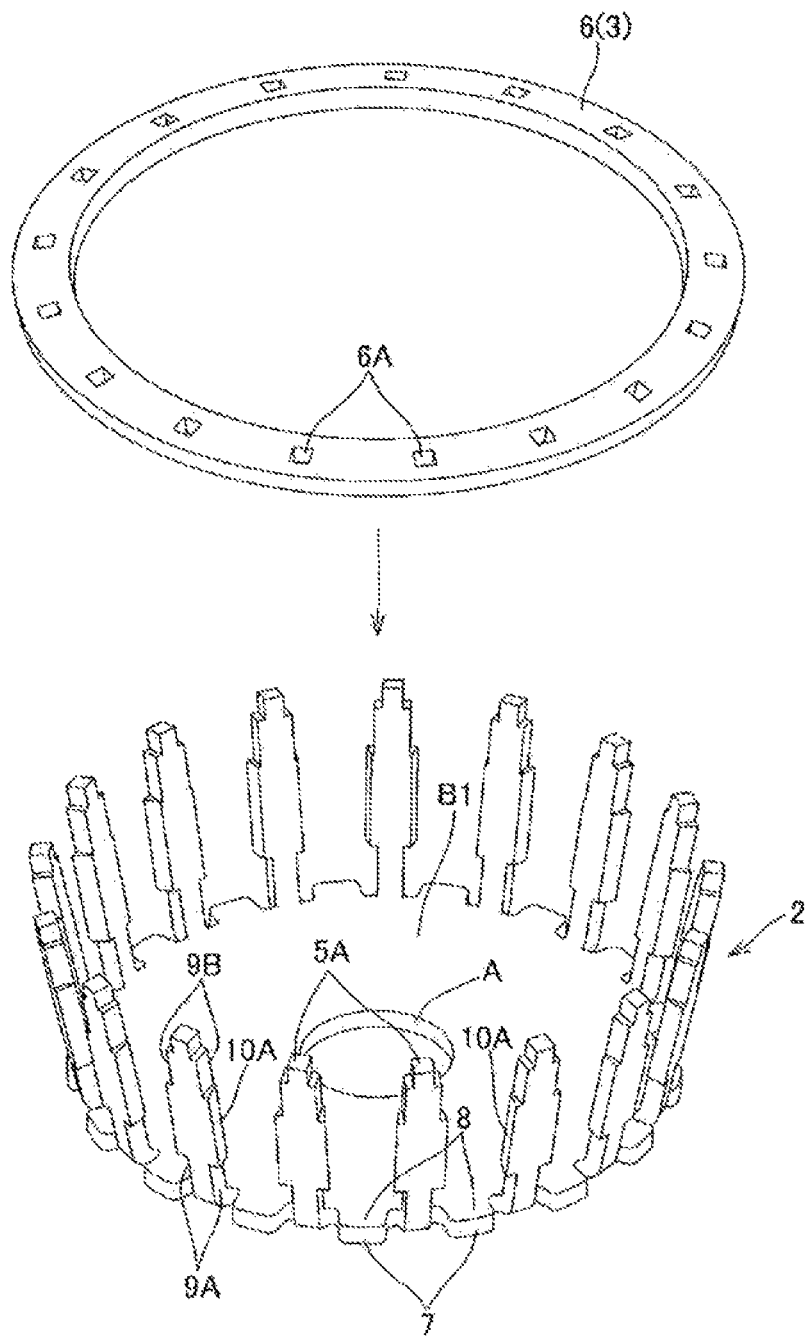
FIG. 14 is a perspective diagram showing a joining and fixing step in the same.

After the rough surface pressing step or the laser-cut inclined surface forming step are performed on the base body blank 2A shown in FIG. 2 as shown in the perspective view of FIG. 12, the folding step is performed as shown in the perspective view of FIG. 13, and then the base body 2 is integrated with the connection body 3 having undergone the connection body blank cutting step shown in FIG. 6 and the shaping step shown in FIG. 7, at the joining and fixing step shown in the perspective diagram of FIG. 14.

Figure 15:
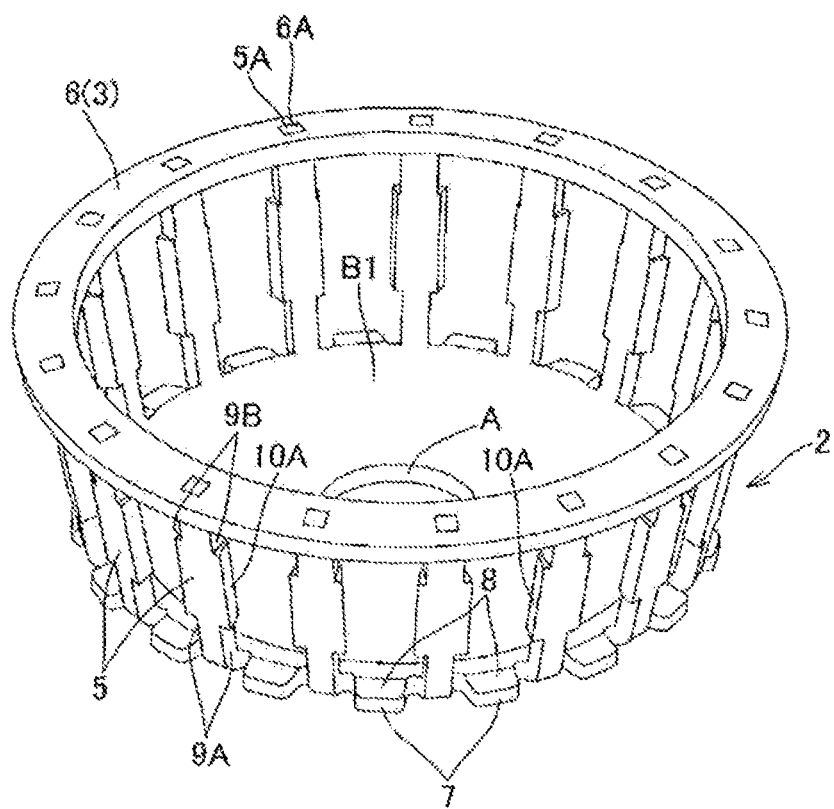
FIG. 15 is a perspective view of the two bodies processed at a tongue piece-inclined surface forming step in the same.

Next, the tongue piece-inclined surface forming step is performed on the tongue pieces 7, 7, . . . of the base body 2 integrated with the connection body 3 at the joining and fixing step to form using a press mold the inclined surfaces 8, 8, . . . shown in the perspective view of FIG. 15 to be in surface contact with the small diameter-side end surfaces T2 of the conical rollers RA, RA, . . . (refer to FIG. 1).

Figure 16:
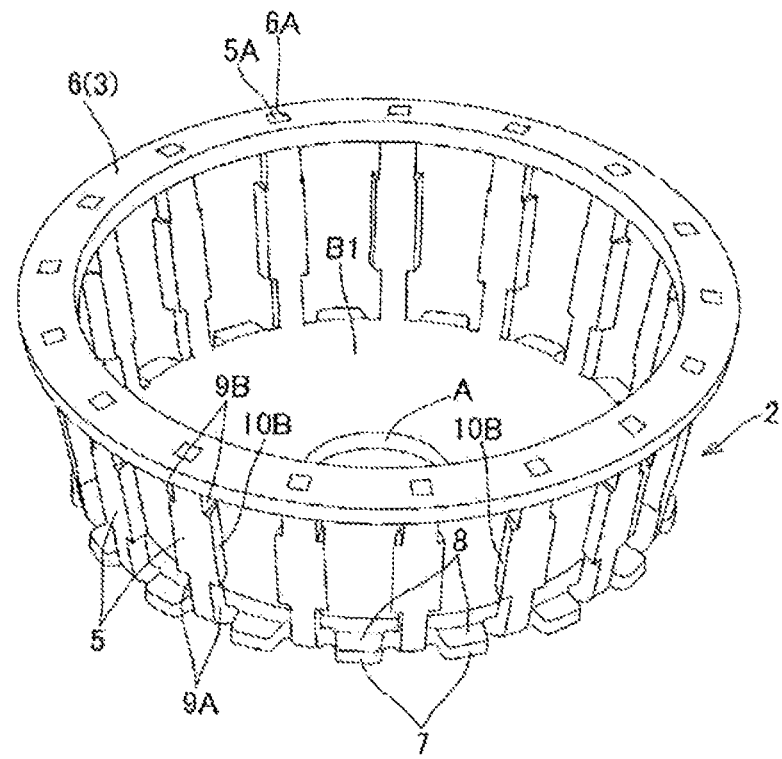
FIG. 16 is a perspective view of the two bodies processed at a finished surface pressing step in the same.

Next, after the finished surface pressing step is performed as shown in the perspective view of FIG. 16, the inner-diameter removing step is performed as shown in FIG. 10.

As in the foregoing, when the tongue piece-inclined surface forming step is performed after the joining and fixing step, it is possible to adjust length dimensions of the pocket holes P, P, . . . for storing and holding the conical rollers RA, RA, . . . .

Second Embodiment

Figure 17:
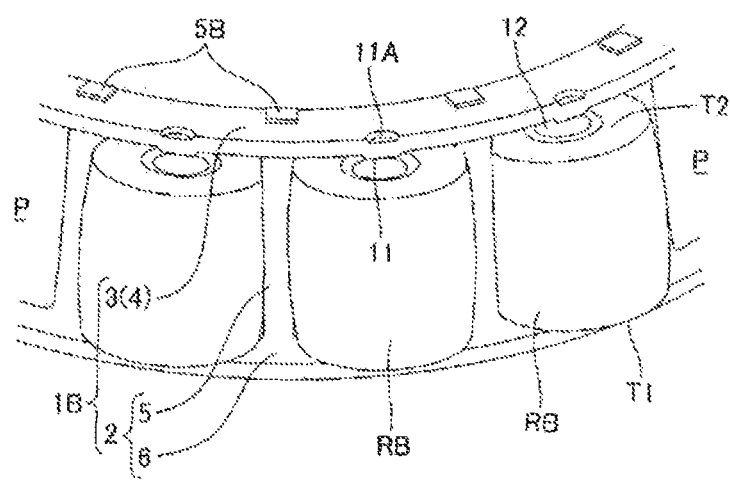
FIG. 17 is an enlarged perspective view of major components of a roller bearing cage (spherical roller bearing cage) according to a second embodiment of the present invention, in which rollers are attached to only some of pockets for convenience of illustration.

As shown in the enlarged perspective view of major components of FIG. 17 and the enlarged longitudinal sectional front view of major components of FIG. 18(a), a roller bearing cage (spherical roller bearing cage) 1B according to a second embodiment of the present invention is configured such that a pair of a small-diameter ring part 4 and a large-diameter ring part 6 axially separated from each other is connected by a plurality of column parts 5, 5, . . . sliding on outer peripheral surfaces of spherical rollers RB as rolling elements, a plurality of pocket holes P, P, . . . is evenly formed in a circumferential direction to store and hold the spherical rollers RB, RB, . . . in a peripheral wall portion, and rotation center axes G of the spherical rollers RB are located at the outer-diameter side across the column parts 5.

The spherical roller bearing cage 1B is formed by a base body 2 including the large-diameter ring part 6 and the column parts 5, 5, . . . with square columnar convexes 5A, 5A, . . . at leading ends thereof and a connection body 3 including the small-diameter ring part 4 with square holes 4A, 4A, . . . for fitting with the square columnar convexes 5A, 5A, . . . at the leading ends of the column parts 5, 5, . . . . The base body 2 and the connection body 3 are each fabricated from a steel plate such as a hot-rolled steel plate (e.g., SPHD).

The base body 2 and the connection body 3 are joined and fixed together by inserting the square columnar convexes 5A, 5A, . . . of the base body 2 into the square holes 4A, 4A, . . . of the connection body 3, and protruding leading ends of the square columnar convexes 5A, 5A, . . . from the surface of the connection body 3, and then performing a swaging process such as swing swaging on the leading ends of the square columnar convexes 5A, 5A, . . . for plastic deformation to increase the square columnar convexes 5A, 5A, . . . in diameter. The spherical roller bearing cage 1B formed by joining and fixing the base body 2 and the connection body 3 as separate members has swaged portions 5B, 5B, . . . evenly formed in the circumferential direction, which are protruded from the surface of the connection body 3 and are approximately rectangular in shape as seen from the axial direction.

Next, a manufacturing method for the spherical roller bearing cage 1B according to the second embodiment of the present invention will be described in detail.

First, processing of the base body 2 will be described.
(Base Body Blank Cutting Step)

Figure 19:
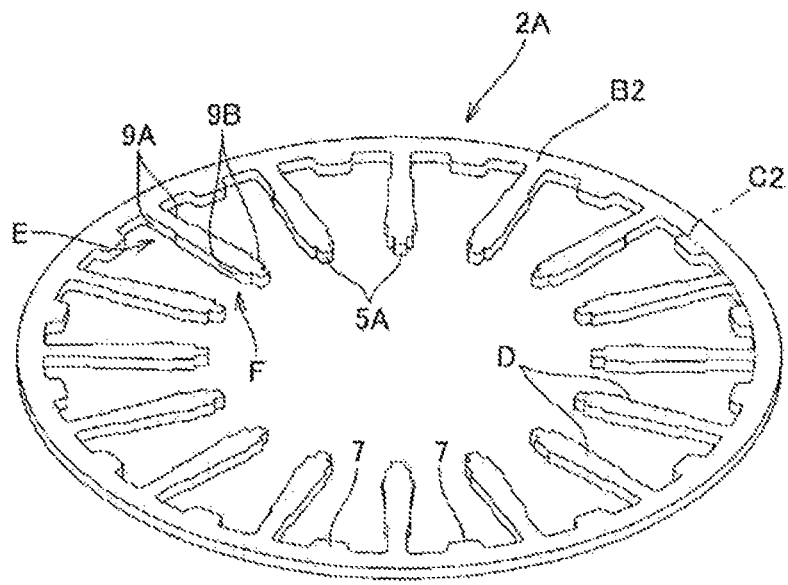
FIG. 19 is a perspective view of a base body blank processed at a base body blank cutting step.

As shown in the perspective view of FIG. 19, a base body blank cutting step is performed to obtain a base body blank 2A by cutting a steel plate through laser cutting such that portions D, D, . . . to be the column parts 5, 5, . . . are protruded inward in the radial direction from an inner peripheral portion C2 of an annular ring-shaped member B2, concaves (step-down portions) 9A, 9A concaved in circumferential front-back side surfaces are formed at base-end portion sides E of the portions D, D . . . to be the column parts 5, 5, . . . , concaves (step-down portions) 9B, 9B concaved in circumferential front-back side surfaces are formed at free-end portion sides F of the portions D, D . . . to be the column parts 5, 5, . . . , square columnar convexes 5A, 5A, . . . are formed at the leading ends of the portions D, D, . . . to be the column parts 5, 5, . . . , and tongue pieces 7 are formed to protrude inward in the radial direction between the adjacent portions D, D, . . . to be the column parts.

The foregoing cutting process is not limited to laser cutting but may be plasma cutting, wire-cut discharge machining, or the like.

Radial lengths of the concaves (step-down portions) 9A, 9A and 9B, 9B are set to be about 10 to 30% of entire longitudinal length of pocket holes P in the cage 1 having undergone a joining and fixing step described later (for example, refer to FIG. 17). The concaves (step-down portions) 9A, 9B are separated at cutting of the base body blank 2A such that the surface-pressing portions of the column parts 5 are positioned at the longitudinal centers of the pocket holes P.

Circumferential length (step-down amount) of the concaves (step-down portions) 9A at the base-end portion sides E is set so as not to contact peripheral surfaces of the spherical rollers RB, taking into account the matter that the pocket holes P become smaller in width at the small-diameter ring 4 side due to bulging of folded portions of the column parts 5 at a folding step described later. Circumferential length (step-down amount) of the concaves (step-down portions) 9B at the free-end portion sides F is set smaller than the minimum circumferential length of the finished and surface-pressed column parts 5 so as not to interfere with predetermined inclined surfaces 10B formed at a finished surface pressing step described later.

The square columnar convexes 5A at the leading ends of the portions D to be the column parts 5 are shaped such that projections are formed at circumferential center portions and seat surfaces are provided at circumferential front-back portions. The square columnar convexes 5A are approximately rectangular in shape in a plane view, but are preferably tapered taking into account ease of connection with the connection body 3 at a joining and fixing step described later.
(Rough Surface Pressing Step or Laser-Cut Inclined Surface Forming Step)

Figure 20:
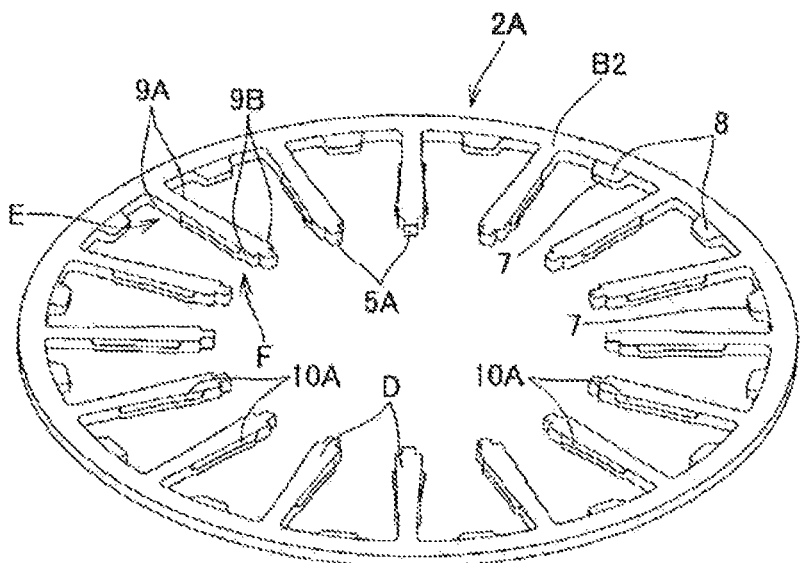
FIG. 20 is a perspective view of the base body blank processed at a rough surface pressing step.

Next, a rough surface pressing step is performed on intermediate sections between the concaves (step-down portions) 9A and 9B in the portions D to be the column parts (portions with about 40 to 80% of the entire length (radial length) of the portions D to be the column parts 5) by surface-pressing surfaces of contact with the spherical rollers RB by a surface pressing amount smaller than a final surface pressing amount (for example, about 90 to 98% of the final surface pressing amount), thereby to form predetermined inclined surfaces 10A, 10A, . . . as shown in the perspective view of FIG. 20.

Instead of the rough surface pressing step, a laser-cut inclined surface forming step may be performed to form through laser cutting inclined surfaces 10A, 10A, . . . equivalent to the inclined surfaces 10A, 10A, . . . formed at the rough surface pressing step. According to the laser-cut inclined surface forming step, the portions D to be the column parts 5 are not extended or deformed unlike in the case where the rough surface pressing step is performed using a press mold.

In the case of performing the foregoing base body blank cutting step through laser cutting, a laser processing machine capable of three-dimensional processing may be used to radiate a laser beam to a steel plate in a direction vertical to the steel plate (in a plate thickness direction) to cut the concaves (step-down portions) 9A or 9B in the portions D to be the column parts 5, and radiate a laser beam to the steel plate obliquely (from the plate thickness direction) to cut the surface pressing sections between the concaves (step-down portions) 9A and 9B at the base body blank cutting step, thereby to fabricate the base body blank 2A with the inclined surfaces 10A, 10A, . . . shown in FIG. 20.

Therefore, the base body blank 2A having undergone the foregoing base body blank cutting step and the laser-cut inclined surface forming step can be fabricated by using a laser processing machine capable of three-dimensional process at one and the same step. This makes it possible to significantly simplify the manufacturing process.
(Tongue Piece-Inclined Surface Forming Step)

As shown in FIG. 20, an inclined surface forming step is performed on the tongue pieces 7, 7, . . . of the base body blank 2A to form using a press mold inclined surfaces 8, 8, . . . to be in surface contact with large diameter-side end surfaces T1 of the spherical rollers RB, RB, . . . (refer to FIGS. 17 and 18(a)).
(Folding Step)

Figure 21:
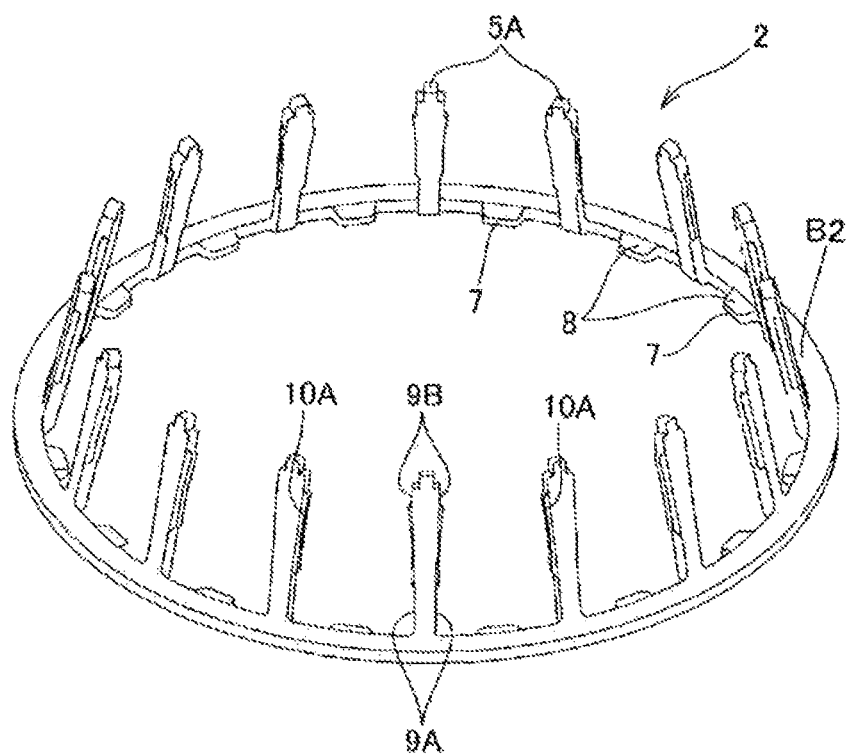
FIG. 21 is a perspective view of the base body blank processed at a folding step.

Next, a folding step is performed on the base body blank 2A to fold using a drawing mold the portions D, D, . . . to be the column parts along the inner peripheral portion C2 of the annular ring-shaped member B2, as shown in the perspective view of FIG. 21.

Next, processing of the connection body 3 will be described.

(Connection Body Blank Cutting Step)

Figure 22:
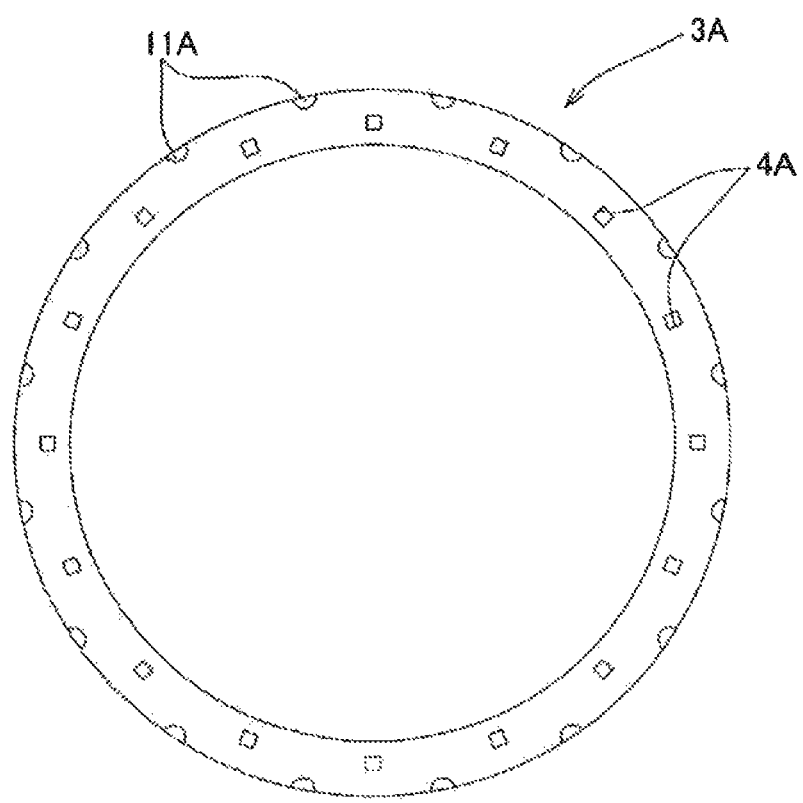
FIG. 22 is a plane view of a connection body blank processed at a connection body blank cutting step and a retaining projection forming step.

A connection body blank cutting step is performed to obtain a connection body blank 3A by cutting a steel plate through laser cutting to form a horizontal annular ring part extending in the radial direction and having the square holes 4A, 4A, . . . formed evenly in the circumferential direction for fitting with the square columnar convexes 5A, 5A, . . . , as shown in the plane view of FIG. 22.

The foregoing cutting process is not limited to laser cutting but may be plasma cutting, wire-cut discharge machining, or the like.

(Retaining Projection Forming Step)

Next, a retaining projection forming step is performed such that press surfaces 11A, 11A, . . . at the outer peripheral portion of the connection body blank 3A are evenly pressed in the circumferential direction as shown in the plane view of FIG. 22 to form retaining projections 11, 11, . . . to be inserted into retaining concaves 12, 12, . . . in the small diameter-side end surfaces T2, T2, . . . of the spherical rollers RB, RB, . . . shown in FIGS. 17 and 18(a).

Such retaining projections may be formed at the large-diameter ring part 6 of the base body 2. In that case, the retaining projection forming step may be performed between the base blank cutting step and the folding step, for example, such that the large-diameter ring part 6 are pressed at predetermined places to form the retaining projections to be inserted into the retaining concaves in the large diameter-side end surfaces T1, T1, . . . of the spherical rollers RB, RB, . . . .

(Shaping Step)

Figure 23:
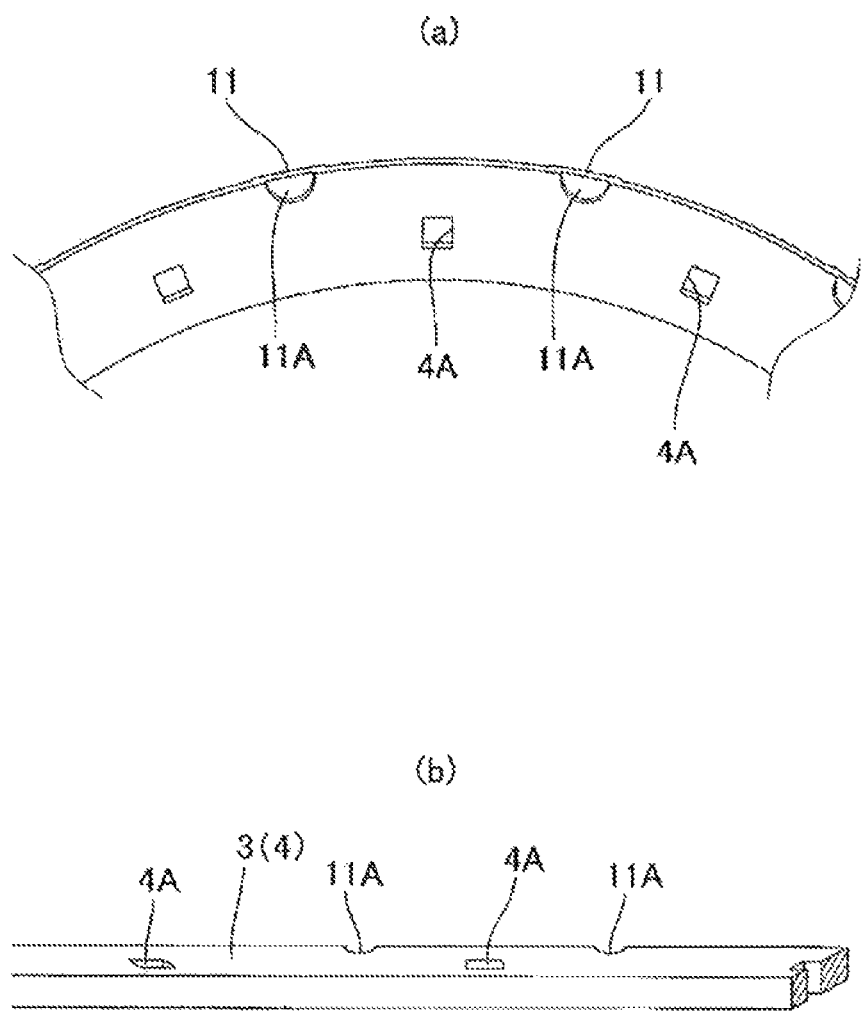
FIG. 23(a) is an enlarged plane view of major components of the connection body blank processed at a shaping step.
FIG. 23(b) is an enlarged cross-section view of major components of the connection body blank processed at the shaping step, taken along a plane including a radial direction and an axial direction.

Next, a shaping step is performed to shape the connection body blank 3A by a press process or roll process into a disc-spring shape low at an inner-diameter part and high at an outer-diameter part as shown in the enlarged plane view of major components of FIG. 23(a) and the enlarged cross-section view of major components of FIG. 23(b) so as to be orthogonal to the column parts 5, 5, . . . of the base body 2 shown in FIGS. 17 and 18(a) (so as to be in surface contact with the small diameter-side end surfaces T2 of the spherical rollers RB, RB, . . . ), thereby to obtain the connection body 3.

Next, integration of the base body 2 and the connection body 3 will be described.

(Joining and Fixing Step)

Figure 24:
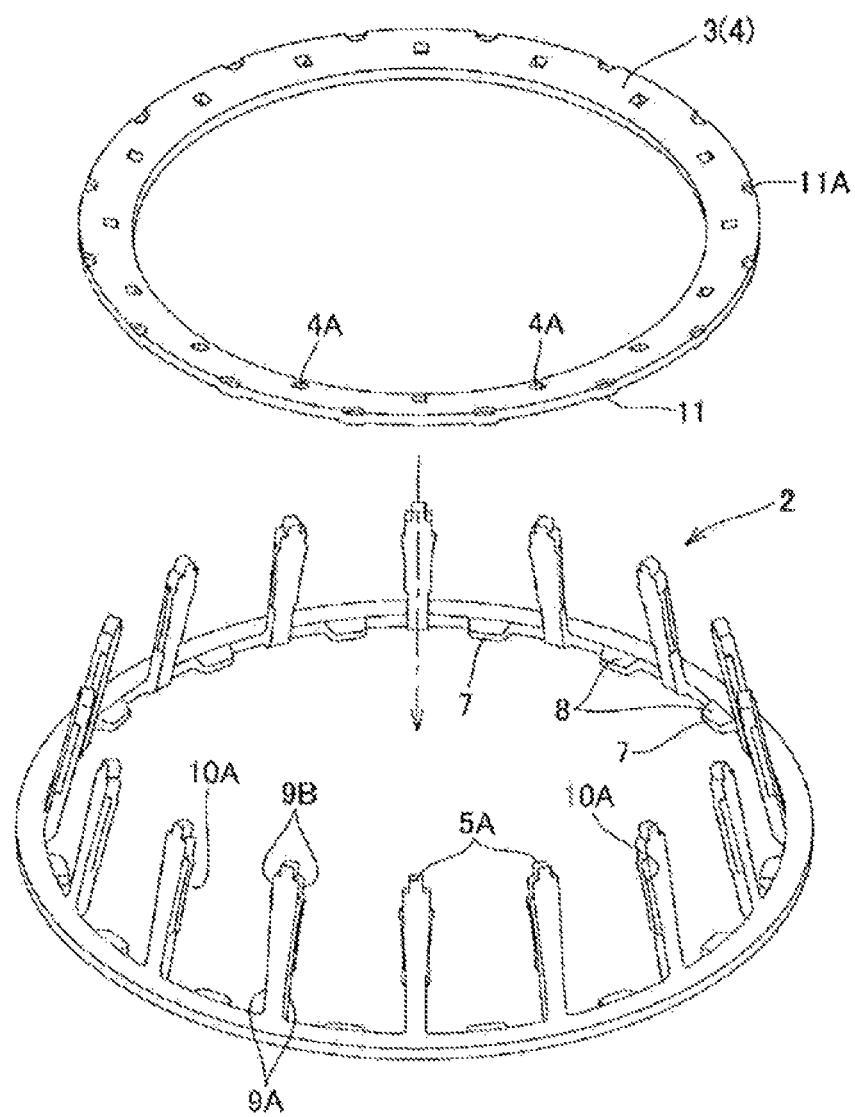
FIG. 24 is a perspective diagram showing a joining and fixing step.

A joining and fixing step is performed to integrate the base body 2 and the connection body 3 such that the square columnar convexes 5A, 5A, . . . of the base body 2 shown in the perspective diagram of FIG. 24 having undergone the base body blank cutting step, the rough surface pressing step or laser-cut inclined surface forming step, the tongue piece-inclined surface forming step, and the folding step are inserted into the square holes 4A, 4A, . . . of the connection body 3 shown in the perspective diagram of FIG. 24 having undergone the connection body blank cutting step, the retaining projection forming step, and the shaping step, and in that state, protruding leading ends of the square columnar convexes 5A, 5A, . . . from the surface of the connection body 3, and then performing a swaging process such as swing swaging on the leading ends of the square columnar convexes 5A, 5A, . . . for plastic deformation to increase the square columnar convexes 5A, 5A, . . . in diameter, thereby joining and fixing the base body 2 and the connection body 3.

The joining and fixing step may not be performed by a swaging process but may be performed by welding such as laser welding or spot welding.

In addition, the joining and fixing step may be intended to join and fix together the base body 2 and the connection body 3 by tightening. In that case, for example, screw portions 5C, 5C, . . . are formed at the square columnar convexes 5A, 5A, . . . formed at the base body blank cutting step, and, instead of the square holes 4A, 4A, . . . , round holes 4B, 4B, . . . are formed at the connection body blank cutting step, and the screw portions 5C, 5C, . . . are inserted into the round holes 4B, 4B, . . . and protruded from the surface of the connection body 3, and then metal washers 13 are externally fitted to the screw portions 5C, 50C to screw nuts 14, as shown in FIG. 18(b), whereby the base body 2 and the connection body 3 are integrated.

Next, processing of the base body 2 after the integration of the base body 2 and the connection body 3 will be described.

(Finished Surface Pressing Step)

Figure 25:
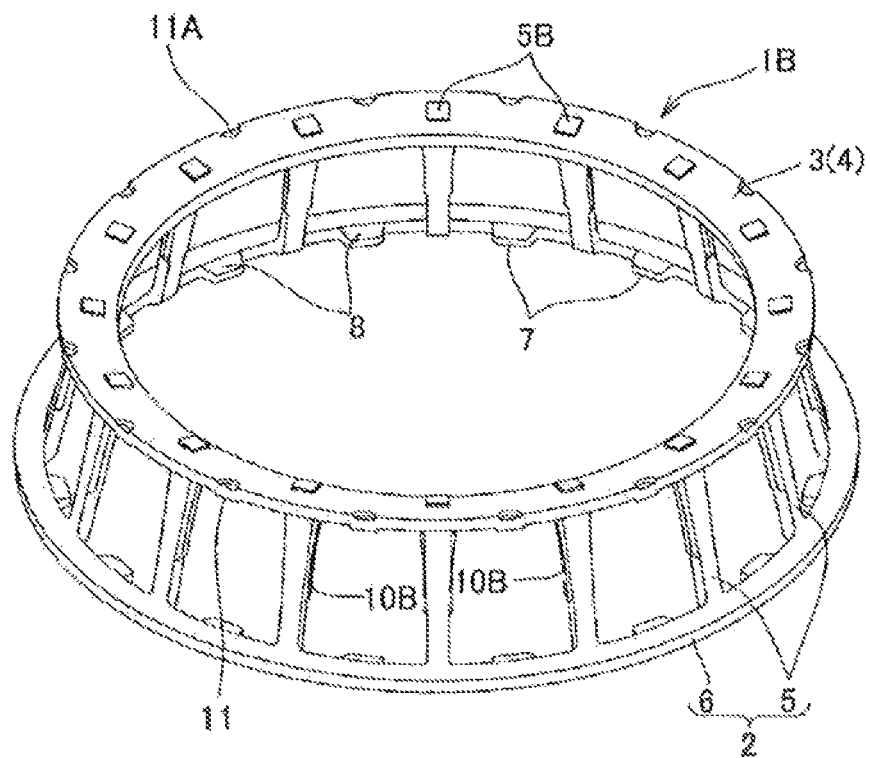
FIG. 25 is a perspective view of the two bodies processed at a finished surface pressing step.

A finished surface pressing step is performed on each of the column parts 5, 5, . . . by surface-pressing using a press mold the surfaces of contact with the spherical rollers RB by the final surface pressing amount, thereby completing the predetermined inclined surfaces 10B, 10B, . . . as shown in the perspective view of FIG. 25.

As in the foregoing, the inclined surfaces 10A, 10A, . . . shown in FIG. 20 are formed at the portions D, D, . . . to be the column parts 5, 5, . . . in the state of the base body blank 2A shown in FIG. 19 at the rough surface pressing step or the laser-cut inclined surface forming step, and the predetermined inclined surfaces 10B, 10B, . . . shown in FIG. 25 are formed by surface-pressing the inclined surfaces 10A, 10A, . . . in the column parts 5, 5, . . . having undergone the folding step and the joining and fixing step for joining and fixing with the connection body 3 by the remaining pressing amount at the finished surface pressing step, which allows fine-adjustment of dimension accuracy and thus facilitates acquisition of the predetermined dimension accuracy.

In addition, in the case of forming the inclined surfaces 10A, 10A, . . . through laser cutting, even if the inclined surfaces 10A, 10A, . . . are rough, favorable surface press surfaces can be formed in the column parts 5, 5, . . . by transferring the smooth surfaces of a press mold to the rough surfaces of the inclined surfaces 10A, 10A, . . . at the finished surface pressing step.

In the example of the manufacturing method for the spherical roller bearing cage 1B described above, the tongue piece-inclined surface forming step for forming the inclined surfaces 8, 8, . . . in the tongue pieces 7, 7, . . . is performed between the rough surface pressing step or the laser-cut inclined surface forming step and the folding step. Alternatively, the tongue piece-inclined surface forming step may be performed after the base body blank cutting step, after the folding step, after the joining and fixing step, or after the finished surface pressing step.

In addition, in the example of the manufacturing method for the spherical roller bearing cage 1B described above, the base body blank 2A is subjected to the rough surface pressing step to surface-press the surfaces of contact with the spherical rollers RB in the portions D to be the column parts by the surface pressing amount smaller than the final surface pressing amount, or the laser-cut inclined surface forming step to form through laser cutting the inclined surfaces 10A equivalent to the inclined surfaces 10A formed at the rough surface pressing step, and then the base body 2 integrated with the connection body 3 at the joining and fixing step is subjected to the finished surface pressing step to surface-press the surfaces of contact with the spherical rollers RB in the column parts 5 by the final surface pressing amount, thereby forming the predetermined inclined surfaces 10B. Alternatively, the base body 2 integrated with the connection body 3 at the joining and fixing step may not be subjected to the finished surface pressing step, but the base body blank 2A may be subjected to the surface pressing step to surface-press the surfaces of contact with the spherical rollers RB in the portions D to be the column parts 5 by the final surface pressing amount from the beginning, or the laser-cut inclined surface forming step to form through laser cutting the inclined surfaces 10B equivalent to the predetermined inclined surfaces 10B surface-pressed by the final surface pressing amount from the beginning.

According to the embodiment configured such that the surface pressing step is performed to surface-press the surfaces by the final surface pressing amount from the beginning or the laser-cut inclined surface forming step is performed to form the inclined surfaces 10B through laser cutting, the joining and fixing step is performed after the spherical rollers RB, RB, . . . are incorporated into the base body 2, which eliminates the need to perform a swaging step or the like to decrease the diameter of the cage 1B after the spherical rollers RB, RB, . . . are incorporated into the cage 1B. This makes it possible to improve dimension accuracy and reduce manufacturing costs.

Figure 18:
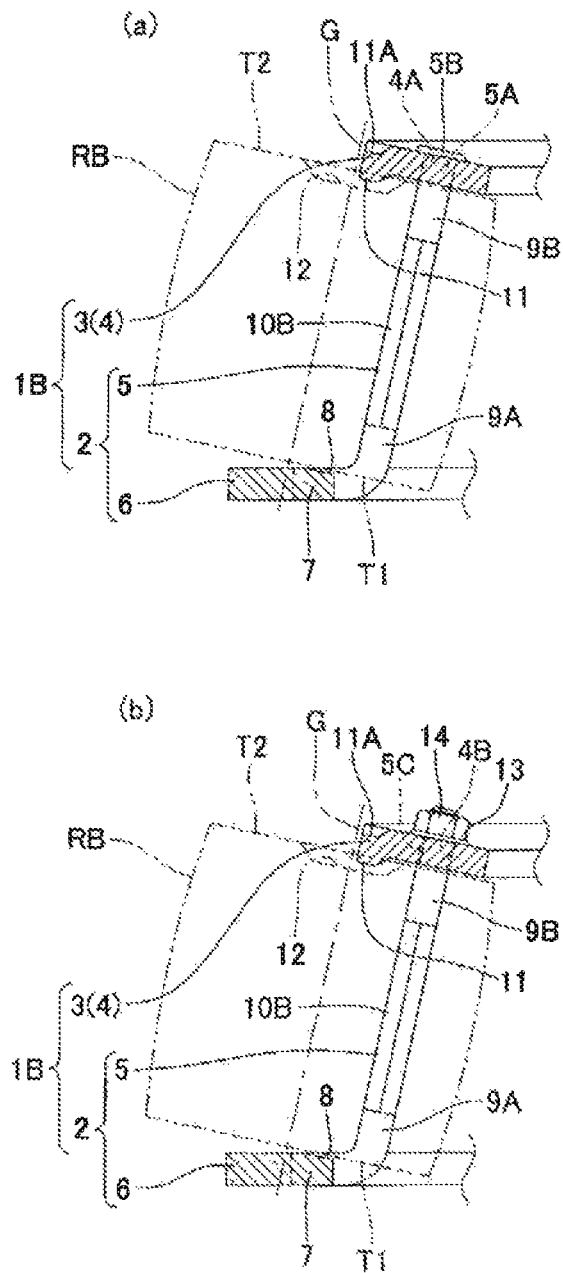
FIG. 18 is an enlarged longitudinal sectional front view of major components in the same.

In particular, in the case where the joining and fixing step for integrating the base body 2 and the connection body 3 is performed to join and fix the base body 2 and the connection body 3 by a swaging process as shown in FIG. 18(*a*) or join and fix the base body 2 and the connection body 3 by tightening as shown in FIG. 18(*b*), there is no occurrence of spatters unlike in the case where the base body 2 and the connection body 3 are joined and fixed together by welding joint. Accordingly, even if the joining and fixing step is performed to join and fix the base body 2 and the connection body 3 after the step for incorporating the spherical rollers RB, RB, . . . into the pocket holes P, P, . . . of the base body 2 (refer to FIG. 17) is performed, and the step for assembling the spherical rollers RB, RB, . . . in the base body 2 into the inner ring of the spherical roller bearing, and then the spherical rollers RB, RB, . . . , and the inner ring of the spherical roller bearing are set to the base body 2, no spatters adhere to the spherical rollers RB, RB, . . . or the inner ring, and thus no adverse influence is exerted on the lifetime of the spherical roller bearing.

In addition, for a supersized spherical roller bearing using a supersized cage, in particular, there is no need to perform a bottom spreading process on the cage 1B using a supersized bottom spreading mold for setting of the spherical rollers RB, RB, . . . nor to perform a swaging process on the column parts 5, 5, . . . using a supersized swaging mold after the inner ring is assembled into the cage 1B storing the spherical rollers RB, RB, . . . , unlike in the case where the spherical rollers RB, RB, . . . are set into the spherical roller bearing cage 1B after the joining and fixing of the base body 2 and connection body 3. This makes it possible to significantly reduce manufacturing costs.

Third Embodiment

Figure 26:
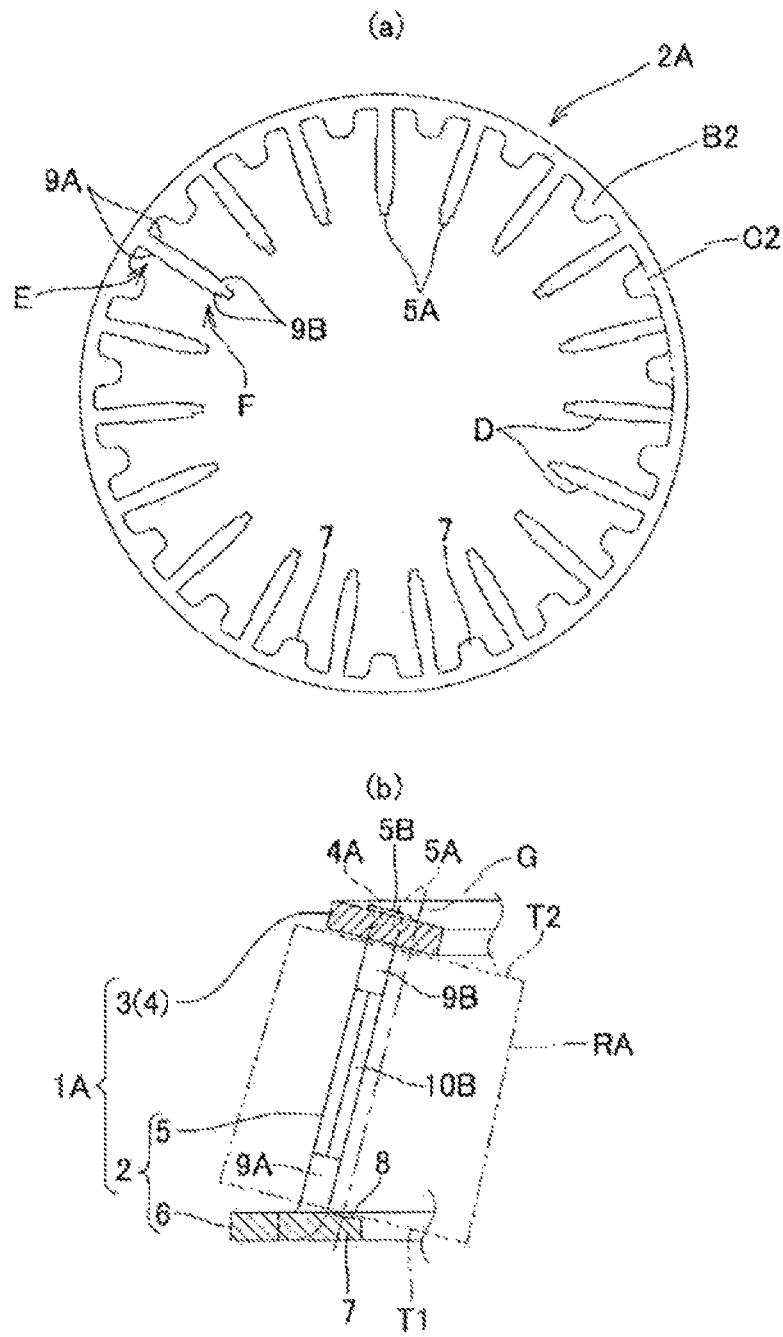
FIG. 26 shows a roller bearing cage (conical roller bearing cage) according to a third embodiment of the present invention.

As shown in the plane view of the base body blank of FIG. 26(*a*) and the enlarged longitudinal sectional front view of major components of FIG. 26(*b*), a roller bearing cage (conical roller bearing cage) 1A according to a third embodiment of the present invention is configured such that a pair of a large-diameter ring part 6 and a small-diameter ring part 4 axially separated from each other is connected by a plurality of column parts 5, 5, . . . sliding on outer peripheral surfaces of conical rollers RA as rolling elements, and a plurality of pocket holes P, P, . . . is evenly formed in a circumferential direction to store and hold the conical rollers RA, RA, . . . in a peripheral wall portion, and rotation center axes G of the conical rollers RA are located at the inner-diameter side across the column parts 5.

In the third embodiment, the same reference numerals as those in the second embodiment shown in FIGS. 17 to 25 indicate components identical or equivalent to those in the second embodiment. The conical roller bearing cage 1A in the third embodiment can be manufactured according to the same manufacturing process as that for the spherical roller bearing cage 1B in the second embodiment.

However, unlike in the case of the spherical roller bearing cage 1B in the second embodiment, there is no need to perform a retaining projection forming step for the conical roller bearing cage 1A in the third embodiment.

As in the second embodiment, according to the third embodiment configured such that the surface pressing step is performed on the base body blank 2A to surface-press the surfaces of contact with the conical rollers RA in the portions D to be the column parts 5 by the final surface pressing amount from the beginning or the laser-cut inclined surface forming step is performed on the base body blank 2A to form through laser cutting the inclined surfaces 10B equivalent to the predetermined inclined surfaces 10B surface-pressed by the final surface pressing amount from the beginning, the joining and fixing step is performed to join and fix the base body 2 and the connection body 3 after the conical rollers RA, RA, . . . are incorporated into the base body 2. This eliminates the need to perform the swaging process or the like to decrease the diameter of the cage 1A after the conical rollers RA, RA, . . . are assembled into the cage 1A, which makes it possible to improve dimension accuracy and reduce manufacturing costs.

Further, in the case where the joining and fixing step for integrating the base body 2 and the connection body 3 is performed to join and fix the base body 2 and the connection body 3 by a swaging process or by tightening, the joining and fixing step can be performed after the conical rollers RA, RA, . . . and the inner ring of the conical roller bearing are set to the base body 2, thereby producing the same advantages as those in the second embodiment described above.

The foregoing configurations of the spherical roller bearing cage 1B in the second embodiment and the conical roller bearing cage 1A in the third embodiment produce the same advantages as those in the first embodiment.

Since the column parts 5, 5, . . . of the base body 2 are formed by folding along the inner peripheral portion C2 of the large-diameter ring part 6 (annular ring-shaped member B2), the base body blank 2A formed by cutting a steel plate is smaller in size than the base body blank 2A with the column parts 5, 5, . . . of the base body 2 formed by folding along the outer peripheral portion C1 of the small-diameter ring part 4 (disc-shaped member B1) as in the first embodiment, thereby reducing material costs.

Further, in the spherical roller bearing cage 1B of the second embodiment, the small-diameter ring part 4 constitutes the connection body 3. Thus, when the base body 2 and the connection body 3 are joined and fixed together in the state where the square columnar convexes 5A, 5A, . . . of the base body 2 are fitted into the square holes 4A, 4A, . . . of the connection body 3, the large-diameter ring part 6 has no joined and fixed part. Accordingly, in two spherical roller bearing cages 1B, 1B with their large-diameter ring parts 6, 6 butted back to back, the joined and fixed parts do not interfere with the use of the cages 1B, 1B. Therefore, even if the joined and fixed parts include projections such as the swaged portions 5B, 5B, . . . , there is no need for removing such projections.

Moreover, in the spherical roller bearing cage 1B of the second embodiment, the large-diameter ring part 6 of the base body 2 or the small-diameter ring part 4 of the connection body 3 can be provided with retaining projections to be inserted into the retaining concaves in the end surfaces T1, T2 of the spherical rollers RB, RB, . . . , thereby to retain the spherical rollers RB, RB, . . . in an easy and reliable manner.

Fourth Embodiment

Figure 27:
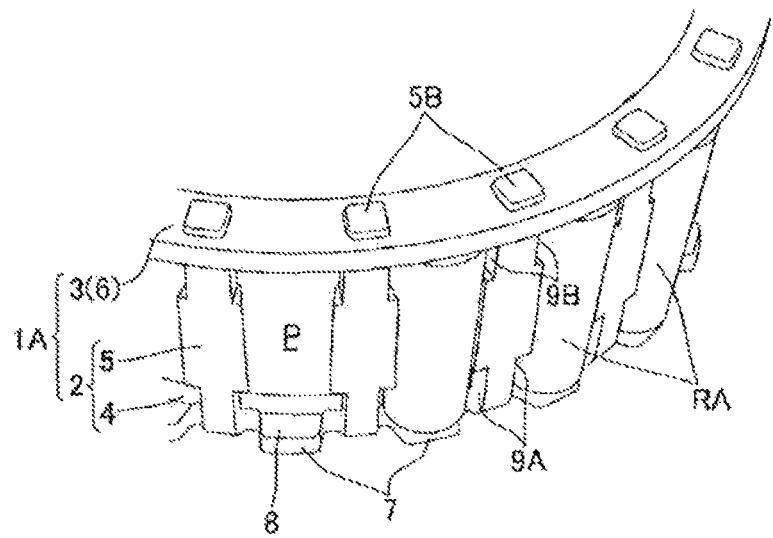
FIG. 27 is an enlarged perspective view of major components of a roller bearing cage (conical roller bearing cage) according to a fourth embodiment of the present invention, in which rollers are attached to only some of pockets for convenience of illustration.

As shown in the enlarged perspective view of major components of FIG. 27, a roller bearing cage (conical roller bearing cage) 1A according to a fourth embodiment of the present invention is configured such that a pair of a small-diameter ring part 4 and a large-diameter ring part 6 axially separated from each other is connected by a plurality of column parts 5, 5, . . . sliding on outer peripheral surfaces of conical rollers RA as rolling elements, and a plurality of pocket holes P, P, . . . is evenly formed in a circumferential direction to store and hold the conical rollers RA, RA, . . . in a peripheral wall portion.

The conical roller bearing cage 1A is formed by a base body 2 including the small-diameter ring part 4 and the column parts 5, 5, . . . with square columnar convexes 5A, 5A, . . . at leading ends thereof, and a connection body 3 including a large-diameter ring part 6 with square holes 6A, 6A, . . . for fitting with the square columnar convexes 5A, 5A, . . . at the leading ends of the column parts 5, 5, . . . . The base body 2 and the connection body 3 are each fabricated from a steel plate such as a hot-rolled steel plate (e.g., SPHD).

The base body 2 and the connection body 3 are joined and fixed together as shown in the perspective view of FIG. 30 by inserting the square columnar convexes 5A, 5A, . . . of the base body 2 into the square holes 6A, 6A, . . . of the connection body 3, and protruding leading ends of the square columnar convexes 5A, 5A, . . . from the surface of the connection body 3, and then performing a swing swaging process described later on the leading ends of the square columnar convexes 5A, 5A, . . . for plastic deformation to increase the square columnar convexes 5A, 5A, . . . in diameter. The conical roller bearing cage 1A has swaged portions 5B, 5B, . . . evenly formed in the circumferential direction, which are protruded from the surface of the connection body 3 and are approximately rectangular in shape as seen from the axial direction.

Next, a manufacturing method for the conical roller bearing cage 1A according to the fourth embodiment of the present invention will be described in detail. In the fourth embodiment, components with the same reference numerals in FIGS. 27 to 30 as those in the first embodiment shown in FIGS. 1 to 10 indicate components identical or equivalent to those in the first embodiment.

First, as in the first embodiment, the base body blank cutting step shown in FIG. 2, the rough surface pressing step or the laser-cut inclined surface forming step and the tongue piece-inclined surface forming step shown in FIG. 4, and the folding step shown in FIG. 5 are performed.

Figure 28:
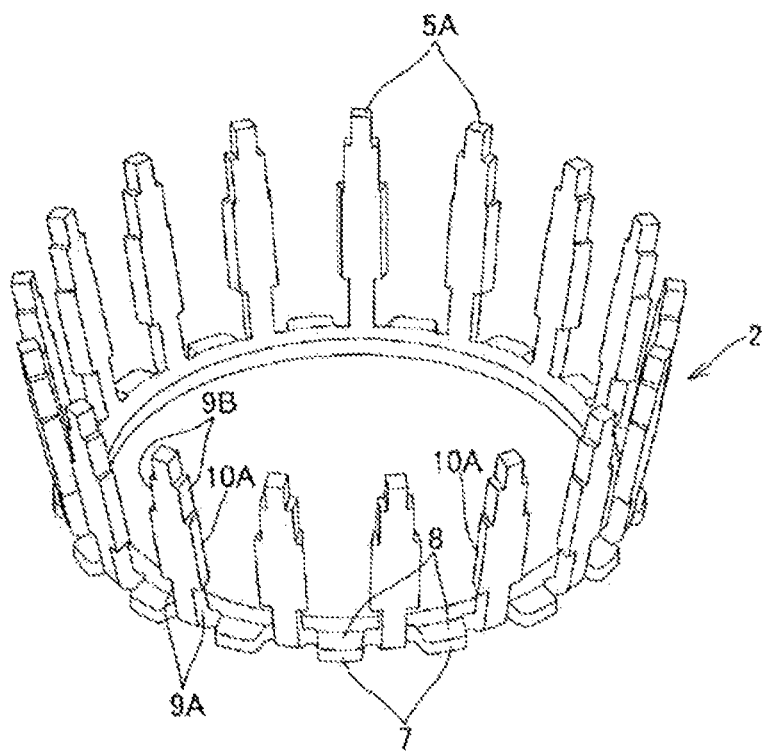
FIG. 28 is a perspective view of a base body processed at an innerdiameter removing step.

Next, an inner-diameter removing step is performed to remove an excessive thick portion of the inner-diameter part of the disc-shaped member B1 by a turning process, a laser cutting process, a press process, or the like so as to meet a predetermined inner diameter, as shown in the perspective view of FIG. 28.

Figure 29:
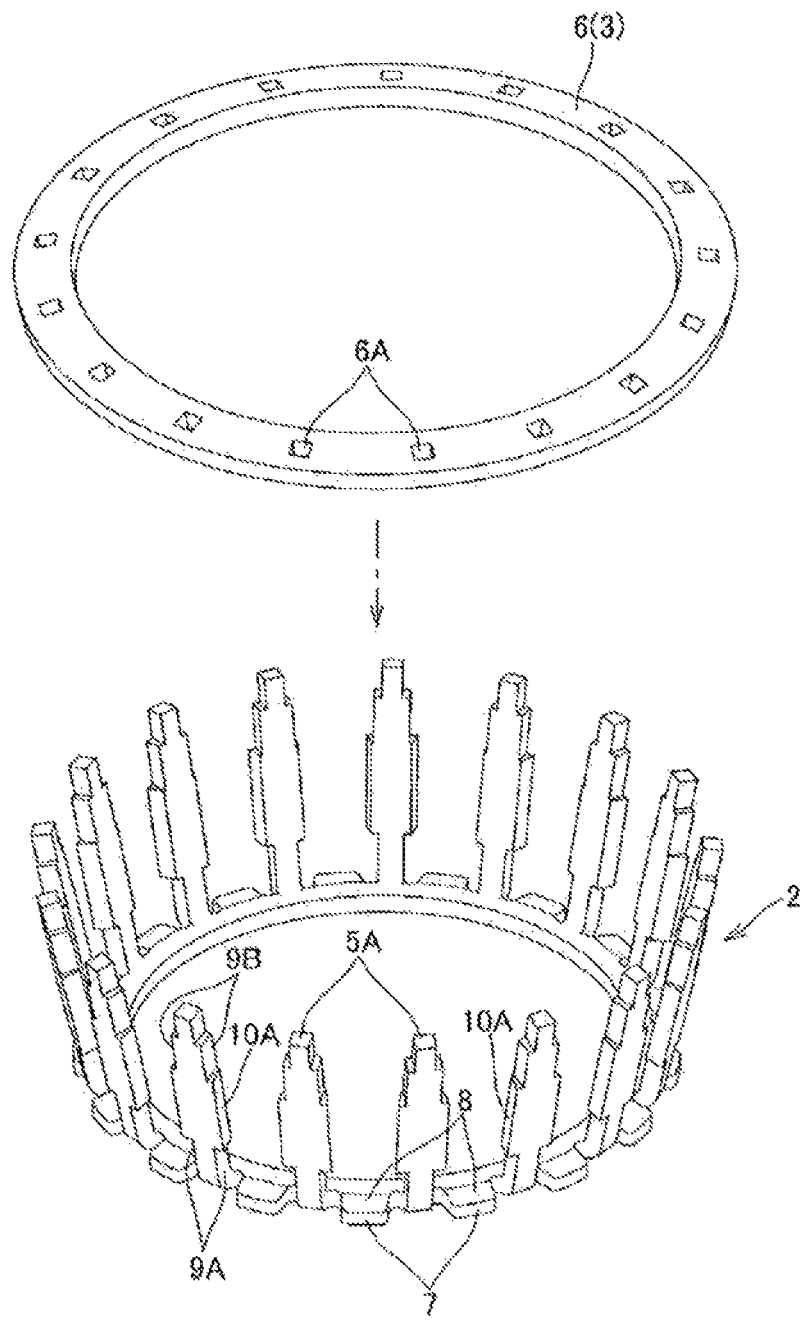
FIG. 29 is a perspective diagram showing a joining and fixing step.
Figure 30:
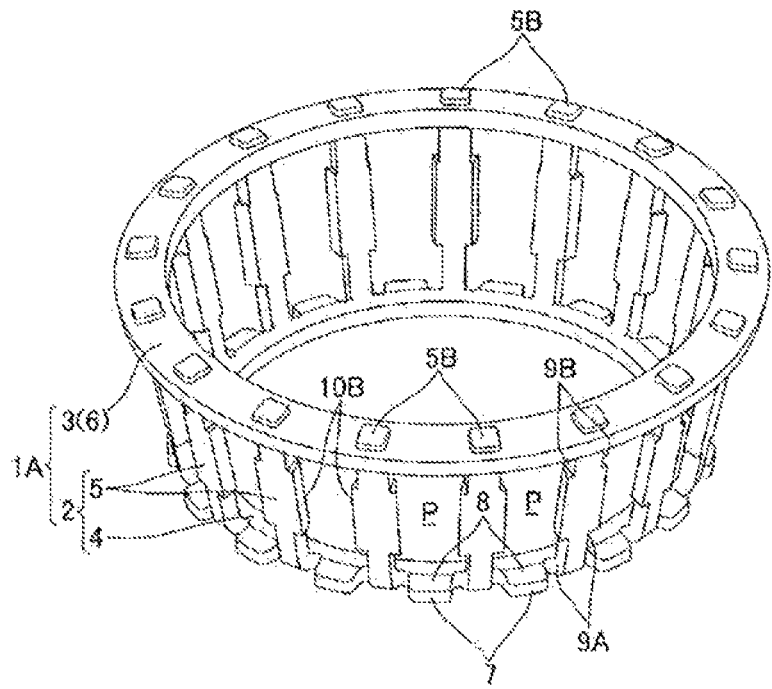
FIG. 30 is a perspective view of the two bodies processed at a finished surface pressing step after the fixing and joining step.

Next, as in the first embodiment, the connection body 3 having undergone the connection body blank cutting step shown in FIG. 6 and the shaping step shown in FIG. 7 is integrated with the base body 2 at the joining and fixing step shown in the perspective diagram of FIG. 29, and then the finished surface pressing step shown in FIG. 30 is performed.

Next, the swing swaging process for use at the joining and fixing step will be described in detail.

(Shape of Square Columnar Convexes)

Figure 31:
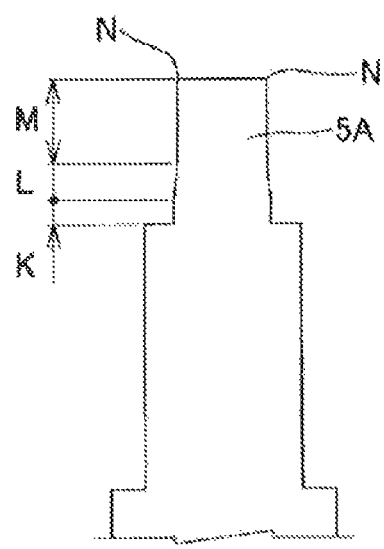
FIG. 31 is an enlarged front view of major components around a square columnar convex at a leading end of a column part.

As shown in the enlarged front view of major components of FIG. 31, free-fit portions (refer to radial length M of the free-fit portions) to be freely fitted into the square holes 6A of the connection body 3 are formed at the leading end-side portions of the square columnar convexes 5A, and press-fit portions (refer to radial length K of the press-fit portions) to be press-fitted into the square holes 6A of the connection body 3 are formed at the base end-side portions of the square columnar convexes 5A on the both circumferential side surfaces. On the both circumferential side surfaces of the square columnar convexes 5A, the free-fit portions and the press-fit portions are connected by introduction portions (refer to radial length L of the introduction potions) as inclined surfaces. Chamfered portions N are formed all around edge portions of the leading ends of the square columnar convexes 5A for easy insertion into the square holes 6A, 6A, . . . of the large diameter ring part 6.

The press-fit portions and the introduction portions are to be formed on the both circumferential side surfaces. Thus, these portions can be easily formed at formation of the base body blank 2A shown in FIG. 2 by cutting a steel plate at the base body blank cutting step.

Figure 32:
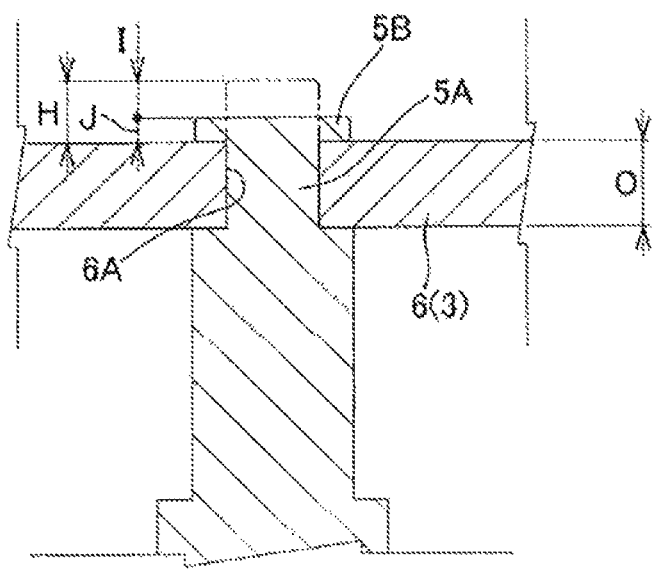
FIG. 32 is an enlarged longitudinal sectional front view of major components around a swaged portion after the joining and fixing step.

The radial length K of the press-fit portions is set to about ⅕ to ½ of thickness O of the large-diameter ring part 6 shown in the enlarged longitudinal sectional front view of major components of FIG. 32, and a press-fit margin on one side of the press-fit portion is set to about 0.05 mm.

By providing the press-fit portions to be press-fitted into the square holes 6A of the connection body 3 at the base end-side portions on the both circumferential side surfaces of the square columnar convexes 5A of the base body 2, the press-fit portions can be press-fitted into the square holes 6A of the connection body 3 to join and fix the base body 2 and the connection body 3 firmly in the circumferential direction, in particular.

Therefore, it is possible to suppress a circumferential position shift of the column parts 5 caused by a circumferential force acting on the column parts 5 during rotation of the conical roller bearing, and thus maintain accuracy over a long period of time.

(Setting of Protrusion Height)

As shown in FIG. 32, when the swing swaging process is performed on the column part 5 from the two-dot chain line to the solid line, the material of a swage margin I plastically flows to the surrounding region to form the flange portion.

Therefore, the volume of the crushed swage margin I and the volume of the flange portion are equal. Accordingly, by setting in advance thickness J of the swaged portion (flange portion) and the area of the flange portion, protrusion height H from the large-diameter ring 6 can be determined by volume calculation.

(Swing Swaging Process)

Figure 34:
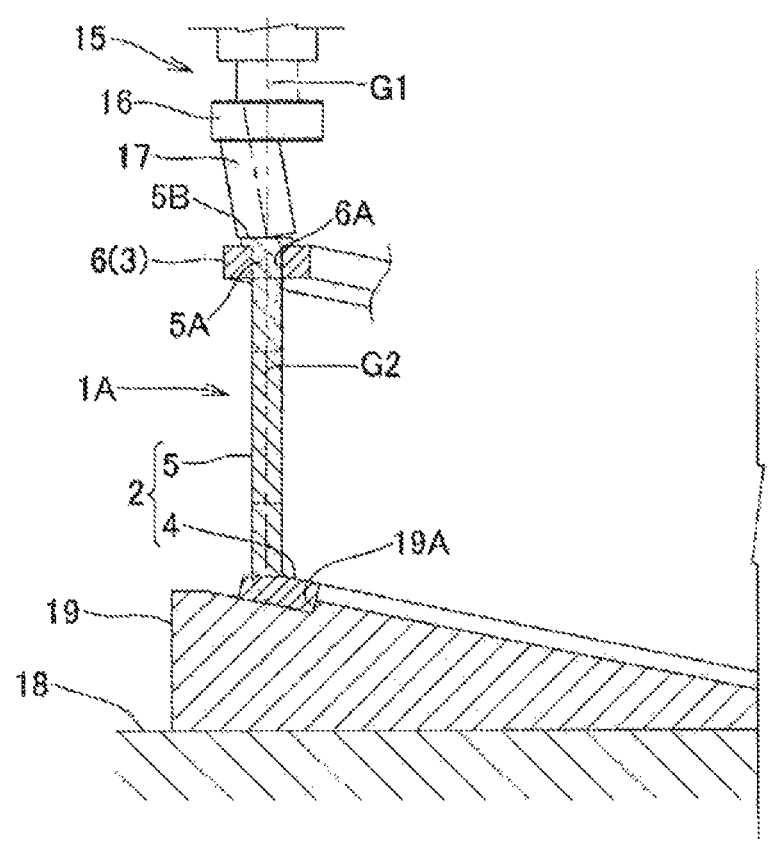
FIG. 34 is a partial longitudinal sectional view of a configuration of an inclination stage and the like for use at the swing swaging process.

As shown in the partial longitudinal sectional view of FIG. 34, an inclination stage 19 inclined at a predetermined angle is placed on a table 18 of a swaging machine 15. The small-diameter ring part 4 of the base body 2 is externally fitted to a circular positioning step portion 19A, and while the small-diameter ring part 4 is set along the positioning step portion 19A, the small-diameter ring part 4 is rotatably supported around an inclination axis of the inclination stage 19 and is positioned such that a rotation axis center G1 of the swaging machine 15 agrees with an axis center G2 of the column part 5 of the conical roller bearing cage 1A.

Figure 33:
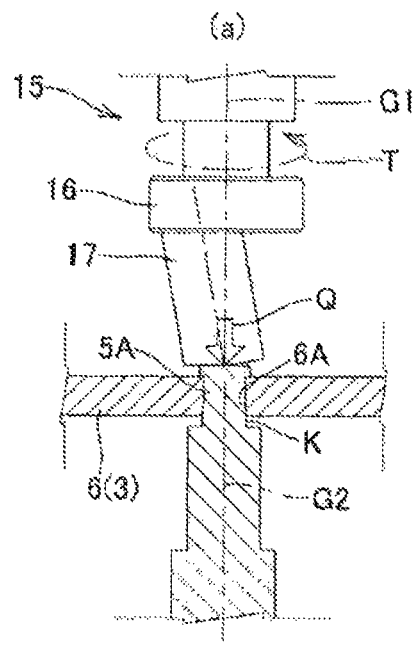
FIG. 33 is a partial longitudinal sectional front diagram showing a swing swaging process for use at the joining and fixing step.
Figure 33:
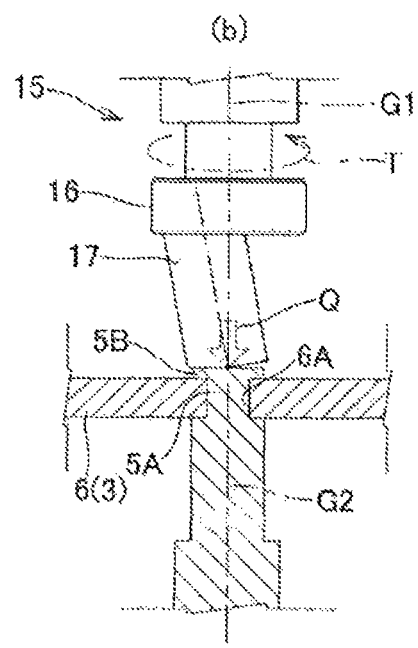

In this state, as shown in the partial longitudinal sectional front view of FIG. 33, a leading end of a swing swaging jig (swing swaging punch) 17 held in an inclined state with respect to a head part 16 of the swaging machine 15, that is, a conical press surface with a large apex angle is brought into contact with the leading end (upper surface) of the square columnar convex 5A of the column part 5, and the head part 16 is rotated by torque T of the motor with application of downward thrust force Q from a hydraulic cylinder.

By the swing swaging process described above, the leading end portion of the square columnar convex 5A pressed by the swing swaging jig 17 is plastically deformed to form the flange portion, and, through an in-process state as shown in FIG. 33(a), the swing swaging process is completed as shown in FIG. 33(b).

In addition, the small-diameter ring part 4 rotatably supported around the inclination axis of the inclination stage 19 shown in FIG. 34 is rotated and positioned such that the axis center G2 of the column part 5 to be next subjected to the swing swaging process agrees with the rotation axis center G1 of the swaging machine 15. In this manner, the swing swaging process is performed in sequence on the leading ends of the square columnar convexes 5A, 5A, . . . of the column parts 5, 5, . . . .

According to the joining and fixing step by the swing swaging process, the column part 5 is processed while the press surface of the swing swaging jig 17 is constantly contact with the leading end (upper surface) of the square columnar convex 5A of the column part 5, and thus no shock load is applied to the column part 5.

In the example of the swing swaging process shown in FIGS. 33 and 34, the conical swing swaging jig 17 having the press surface with the large apex angle is used to perform the swing swaging process such that the swaged portions 5B have flat heads (also refer to FIG. 32). Alternatively, a swing swaging jig 17 having a press surface of another shape such as a concave sphere may be used to perform the swing swaging process such that the swaged portions 5B have heads of another shape such as pan heads.

In addition, the square columnar convexes 5A have the press-fit portions (refer to the radial length K of the press-fit portions) as described above, and thus the press-fit portions of the square columnar convexes 5A need to be press-fitted into the square holes 6A of the large-diameter ring 6. The press-fitting step is performed by the means of the downward thrust force Q from the hydraulic cylinder of the swing swaging machine 15 in the course of the swing swaging step as shown in FIGS. 33(a) and 33(b).

The press-fitting step may be performed separately from the swing swaging step. However, the press-fitting step can be performed concurrently with the swing swaging step to simplify the manufacturing process and improve productivity.

Since the base body 2 and the connection body 3 are joined and fixed together by the swing swaging process, no spatters occur unlike in the case where the base body 2 and the connection body 3 are joined and fixed together by welding joint. Accordingly, even if the base body 2 and the connection body 3 are joined and fixed together by the swing swaging process in the state where the conical rollers RA, RA, . . . and the inner ring S of the bearing are set into the base body 2 as shown in the partial longitudinal sectional view of FIG. 35, no spatters adhere to the conical rollers RA, RA, . . . or the inner ring S and thus no adverse influence is exerted on the lifetime of the roller bearing.

Accordingly, for a supersized cage in particular, the base body 2 and the connection body 3 can be joined and fixed together by the swing swaging process after the conical rollers RA, RA, . . . and the inner ring S are set into the base body 2, which eliminates the need to perform the bottom spreading process on the cage using a supersized bottom spreading mold to set the conical rollers RA, RA, . . . and perform the swaging process on the column parts 5, 5, . . . using a supersized swaging mold after the conical rollers RA, RA, . . . are stored in the cage and the inner ring S is incorporated into the cage, unlike in the case where the conical rollers RA, RA, . . . are set into the cage after joining and fixing of the base body 2 and the connection body 3. This significantly reduces manufacturing costs.

Figure 35:
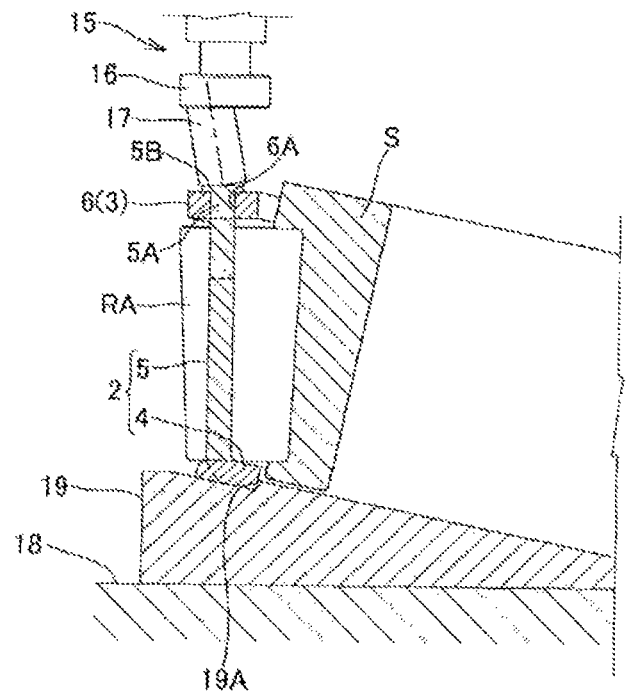
FIG. 35 is a partial longitudinal sectional view of a configuration example in which rollers and an inner ring are incorporated into the base body prior to the joining and fixing step.

In the case of setting the conical rollers RA, RA, . . . and the inner ring S to the base body 2 after the joining and fixing step, not performing the joining and fixing step after the conical rollers RA, RA, . . . and the inner ring S are set to the base body 2 as shown in FIG. 35, the inner-diameter removing step may be performed after the joining and fixing step.

In the configuration of the conical roller bearing cage 1A according to the fourth embodiment as described above, the same advantages as those of the first embodiment can be produced.

In addition, the base body 2 and the connection body 3 are joined and fixed together by the swing swaging process, no shock load acts on the column parts 5 in the vertical axis direction, and thus it is possible to suppress warpage or deformation in the column parts 5. This makes it possible to facilitate assurance of accuracy of the supersized conical roller bearing cage 1A manufactured on the basis of the blanks 2A and 3A obtained by cutting and processing steel plates, and avoid deterioration of accuracy of the cage under influence of high heat unlike in the case of joining and fixing the base body 2 and the connection body 3 by welding joint.

Further, since the base body 2 and the connection body 3 are joined and fixed together by the swing swaging process, there is no fear of age deterioration of welded parts unlike in the case of joining and fixing the base body 2 and the connection body 3 by welding joint. This makes it possible to assure reliability of the joined and fixed parts of the base body 2 and the connection body 3 over a long period of time.

Fifth Embodiment

Figure 36:
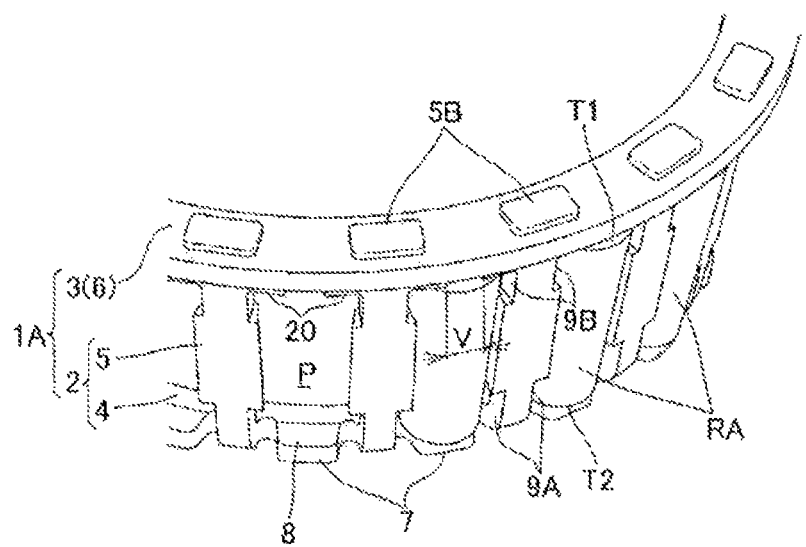
FIG. 36 is an enlarged perspective view of major components of a roller bearing cage (conical roller bearing cage) according to a fifth embodiment of the present invention, in which rollers are attached to only some of pockets for convenience of illustration.

As shown in the enlarged perspective view of major components of FIG. 36, a roller bearing cage (conical roller bearing cage) 1A according to a fifth embodiment of the present invention is configured such that a pair of a small-diameter ring part 4 and a large-diameter ring part 6 axially separated from each other is connected by a plurality of column parts 5, 5, . . . sliding on outer peripheral surfaces of conical rollers RA as rolling elements, and a plurality of pocket holes P, P, . . . is evenly formed in a circumferential direction to store and hold the conical rollers RA, RA, . . . in a peripheral wall portion.

The conical roller bearing cage 1A is formed by a base body 2 (refer to FIG. 42) including the small-diameter ring part 4 and the column parts 5, 5, . . . with square columnar convexes 5A, 5A, . . . at leading ends thereof and protrusion pieces 20, 20 protruded from the circumferential front-back surfaces at base-end sides of the square columnar convexes 5A of the column parts 5, clearances V being provided between the protrusion pieces 20, 20, and a connection body 3 (refer to FIG. 42) including a large-diameter ring part 6 with square holes 6A, 6A, . . . for fitting with the square columnar convexes 5A, 5A, . . . at the leading ends of the column parts 5, 5, . . . . The base body 2 and the connection body 3 are each fabricated from a steel plate such as a hot-rolled steel plate (e.g., SPHD).

Figure 43:
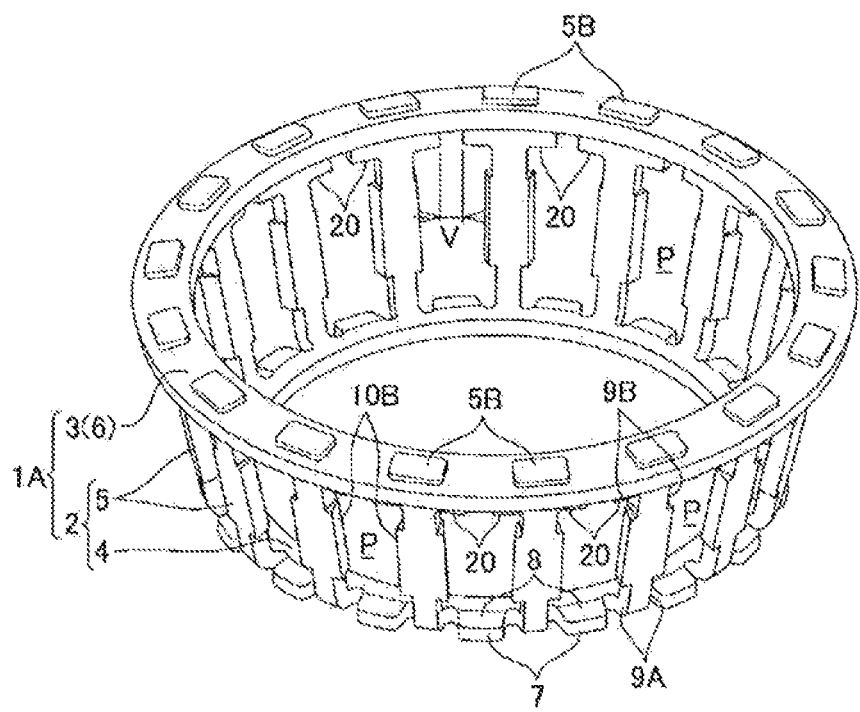
FIG. 43 is a perspective view of the two bodies processed at a finished surface pressing step after the fixing and joining step.

The base body 2 and the connection body 3 are joined and fixed together as shown in the perspective view of FIG. 43 by inserting the square columnar convexes 5A, 5A, . . . of the base body 2 into the square holes 6A, 6A, . . . of the connection body 3, and protruding leading ends of the square columnar convexes 5A, 5A, . . . from the surface of the connection body 3, and then performing a swing swaging process using the swaging machine 15 as in the fourth embodiment on the leading ends of the square columnar convexes 5A, 5A, . . . for plastic deformation to increase the square columnar convexes 5A, 5A, . . . in diameter. The conical roller bearing cage 1A has swaged portions 5B, 5B, . . . evenly formed in the circumferential direction, which are protruded from the surface of the connection body 3 and are approximately rectangular in shape as seen from the axial direction.

Next, a manufacturing method for the conical roller bearing cage 1A according to the fifth embodiment of the present invention will be described in detail. In the fifth embodiment, components with the same reference numerals in FIGS. 36 to 43 as those in the first embodiment shown in FIGS. 1 to 10 indicate components identical or equivalent to those in the first embodiment shown in FIGS. 1 to 10, and components with the same reference numerals in FIGS. 45 and 46 as those in the fourth embodiment shown in FIGS. 33 and 34 indicate components identical or equivalent to those in the fourth embodiment shown in FIGS. 33 and 34.

Figure 37:
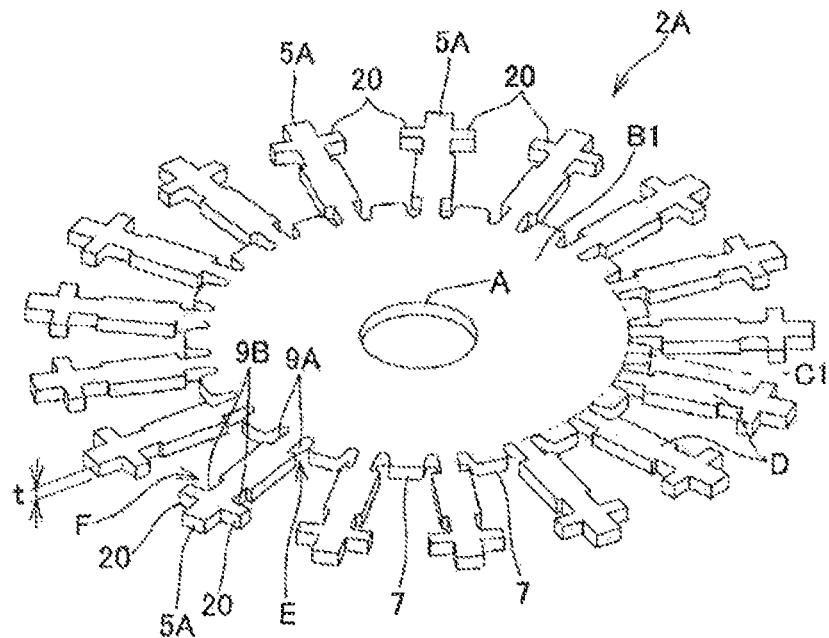
FIG. 37 is a perspective view of a base body blank processed at a base body blank cutting step.
Figure 39:
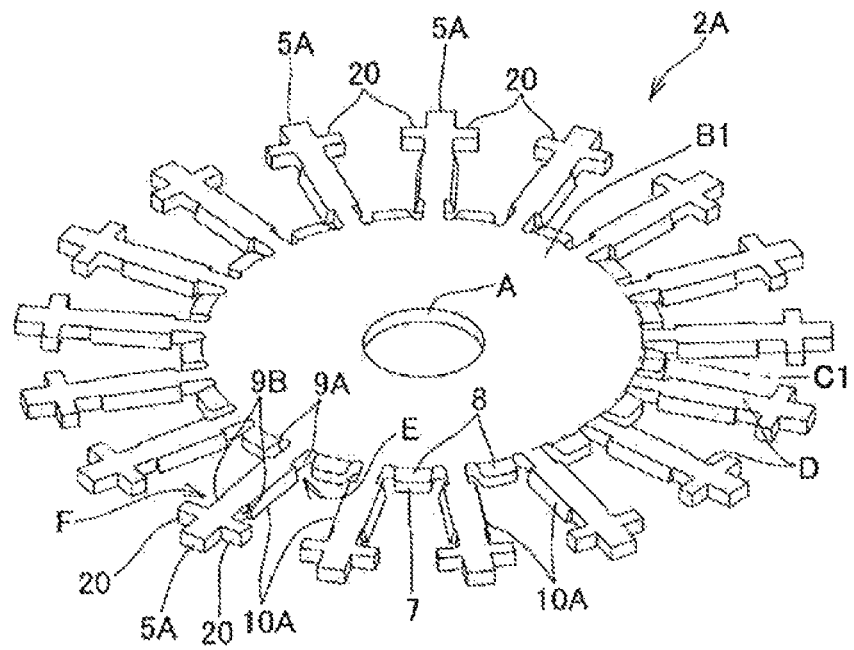
FIG. 39 is a perspective view of the base body blank processed at a rough surface pressing step and a tongue piece-inclined surface forming step.
Figure 40:
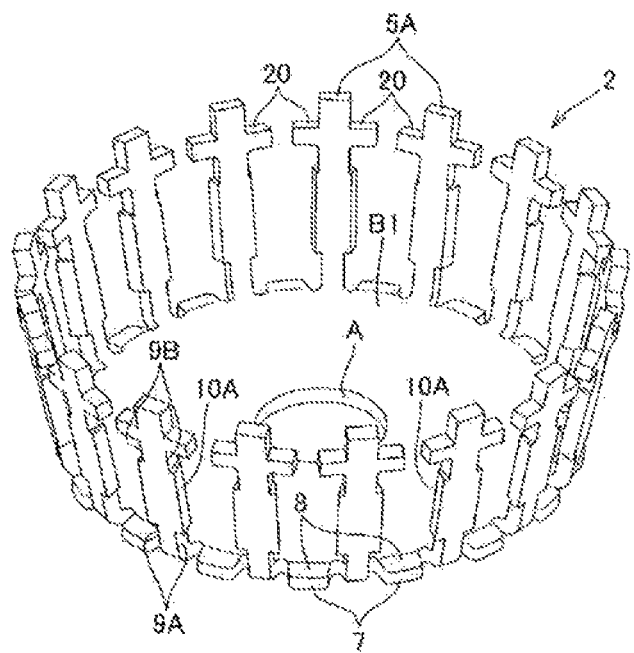
FIG. 40 is a perspective view of the base body blank processed at a folding step.

First, as in the first and fourth embodiments, the base body blank cutting step shown in FIG. 37, the rough surface pressing step or the laser-cut inclined surface forming step and the tongue piece-inclined surface forming step shown in FIG. 39, and the folding step shown in FIG. 40 are performed.

Figure 38:
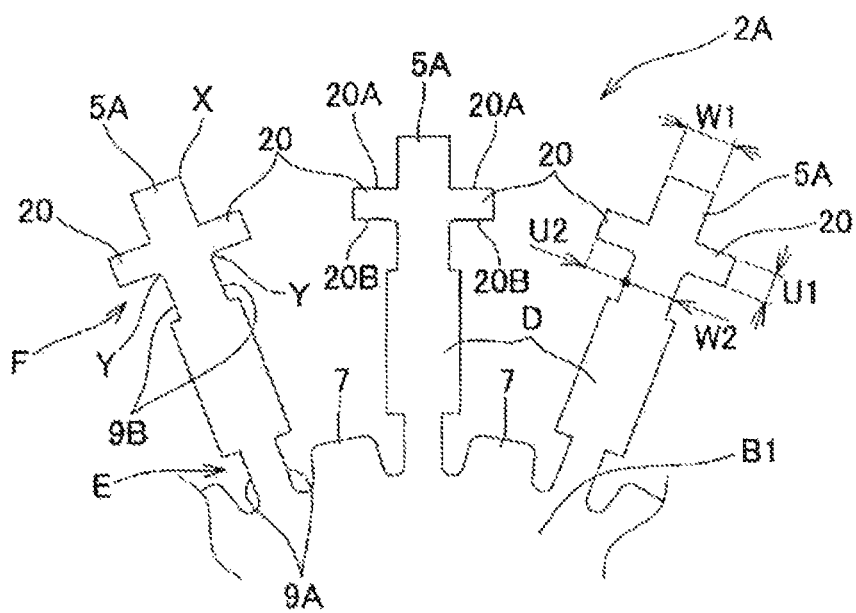
FIG. 38 is an enlarged plane view of major components of the base body blank.

Circumferential width dimension W1 of the square columnar convexes 5A shown in FIG. 38 is set equal to or larger than circumferential width dimension W2 of the portions D to be the column parts 5 (the column parts 5 in the finished state) at the base-end side across the protrusion pieces 20, 20 to enhance the strength of the column parts 5 (W1≥W2).

Increasing the circumferential width dimension W1 makes the column parts 5 stronger. In this case, however, there is a fear that the square holes 6A of the large-diameter ring parts 6 into which the square columnar convexes 5A are to be inserted (fitted) become large to decrease the strength of the large-diameter ring part 6 and lengthen processing time at a joining and fixing step described later. Accordingly, the circumferential width dimension W1 is preferably set to be equal to or less than a length obtained by adding a plate thickness t (refer to FIG. 37) to the circumferential width dimension W2 (W1≤(W2+t)).

If protrusion length U2 of the protrusion pieces 20, 20 shown in FIG. 38 is too short, the areas of contact with the large diameter-side end surfaces of the conical rollers RA become small. If the protrusion length U2 is too long, the protrusion pieces 20, 20 interfere with formation at a folding step described later. Accordingly, if intervals between the pocket holes P at the large-diameter ring 6 side shown in FIG. 36 are designated as S, the protrusion length U2 is desirably set to about 0.15S≤U2≤0.4S.

Therefore, as shown in FIG. 36, a clearance V is formed between a pair of protrusion pieces 20, 20 protruded from one to the other of the adjacent column parts 5, 5.

In addition, height U1 of the protrusion pieces 20 (radial length in the state of the base body blank 2A shown in FIG. 37) is set at the same level as the plate thickness t.

As shown in FIG. 38, corner portions Y, Y are formed by lower surfaces 20B, 20B of the protrusion pieces 20, 20 and circumferential front-back surfaces of the portions D to be the column parts 5 at the base-end side across the protrusion pieces 20, 20, and corners R are formed at the corner portions Y, Y. Curvature radius of the corners R is set to about 0.1 t≤R≤0.25 t. The corners R are made smaller than rounded surfaces of the edge portions in the large diameter-side end surfaces T1 of the conical rollers RA (refer to FIG. 36).

As shown in FIG. 38, upper surfaces 20A, 20A of the protrusion pieces 20, 20 are inclined in accordance with the inclined surface of the large-diameter ring part 6 because the large-diameter ring part 6 as the connection body 3 is formed in a disc-spring shape with a middle height. The upper surfaces 20A, 20A of the protrusion pieces 20, 20 can be inclined through laser cutting at the base body blank cutting step using a laser processing machine capable of three-dimensional processing, for example.

Figure 41:
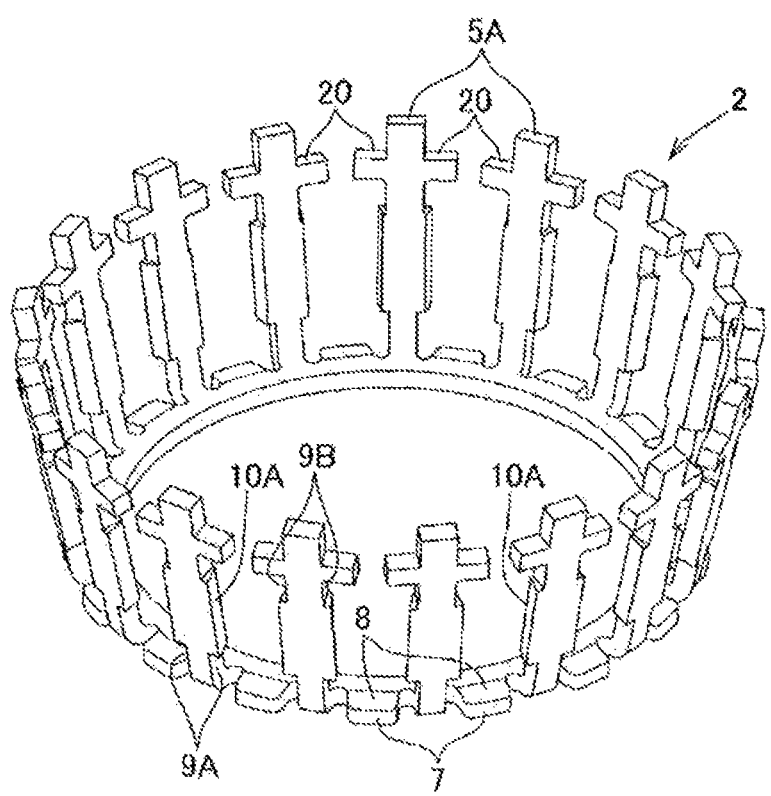
FIG. 41 is a perspective view of the base body blank processed at an inner-diameter removing step.

After the folding step shown in FIG. 40, as in the fourth embodiment, an inner-diameter removing step is performed to remove an excessive thick portion of the inner-diameter part of the disc-shaped member B1 by a turning process, a laser cutting process, a press process, or the like so as to meet a predetermined inner diameter as shown in the perspective view of FIG. 41.

Figure 42:
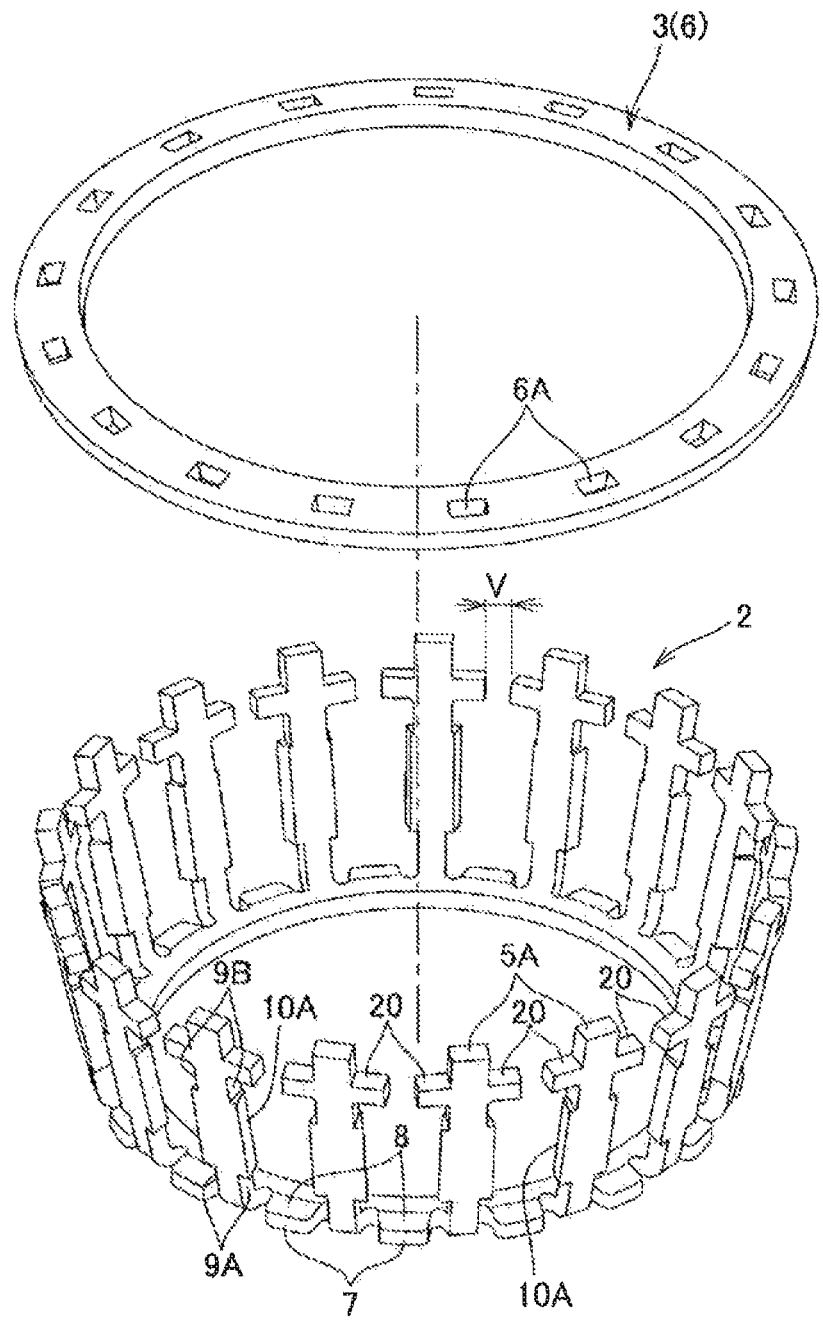
FIG. 42 is a perspective diagram showing a joining and fixing step.

Next, as in the first embodiment, the connection body 3 having undergone the connection body blank cutting step shown in FIG. 6 and the shaping step shown in FIG. 7 is integrated with the base body 2 at the joining and fixing step shown in the perspective view of FIG. 42, and the finished surface pressing step shown in FIG. 43 is performed on the connection body 3.

In the example of the manufacturing method for the conical roller bearing cage 1A described above, the upper surfaces 20A, 20A of the protrusion pieces 20, 20 are inclined through laser cutting in accordance with the inclined surface of the large-diameter ring part 6 at the base body blank cutting step using a laser processing machine capable of three-dimensional processing. The process for inclining the upper surfaces 20A, 20A of the protrusion pieces 20, 20 only needs to be completed before the joining and fixing step, and thus may be performed by a surface pressing process using a metal mold.

Next, the swing swaging process for use at the joining and fixing step will be described in detail.

The square columnar convexes 5A of the base body 2 are sized to be freely fitted into the square holes 6A of the connection body 3, and the square columnar convexes 5A have at the leading ends thereof edge portions X chamfered all around as shown in FIG. 38 for easy insertion into the square holes 6A, 6A, . . . .

The square columnar convexes 5A of the base body 2 may be sized so as to be capable of partial press-fitting into the square holes 6A of the connection body 3.

(Setting of Protrusion Height)

Figure 44:
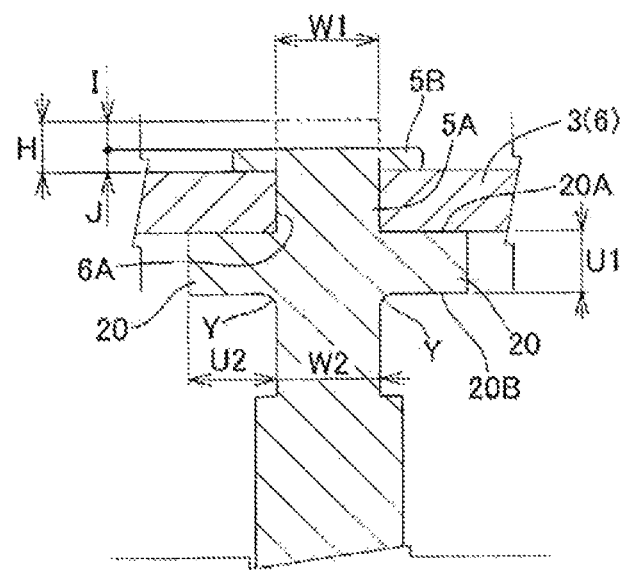
FIG. 44 is an enlarged longitudinal sectional front view of major components around a swaged portion after the joining and fixing step.

As shown in the enlarged longitudinal sectional front view of major components of FIG. 44, as in the fourth embodiment of FIG. 32, when the swing swaging process is performed from a position indicated by a two-dot chain line to a position indicated by a solid line, the material of a swage margin I plastically flows to the surrounding region to form a flange portion.

Therefore, the volume of the crushed swage margin I and the volume of the flange portion are equal. Accordingly, by setting in advance thickness J of the swaged portion (flange portion) and the area of the flange portion, protrusion height H from the large-diameter ring part 6 can be determined by volume calculation.

(Swing Swaging Process)

Figure 46:
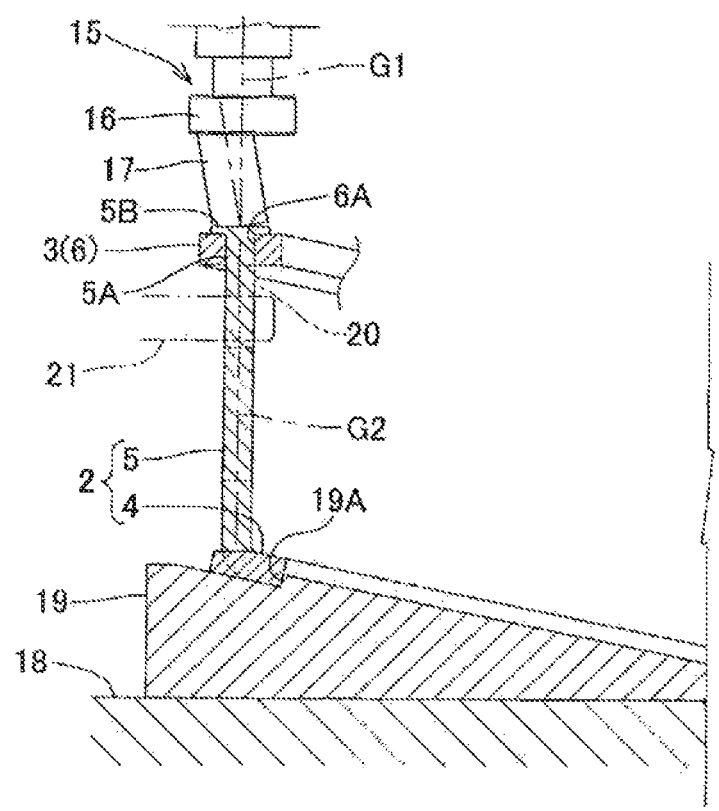
FIG. 46 is a partial longitudinal sectional view of a configuration of an inclination stage and the like for use in the swing swaging process.

As shown in the partial longitudinal sectional view of FIG. 46, an inclination stage 19 inclined at a predetermined angle is placed on a table 18 of a swaging machine 15. The small-diameter ring part 4 of the base body 2 is externally fitted to a circular positioning step portion 19A. While the small-diameter ring part 4 is set along the positioning step portion 19A, the small-diameter ring part 4 is rotatably supported around an inclination axis of the inclination stage 19 and is positioned such that a rotation axis center G1 of the swaging machine 15 agrees with an axis center G2 of the column part 5 of the conical roller bearing cage 1A.

Figure 45:
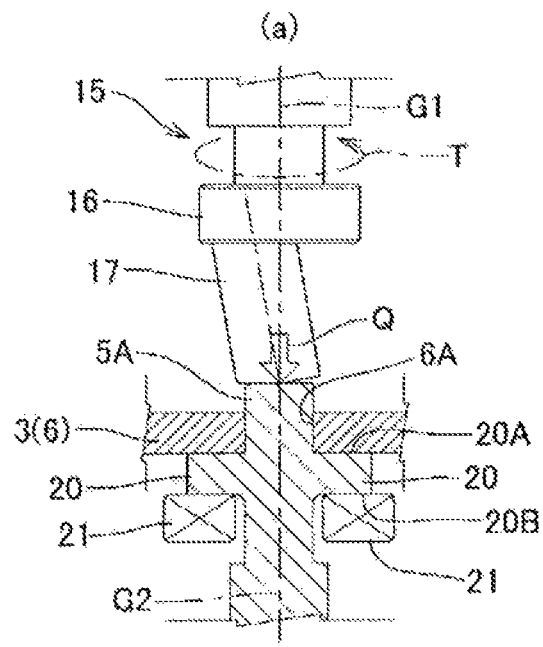
FIG. 45 is a partial longitudinal sectional front diagram showing a swing swaging process for use at the joining and fixing step.
Figure 45:
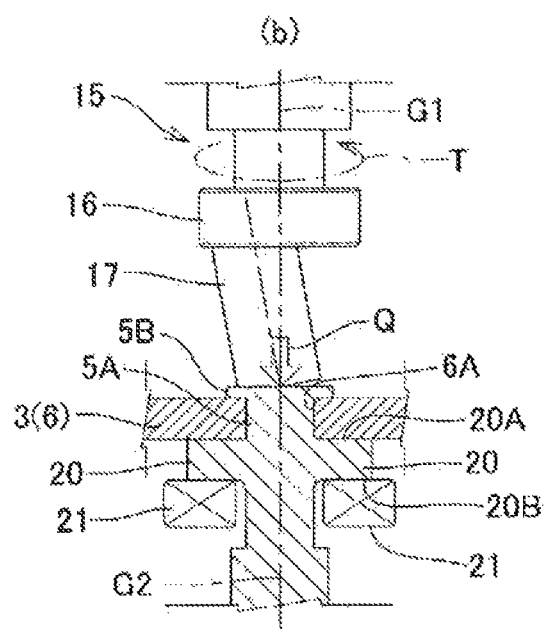

In this state, as shown in the partial longitudinal sectional front view of FIG. 45, a leading end of a swing swaging jig (swing swaging punch) 17 held in an inclined state with respect to a head part 16 of the swaging machine 15, that is, a conical press surface with a large apex angle is brought into contact with the leading end (upper surface) of the square columnar convex 5A of the column part 5, and the head part 16 is rotated by torque T of the motor with application of a downward thrust force Q from a hydraulic cylinder of the swaging machine 15.

The thrust force Q of the swaging machine 15 performing the swing swaging process as described above is received by receivers 21, 21 supporting the lower surfaces 20B, 20B of the protrusion pieces 20, 20.

By performing the swing waging process described above in the state where the process shown in FIG. 45(a) is started, the leading end portions of the square columnar convexes 5A are pressurized by the swing swaging jig 17 and are plastically deformed to form the flange portions. Accordingly, the swing swaging is completed as shown in FIG. 45(b).

In addition, the small-diameter ring part 4 rotatably supported around the inclination axis of the inclination stage 19 shown in FIG. 46 is rotated and positioned such that the axis center G2 of the column part 5 to be next subjected to the swing swaging process agrees with the rotation axis center G1 of the swaging machine 15. In this manner, the swing swaging process is performed in sequence on the leading ends of the square columnar convexes 5A, 5A, . . . of the column parts 5, 5, . . . .

According to the joining and fixing step by the swing swaging process described above, the column part 5 is processed while the press surface of the swing swaging jig 17 is constantly contact with the leading end (upper surface) of the square columnar convex 5A of the column part 5, and thus no shock load is applied to the column part 5.

Figure 47:
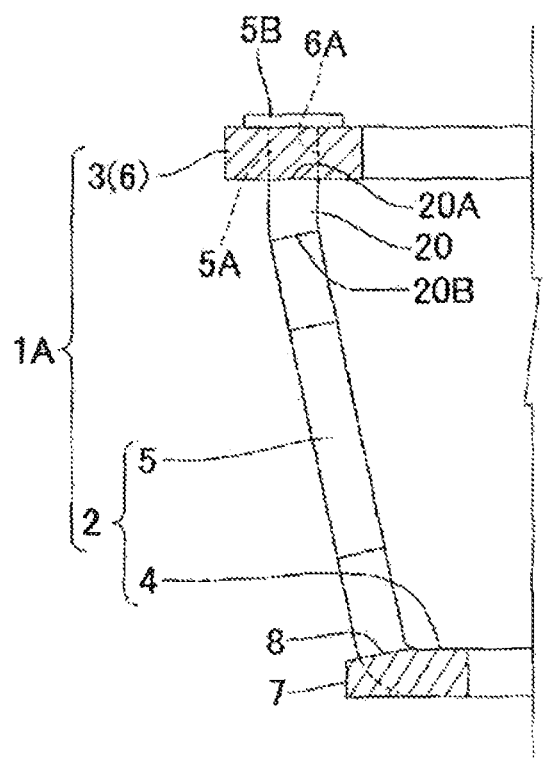
FIG. 47 is a partial longitudinal sectional view of a conical roller bearing cage in which a largest outer-diameter part of the cage is cylindrical.

The present invention can be applied to not only the conical roller bearing cage 1A described above as shown in FIG. 43 but also a conical roller bearing cage in which a largest outer-diameter part is cylindrical in shape as shown in the partial longitudinal sectional view of FIG. 47. The same reference numerals in FIG. 47 as those in FIGS. 36 to 43 indicate components identical or equivalent to those in FIGS. 36 to 43.

At the conical roller bearing cage shown in FIG. 47, the positions of the lower surfaces 20B, 20B of the protrusion pieces 20, 20 protruded from the circumferential front-back surfaces at the base-end sides of the square columnar convexes 5A of the column parts 5 are set as starting points of folding from the conical portion to the cylindrical portion with the largest outer diameter or final positions of bending R. The folding may be performed in the state of the base body blank fabricated at the base body blank cutting step or may be performed at the folding step described above at which the portions D, D, . . . to be the column parts are folded to have inverted truncated cone side surfaces, along the outer peripheral portion C1 of the disc-shaped member B1.

In addition, as shown in FIG. 47, the lower surfaces 20B, 20B of the protrusion pieces 20, 20 need to be inclined in accordance with the inclinations of the large diameter-side end surfaces T1 of the conical rollers RA so that edge portions of the lower surfaces 20B, 20B do not contact the large diameter-side end surfaces T1 of the conical rollers RA. The lower surfaces 20B, 20B of the protrusion pieces 20, 20 can be inclined by laser cutting at the base body blank cutting step using a laser processing machine capable of three-dimensional processing, or by a surface pressing process using a press mold before or after the finished surface pressing step after the joining and fixing step, or by these processes in combination.

Alternatively, when the swing swaging process is to be performed at the joining and fixing step, by inclining the upper surfaces of the receivers 21, 21 as shown in FIG. 45 in accordance with the inclinations of the large diameter-side end surfaces T1 of the conical rollers RA incorporated into the cage, necessary surface pressing can be completed on the lower surfaces 20B, 20B of the protruded pieces 20, 20 by means of the thrust force Q of the swaging machine 15 performing the swing swaging process. This simplifies the manufacturing process and improves productivity.

At the conical roller bearing cage in which the largest outer-diameter portion is cylindrical in shape, as shown in FIG. 47, the connection body 3 (large-diameter ring part 6) is an annular-ring flat plate, and thus there is no need to perform the shaping step at which the connection body 3 is formed in a disc-spring shape high at an inner-diameter part and low at an outer-diameter part.

The foregoing configuration of the conical roller bearing cage 1A in the fifth embodiment produces the same advantages as those in the first to fourth embodiments.

Clearance V is formed between a pair of protrusion pieces 20, 20 protruded from one to the other of the adjacent column parts 5, 5 to form a space in the pocket hole P at the connection body 3 side. This space can act as a flow path for lubricant oil to reduce abrasion and temperature increase of the conical rollers RA, the flange part of the outer ring, and the cage 1A.

Further, since the column parts 5 are provided with the protrusion pieces 20, 20, the circumferential width dimension W1 of the square columnar convexes 5A can be made equal to or more than the circumferential width dimension W2 of the column parts 5 at the base-end sides across the protrusion pieces 20, 20. Accordingly, by setting the circumferential width dimension W1 of the square columnar convexes 5A to be equal to or more than the circumferential width dimension W2 of the column parts at the base-end sides across the protrusion pieces 20, 20, the transverse area of the square columnar convexes 5A does not become smaller than the transverse area of the column parts 5 at the base-end side across the protrusion pieces 20, 20. Accordingly, as compared to the case where the transverse area of the square columnar convexes is smaller than the transverse area of the column parts at the base-end side, the strength of the joined and fixed parts becomes large and thus the joined and fixed parts are improved in reliability.

Moreover, since the swing swaging process is performed while the lower surfaces 20B, 20B of the protrusion pieces 20, 20 are supported by the receivers 21, 21 and the thrust force Q of the swaging machine 15 performing the swing swaging process is received by the receivers 21, 21, the thrust force Q of the swaging machine 15 is received by the receivers 21, 21, and there is no need to suppress the thrust force Q so that the column parts 5 are not subjected to buckling distortion, unlike in the fourth embodiment in which the thrust force Q of the swaging machine 15 acts directly on the column parts 5 of the base body 2. Accordingly, the thrust force Q of the swaging machine 15 can be increased to shorten the processing time and improve productivity.

Sixth Embodiment

Figure 48:
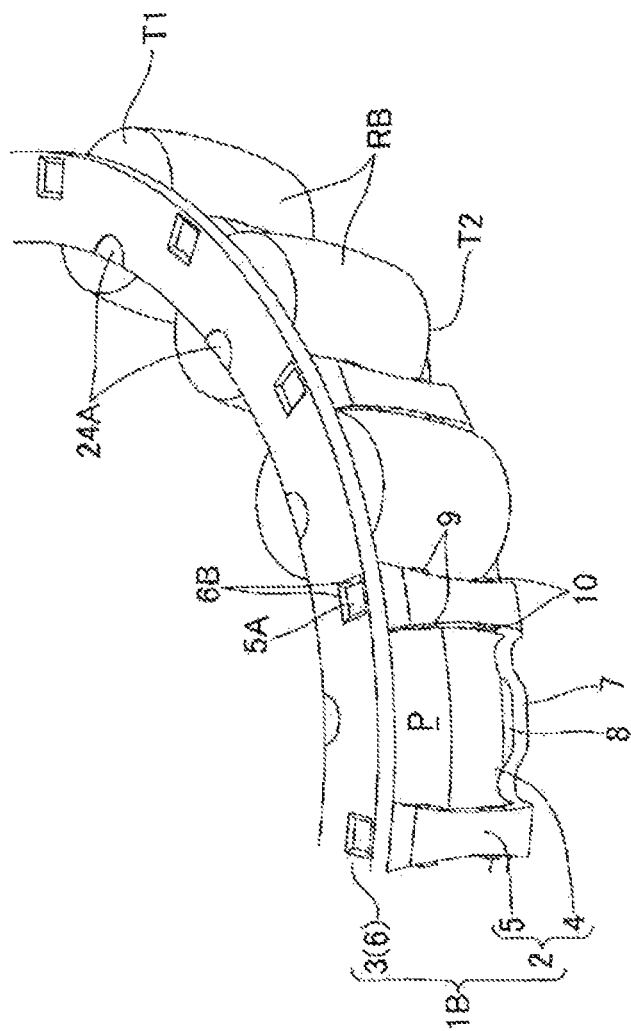
FIG. 48 is an enlarged perspective view of major components of a roller bearing cage (spherical roller bearing cage) according to a sixth embodiment of the present invention, in which spherical rollers are attached to only some of pockets for convenience of illustration.
Figure 49:
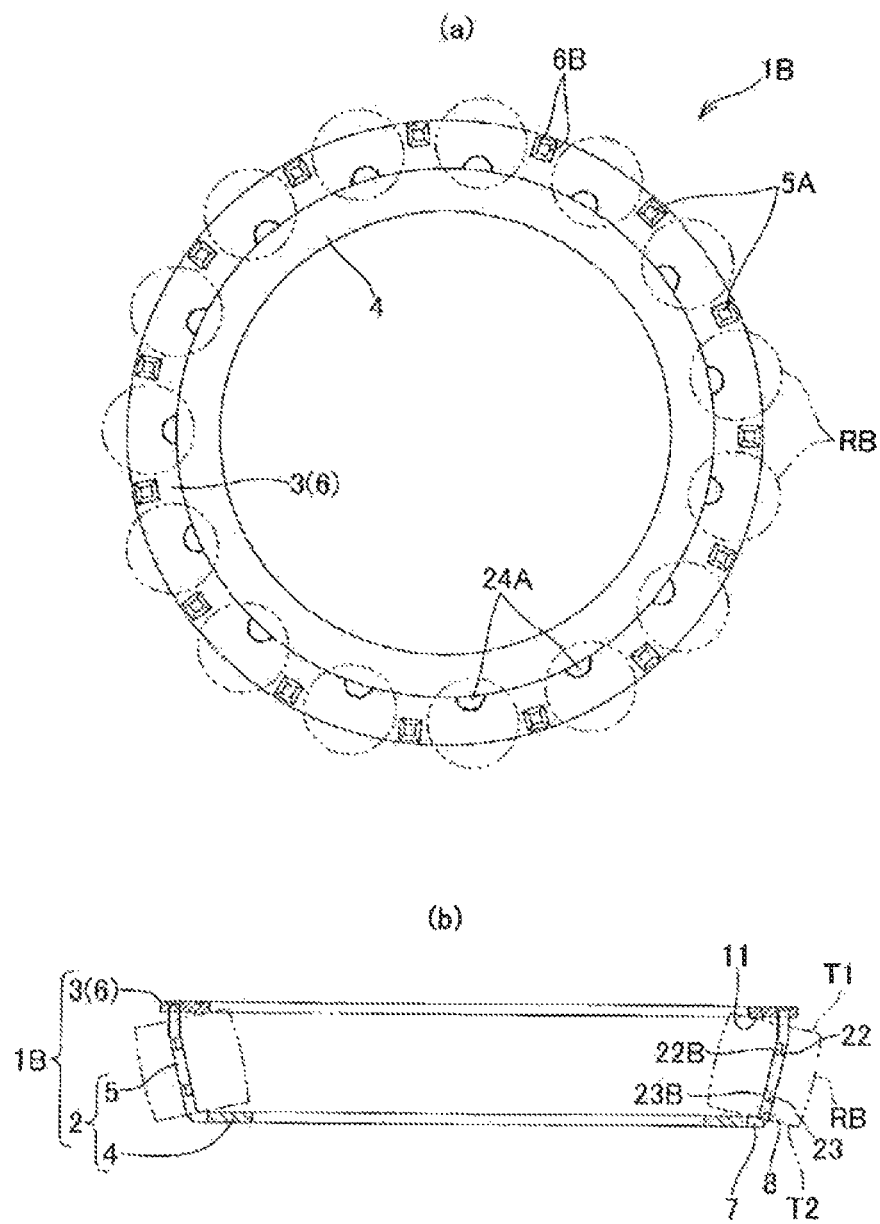
FIG. 49 shows roller bearing cage (spherical roller bearing cage) according to the sixth embodiment of the present invention.
Figure 50:
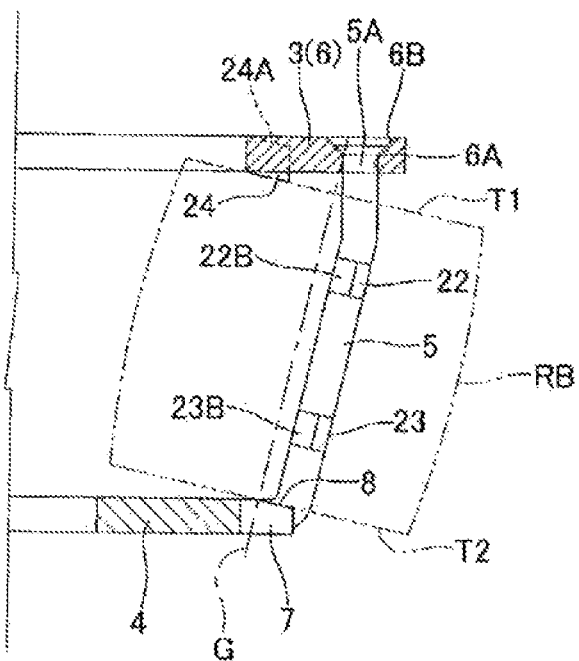
FIG. 50 is an enlarged longitudinal sectional front view of main components in the same.

As shown in the enlarged perspective view of major components of FIG. 48, the plane view of FIG. 49(a), the longitudinal sectional front view of FIG. 49(b), and the enlarged longitudinal sectional front view of major components of FIG. 50, a roller bearing cage (spherical roller bearing cage) 1B according to a sixth embodiment of the present invention is configured such that a pair of a small-diameter ring part 4 and a large-diameter ring part 6 axially separated from each other is connected by a plurality of column parts 5, 5, . . . sliding on outer peripheral surfaces of spherical rollers RB as rolling elements, a plurality of pocket holes P, P, . . . is evenly formed in a circumferential direction to store and hold the spherical rollers RB, RB, . . . in a bowl-shaped peripheral wall portion, while the small-diameter ring part 4 is on the lower side and the axial direction is vertically located, rotation center axes G of the spherical rollers RB are located at the inner-diameter side across the column parts 5, the large-diameter ring part 6 has projections 11 as large diameter-side end surface receivers that slide on large diameter-side end surfaces T1 of the spherical rollers RB (end surfaces at the large-diameter ring part 6 side) to guide the spherical rollers RB, and the small-diameter ring part 4 has tongue pieces 7 as small diameter-side end surface receivers that slide on small diameter-side end surfaces T2 of the spherical rollers RB (end surfaces at the small-diameter ring part 4 side) to guide the spherical rollers RB.

The spherical roller bearing cage 1B is formed by a base body 2 that includes the small-diameter ring part 4 and the column parts 5, 5, . . . , the column parts 5 having as roller receiver surfaces inclined surfaces 22B, 22B and 23B, 23B at the radially inner side of convexes 22, 22 and 23, 23 protruded in the circumferentially front-back direction and having square columnar convexes 5A, 5A, . . . at leading ends thereof, and a connection body 3 including the large-diameter ring part 6 with square holes 6A, 6A, . . . for fitting with the square columnar convexes 5A, 5A, . . . at the leading ends of the column parts 5, 5, . . . . The base body 2 and the connection body 3 are each fabricated from a steel plate such as a hot-rolled steel plate (e.g., SPHD).

Next, a manufacturing method for the spherical roller bearing cage 1B according to the sixth embodiment of the present invention will be described in detail.

First, processing of the base body 2 will be described.
(Base Body Blank Cutting Step)

Figure 51:
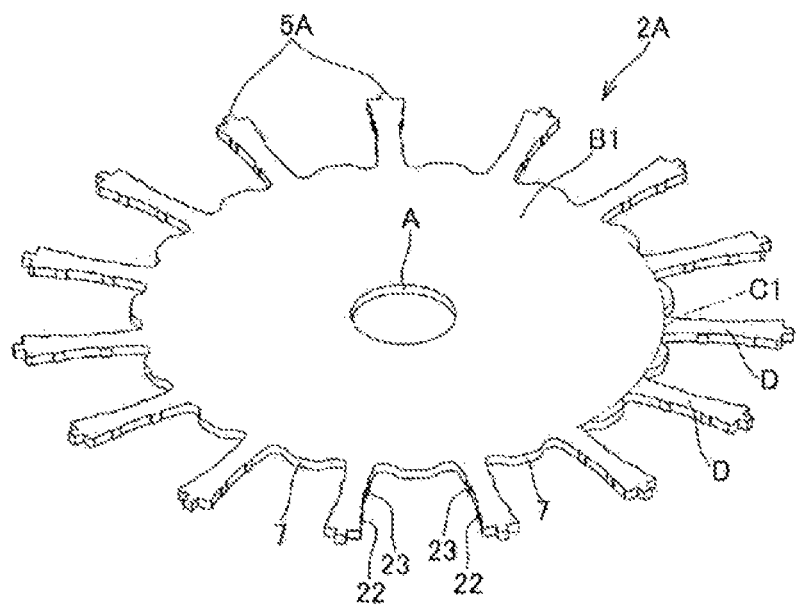
FIG. 51 is a perspective view of a base body blank processed at a base body blank cutting step.

As shown in the perspective view of FIG. 51, a base body blank cutting step is performed to obtain a base body blank 2A by cutting a steel plate through laser cutting such that portions D, D, . . . to be the column parts 5, 5, . . . are protruded outward in the radial direction from an outer peripheral portion C1 of a disc-shaped member B1 having a central hole A, the convexes 22, 22 and the convexes 23, 23 are formed at radially outer and inner sides of the circumferential front-back side surfaces of the portions D, D . . . to be the column parts 5, 5, . . . , square columnar convexes 5A, 5A, . . . are formed at the leading ends of the portions D, D, . . . to be the column parts 5, 5, . . . , and the tongue pieces 7 are formed to protrude outward in the radial direction between the adjacent portions D, D, . . . to be the column parts.

The foregoing cutting process is not limited to laser cutting but may be plasma cutting, wire-cut discharge machining, or the like.
(Rough Surface Pressing Step or Laser-Cut Inclined Surface Forming Step) Next, a rough surface pressing step is performed on the convexes 22, 22 and the convexes 23, 23 by surface-pressing surfaces of contact with the spherical rollers RB by a surface pressing amount smaller than a final surface pressing amount (for example, about 90 to 98% of the final surface pressing amount), thereby to form predetermined inclined surfaces 22A, 22A, . . . and 23A, 23A, . . . as shown in the perspective view of FIG. 52.

In this manner, by subjecting the base body blank 2A to the rough surface pressing process with a press mold using the central hole A as a guide hole, the base body blank 2A can be precisely processed in a stable state without a position shift.

Instead of the rough surface pressing step, a laser-cut inclined surface forming step may be performed to form through laser cutting inclined surfaces equivalent to the inclined surfaces 22A, 22A, . . . and the inclined surfaces 23A, 23A, . . . formed at the rough surface pressing step. According to the laser-cut inclined surface forming step, the portions D to be the column parts 5 are not extended or deformed unlike in the case where the rough surface pressing step is performed using a press mold.

Figure 52:
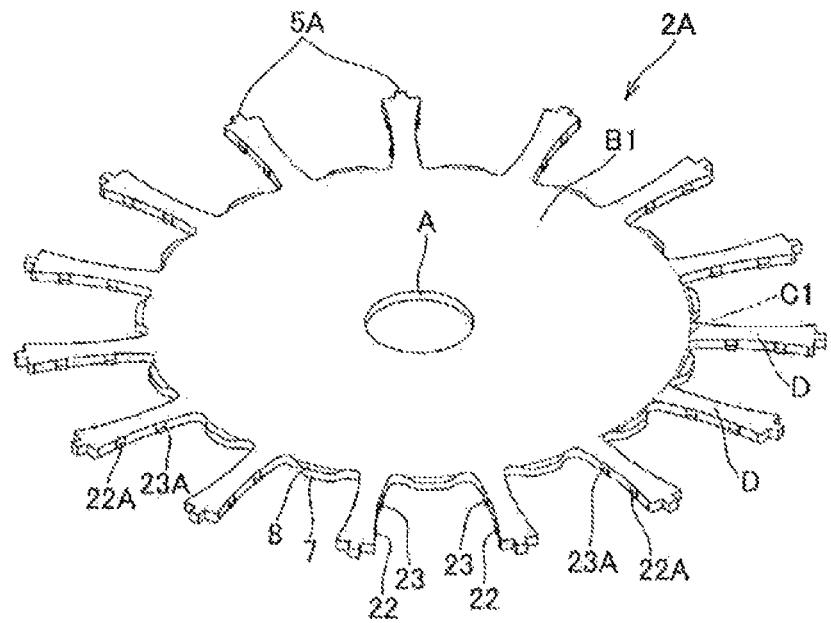
FIG. 52 is a perspective view of the base body blank processed at a rough surface pressing step and an inclined surface (small diameter-side end surface receiver surface) forming step.

In the case of performing the foregoing base body blank cutting step through laser cutting, a laser processing machine capable of three-dimensional processing can be used to cut a steel plate at the base body blank cutting step to fabricate the base body blank 2A with the inclined surfaces 22A, 22A, . . . and the inclined surfaces 23A, 23A, . . . shown in FIG. 52.

Therefore, the base body blank 2A having undergone the foregoing base body blank cutting step and laser-cut inclined surface forming step can be fabricated by using a laser processing machine capable of three-dimensional process at one and the same step. This makes it possible to significantly simplify the manufacturing process.
(Tongue Piece-Inclined Surface (Small Diameter-Side End Surface Receiver Surface) Forming Step)

As shown in FIG. 52, an inclined surface forming step is performed on the tongue pieces 7, 7, . . . as small diameter-side end surface receivers of the base body blank 2A to form using a press mold inclined surfaces 8, 8, . . . as small diameter-side end surface receiver surfaces to be in surface contact with small diameter-side end surfaces T2 of the spherical rollers RB, RB, . . . (refer to FIGS. 47 to 49).

By forming the inclined surfaces 8, 8, . . . described above, as shown in FIG. 50, the small diameter-side end surfaces T2 of the spherical rollers RB stored in the pocket holes do not contact or slide on edge portions of the small-diameter ring part 4, and the small diameter-side end surfaces T2 of the spherical rollers RB are brought into surface contact with the tongue pieces 7 protruded from the small-diameter ring part 4 to between the column parts 5, 5. This suppresses progression of abrasion of the small diameter-side end surfaces T2 of the spherical rollers RB, unlike in the case where the small diameter-side end surfaces T2 of the spherical rollers RB contact and slide on the edge portions, and thus further stabilizes the holding state of the spherical rollers RB, RB, . . . .
(Folding Step)

Figure 53:
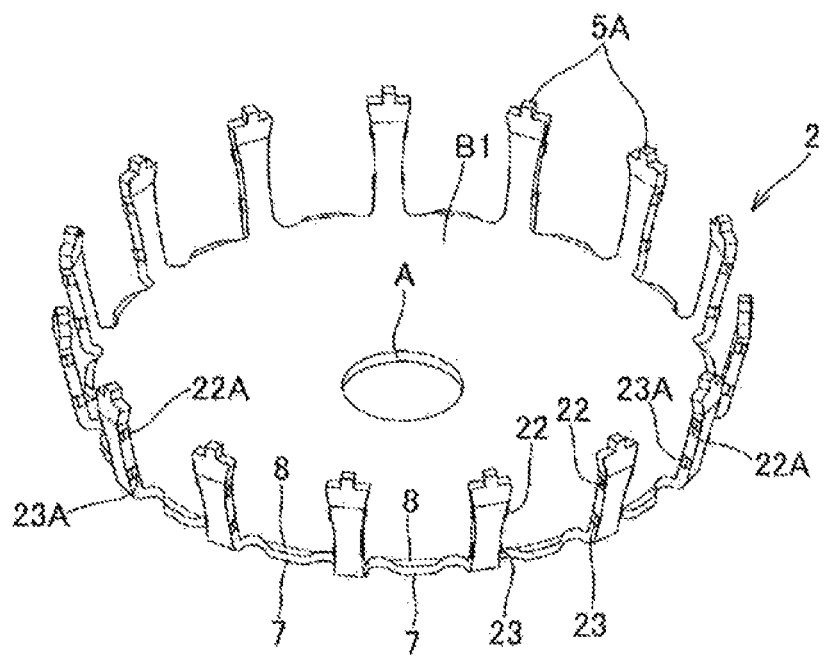
FIG. 53 is a perspective view of the base body blank processed at a folding step.

Next, a folding step is performed on the base body blank 2A to fold using a drawing mold the portions D, D, . . . to be the column parts to have a bowl shape as shown in FIG. 50, for example, along the outer peripheral portion C1 of the disc-shaped member B1, as shown in the perspective view of FIG. 53.

The disc-shaped member B1 has at a center thereof the central hole A with a diameter smaller than the inner diameter of the cage, and the central hole A can function as a guide hole in the pressing process. In addition, the disc-shaped member B1 has a relatively large thick portion and thus facilitates acquisition of rigidity at the small-diameter side in the drawing process.

Next, processing of the connection body 3 will be described.
(Connection Body Blank Cutting Step)

Figure 54:
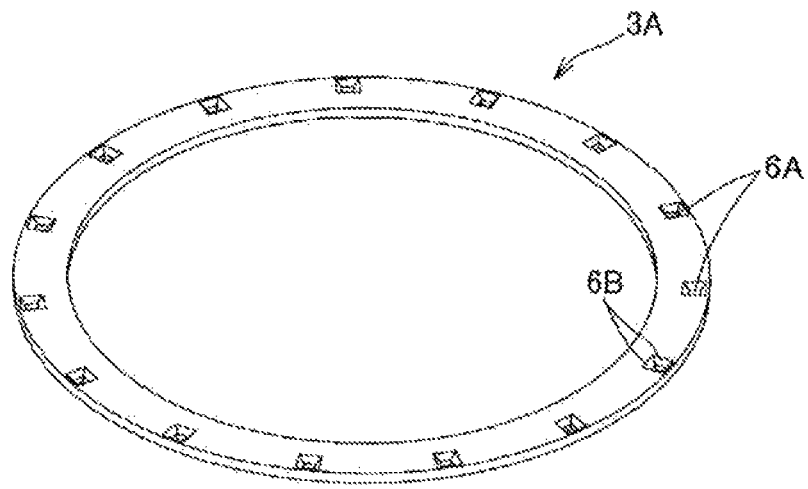
FIG. 54 is a perspective view of a connection body blank processed at a connection body blank cutting step.

A connection body blank cutting step is performed to obtain a connection body blank 3A by cutting a steel plate through laser cutting to form a horizontal annular ring part extending in the radial direction and having the square holes 6A, 6A, . . . formed evenly in the circumferential direction for fitting with the square columnar convexes 5A, 5A, . . . , as shown in the perspective view of FIG. 54.

The foregoing cutting process is not limited to laser cutting but may be plasma cutting, wire-cut discharge machining, or the like.

In addition, chamfered portions 6B, 6B, . . . in the shape of an inverted truncated quadrangular pyramid are formed at upper portions of the square holes 6A, 6A, . . . . The chamfered portions 6B, 6B, . . . may be formed by radiating a laser beam obliquely to the square holes 6A, 6A, . . . after the formation of the square holes 6A, 6A, . . . through laser cutting at the same step, or may be formed by using an inverted truncated quadrangular pyramid-shaped punch separately from the step of forming the square holes 6A.

(Large Diameter-Side End Surface Receiver Forming Step)

Figure 55:
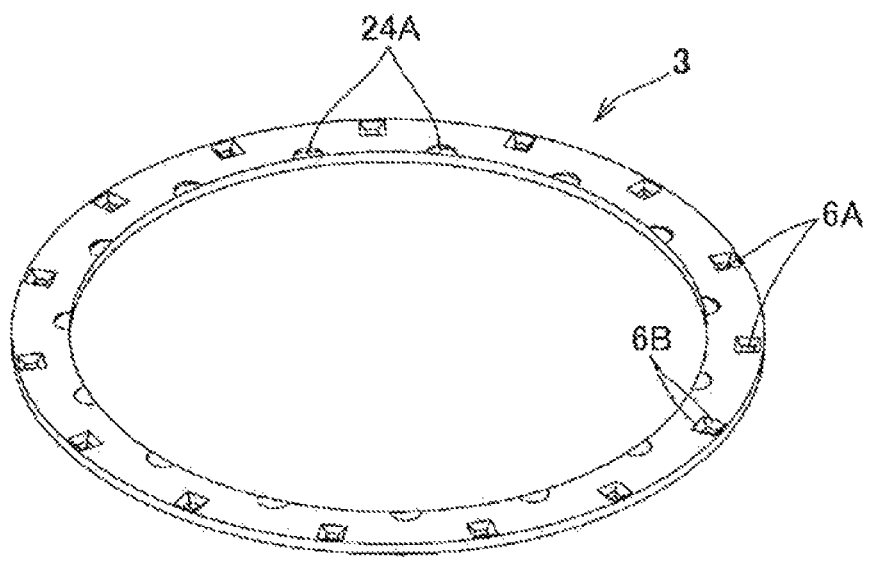
FIG. 55 is a perspective view of the connection body blank processed at a large diameter-side end surface receiver forming step.

Press surfaces 24A, 24A, . . . (refer to FIG. 55) as opposite surfaces of the inner diameter-side end part of the large-diameter ring part 6 opposed to the large diameter-side end surfaces T1, T1, . . . of the spherical rollers RB, RB, . . . of the connection body blank 3A shown in FIG. 54 are pressed and subjected to a dowel process to form projections 24, 24, . . . as the large diameter-side end surface receivers shown in FIG. 50, thereby acquiring the connection body 3 shown in the perspective view of FIG. 55.

By forming the lower surfaces of the projections 24, 24, . . . as the large diameter-side end surface receivers into inclined surfaces to be in surface contact with the large diameter-side end surfaces T1 of the spherical rollers RB, the large diameter-side end surfaces T1 of the spherical rollers RB stored in the pocket holes do not contact or slide on the edge portions of the large-diameter ring part 6, and the diameter-side end surfaces T1 of the spherical rollers RB are brought into surface contact with the projections 24, 24, . . . as the large diameter-side end surface receivers as shown in FIG. 50. Thus, it is possible to suppress progression of abrasion of the large diameter-side end surfaces T1 of the spherical rollers RB unlike in the case where the large diameter-side end surfaces T1 of the spherical rollers RB contact and slide on the edge portions, and thus further stabilize the holding state of the spherical rollers RB, RB, . . . .

The large diameter-side end surface receivers may be formed not only at the inner diameter-side end portion of the large-diameter ring 6 but also at the outer diameter-side end portion of the large-diameter ring 6. In the case of forming the large diameter-side end surface receivers at the outer diameter-side end portion of the large-diameter ring 6, the distance between the large-diameter ring 6 and the large diameter-side end surfaces T1 of the spherical rollers RB is larger than the plate thickness, and thus the large diameter-side end surface receivers can be produced by forming pawl-like projection pieces at the outer-diameter side of the large-diameter ring 6 and then pressing and folding the projection pieces.

According to the configuration in which the large diameter-side end surface receivers at the inner diameter-side end portion and the outer diameter-side end portion of the large-diameter ring part 6, the spherical rollers RB can be guided by total three end surface receivers including the small diameter-side end surface receiver with improvement of guiding accuracy. This enhances the effect of preventing skews in the spherical rollers RB.

Next, integration of the base body 2 and the connection body 3 will be described.

(Joining and Fixing Step)

Figure 56:
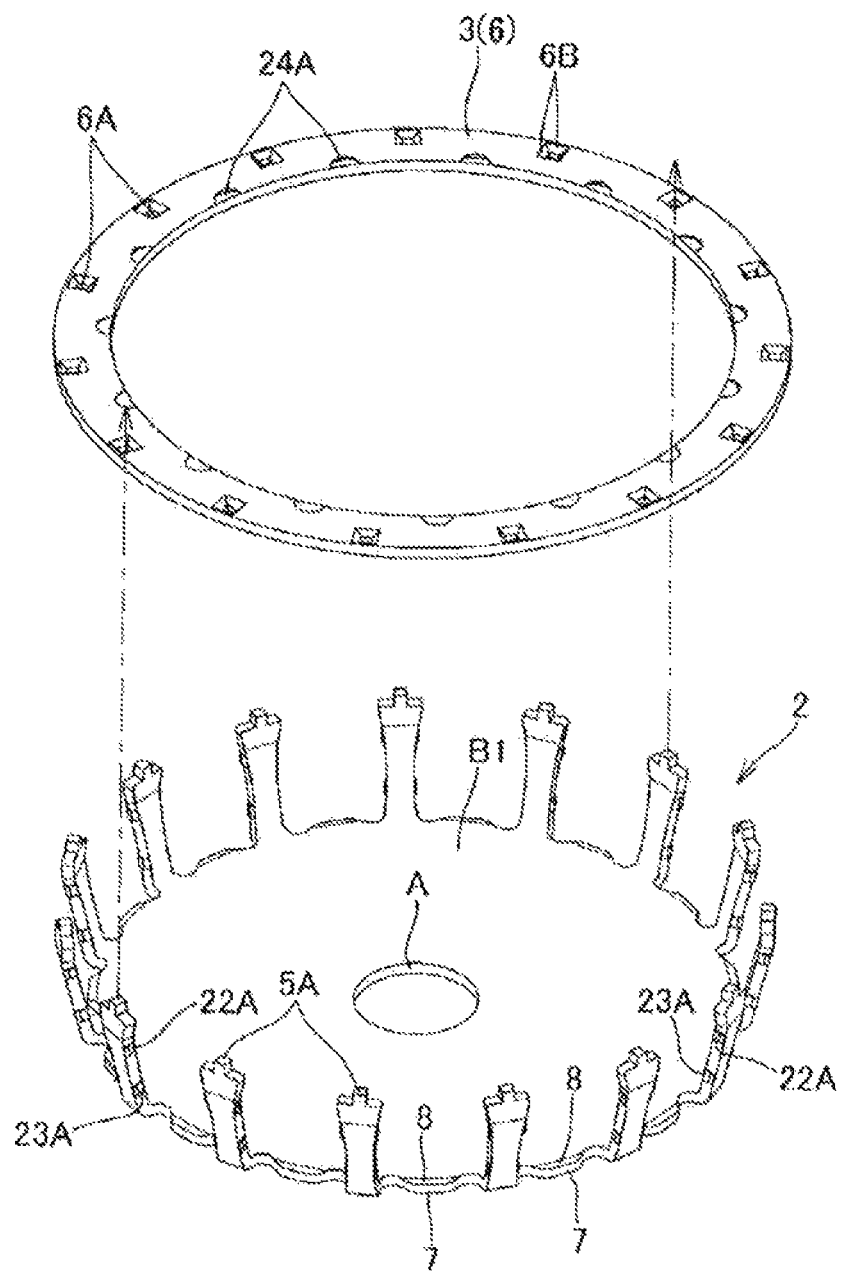
FIG. 56 is a perspective diagram showing a joining and fixing step.

A joining and fixing step is performed to integrate the base body 2 and the connection body 3 such that the square columnar convexes 5A, 5A, . . . of the base body 2 shown in the perspective diagram of FIG. 56 having undergone the base body blank cutting step, the rough surface pressing step or laser-cut inclined surface forming step, the tongue piece-inclined surface (small diameter-side end surface receiver surface) forming step, and the folding step are fitted into the square holes 6A, 6A, . . . of the connection body 3 shown in the perspective diagram of FIG. 56 having undergone the connection body blank cutting step and the large diameter-side end surface receiver forming step, and in that state, the base body 2 and the connection body 3 are joined and fixed together by a welding process such as laser welding or spot welding, or a joint process through a press process such as swaging, or the like.

According to the present invention, two spherical roller bearing cages 1B, 1B are used in the state where their large-diameter ring parts 6, 6 (connection bodies 3, 3) are butted back to back, and thus it is necessary to prevent that the joined and fixed parts protrude from the surfaces of the large-diameter ring parts 6. Thus, in the case where, when the base body 2 and the connection body 3 are joined together by the joining and fixing method described above, the joined and fixed parts protrude from the surfaces of the large-diameter ring parts 6, it is necessary to shave off the protruded portions.

Next, processing of the base body 2 after the integration of the base body 2 and the connection body 3 will be described.

(Finished Surface Pressing Step)

Figure 57:
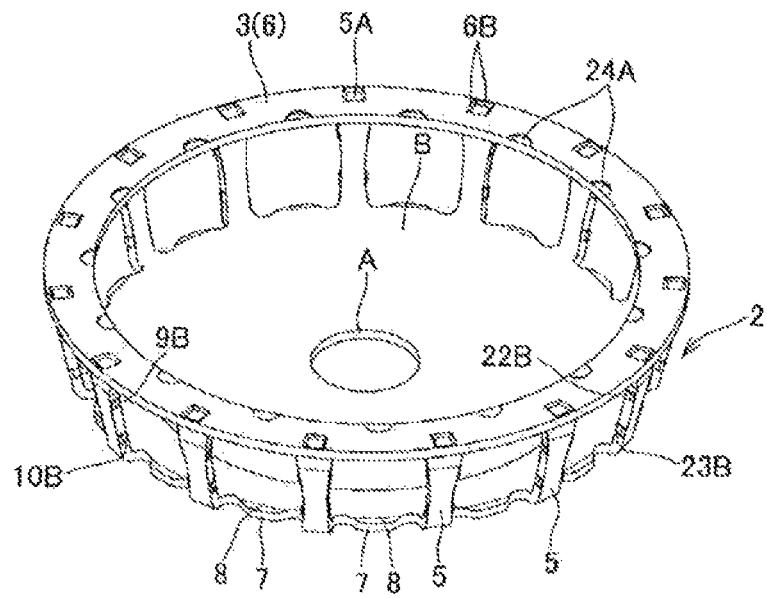
FIG. 57 is a perspective view of the two bodies processed at a finished surface pressing step.

A finished surface pressing step is performed to surface-press using a press mold the surfaces of contact with the spherical rollers RB in the column parts 5, 5, . . . by the final surface pressing amount, thereby completing the predetermined inclined surfaces 22B, 22B and 23B, 23B, . . . as shown in the perspective view of FIG. 57.

As in the foregoing, the inclined surfaces 22A, 22A and 23A, 23A, . . . are formed in the portions D, D, . . . to be the column parts 5, 5, . . . in the state of the base body blank 2A shown in FIG. 51 at the rough surface pressing step or the laser-cut inclined surface forming step, and the predetermined inclined surfaces 22B, 22B and 23B, 23B, . . . shown in FIG. 57 are formed by surface-pressing the inclined surfaces 22A, 22A and 23A, 23A, . . . in the column parts 5, 5, . . . having undergone the folding step and the joining and fixing step for joining and fixing with the connection body 3 by the remaining pressing amount at the finished surface pressing step, which allows fine-adjustment of dimension accuracy and thus facilitates acquisition of the predetermined dimension accuracy.

In addition, in the case of forming the inclined surfaces 22A, 22A and 23A, 23A, . . . through laser cutting, even if the inclined surfaces 22A, 22A and 23A, 23A, . . . are rough, favorable surface-press surfaces can be formed in the column parts 5, 5, . . . by transferring the smooth surfaces of a press mold to the rough surfaces of the inclined surfaces at the finished surface pressing step.

(Inner-Diameter Removing Step)

Figure 58:
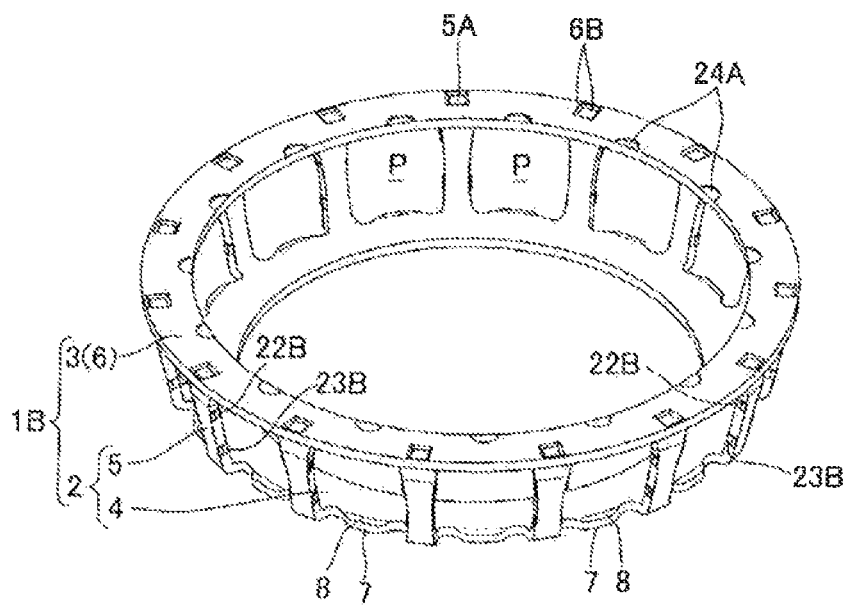
FIG. 58 is a perspective view of the two bodies processed at an inner-diameter removing step.

Next, an inner-diameter removing step is performed to remove an excessive thick portion of the inner-diameter part of the disc-shaped member B1 by a turning process, a laser cutting process, a press process, or the like so as to meet a predetermined inner diameter as shown in the perspective view of FIG. 58, thereby obtaining the final shape of the base body 2. Accordingly, the spherical roller bearing cage 1B is completed.

In the example of the foregoing manufacturing method for the spherical roller bearing cage 1B in the sixth embodiment, the tongue piece-inclined surface (small diameter-side end surface receiver surface) forming step for forming the inclined surfaces 8, 8, . . . in the tongue pieces 7, 7, . . . is performed between the rough surface pressing step or the laser-cut inclined surface forming step and the folding step. Alternatively, the tongue piece-inclined surface (small diameter-side end surface receiver surface) forming step may be performed after the base body blank cutting step, after the folding step, after the joining and fixing step, or after the finished surface pressing step.

In addition, in the foregoing example of the manufacturing method for the spherical roller bearing cage 1B in the sixth embodiment, the base body blank 2A is subjected to the rough surface pressing step to surface-press the surfaces of contact with the spherical rollers RB in the portions D to be the column parts 5 by the surface pressing amount smaller than the final surface pressing amount, or the laser-cut inclined surface forming step to form through laser cutting the inclined surfaces equivalent to the inclined surfaces 22A, 22A, . . . and 23A, 23A, . . . formed at the rough surface pressing step, and then the base body 2 integrated with the connection body 3 at the joining and fixing step is subjected to the finished surface pressing step to surface-press the surfaces of contact with the spherical rollers RB in the column parts 5 by the final surface pressing amount, thereby forming the predetermined inclined surfaces 22B, 22B, . . . and 23B, 23B, . . . . Alternatively, the base body 2 integrated with the connection body 3 at the joining and fixing step may not be subjected to the finished surface pressing step, but may be subjected to the surface pressing step to surface-press the surfaces of contact with the spherical rollers RB in the portions D to be the column parts 5 by the final surface pressing amount, or the laser-cut inclined surface forming step to form through laser cutting the inclined surfaces equivalent to the predetermined inclined surfaces 22B, 22B, . . . and 23B, 23B, . . . surface-pressed by the final surface pressing amount.

According to the configuration of the spherical roller bearing cage 1B in the sixth embodiment, even though the rotation center axes G of the spherical rollers RB are located at the inner-diameter side across the column parts 5 as in conventional bowl-shaped cages, there is no need for a guide ring unlike in the conventional bowl-shaped cages. This causes no situation in which slippage occurs between the guide ring and the inner ring or the rollers and the temperature of the bearing increases due to frictional heat, which eliminates the need to fabricate a guide ring as a separate member by shaving or the like. This realizes a reduction in manufacturing costs.

In addition, the connection body 3 (large-diameter ring part 6) fabricated separately from the base body 2 is joined and fixed to the base body 2, which leads to significant improvement of rigidity as compared to the conventional bowl-shaped cages.

Seventh Embodiment

Figure 59:
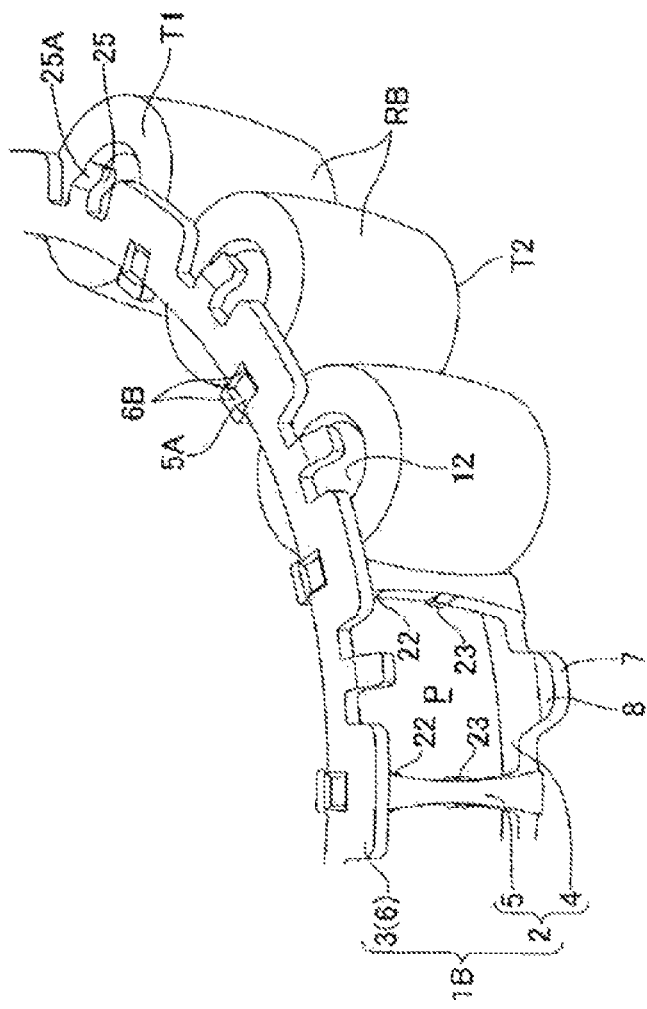
FIG. 59 is an enlarged perspective view of major components of a roller bearing cage (spherical roller bearing cage) according to a seventh embodiment of the present invention, in which spherical rollers are attached to only some of pockets for convenience of illustration.
Figure 60:
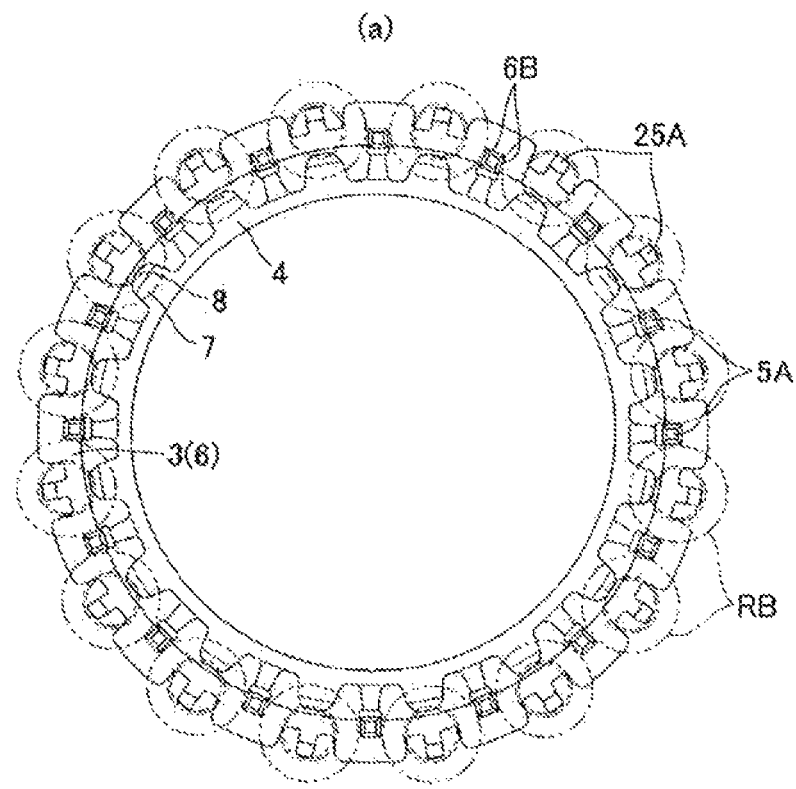
FIG. 60 shows roller bearing cage (spherical roller bearing cage) according to the seventh embodiment of the present invention.
Figure 60:
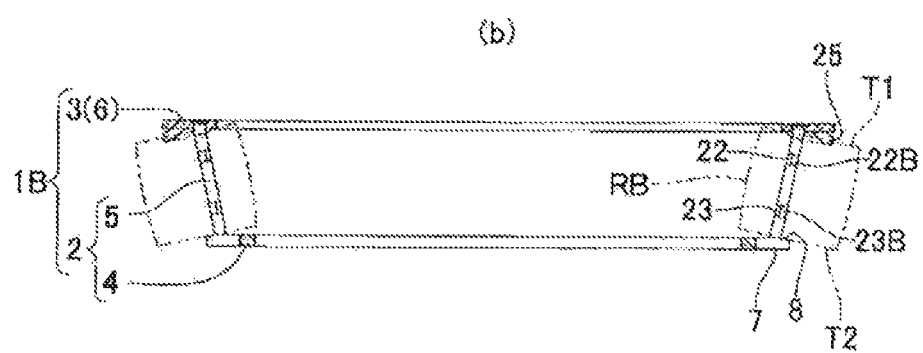

As shown in the enlarged perspective view of major components of FIG. 59, the plane view of FIG. 60(a), the longitudinal sectional front view of FIG. 60(b), and the enlarged longitudinal sectional front view of major components of FIG. 61(b), a spherical roller bearing cage 1B according to a seventh embodiment of the present invention is configured such that a pair of a small-diameter ring part 4 and a large-diameter ring part 6 axially separated from each other is connected by a plurality of column parts 5, 5, . . . sliding on outer peripheral surfaces of spherical rollers RB as rolling elements, a plurality of pocket holes P, P, . . . is evenly formed in a circumferential direction to store and hold the spherical rollers RB, RB, . . . in an inverted cone-shaped peripheral wall portion while the small-diameter ring part 4 is on the lower side and the axial direction is vertically located, rotation center axes G of the spherical rollers RB are located at the outer-diameter side across the column parts 5, the large-diameter ring part 6 has projections 12 as large diameter-side end surface receivers that slide on large diameter side end surfaces T1 of the spherical rollers RB (end surfaces at the large-diameter ring part 6 side) to guide the spherical rollers RB, and the small-diameter ring part 4 has tongue pieces 7 as small diameter-side end surface receivers that slide on small diameter-side end surfaces T2 of the spherical rollers RB (end surfaces at the small-diameter ring part 4 side) to guide the spherical rollers RB.

The spherical roller bearing cage 1B is formed by a base body 2 that includes the small-diameter ring part 4 and the column parts 5, 5, . . . , the column parts 5 having as roller receiver surfaces inclined surfaces 22B, 22B and 23B, 23B at the radially outer sides of convexes 22, 22 and 23, 23 protruded in the circumferentially front-back direction and having square columnar convexes 5A, 5A, . . . at leading ends thereof; and a connection body 3 including the large-diameter ring part 6 with square holes 6A, 6A, . . . for fitting with the square columnar convexes 5A, 5A, . . . at the leading ends of the column parts 5, 5, . . . . The base body 2 and the connection body 3 are each fabricated from a steel plate such as a hot-rolled steel plate (e.g., SPHD).

Next, a manufacturing method for the spherical roller bearing cage 1B according to the seventh embodiment of the present invention will be described. In the seventh embodiment, the same reference numerals in FIGS. 59 to 69 as those in the sixth embodiment shown in FIGS. 48 to 58 indicate components identical or equivalent to those in the sixth embodiment, and thus detailed description thereof will be omitted.

Figure 62:
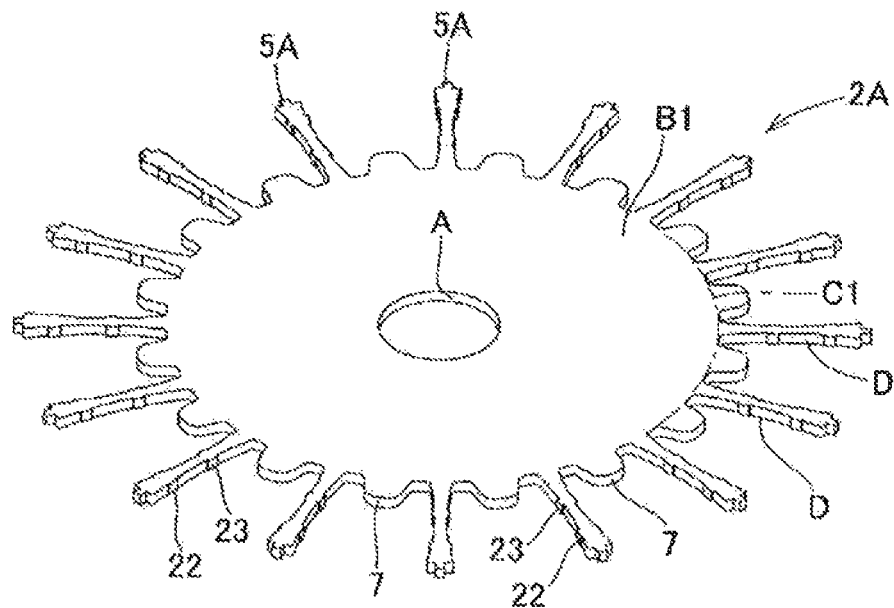
FIG. 62 is a perspective view of a base body blank processed at a base body blank cutting step.
Figure 63:
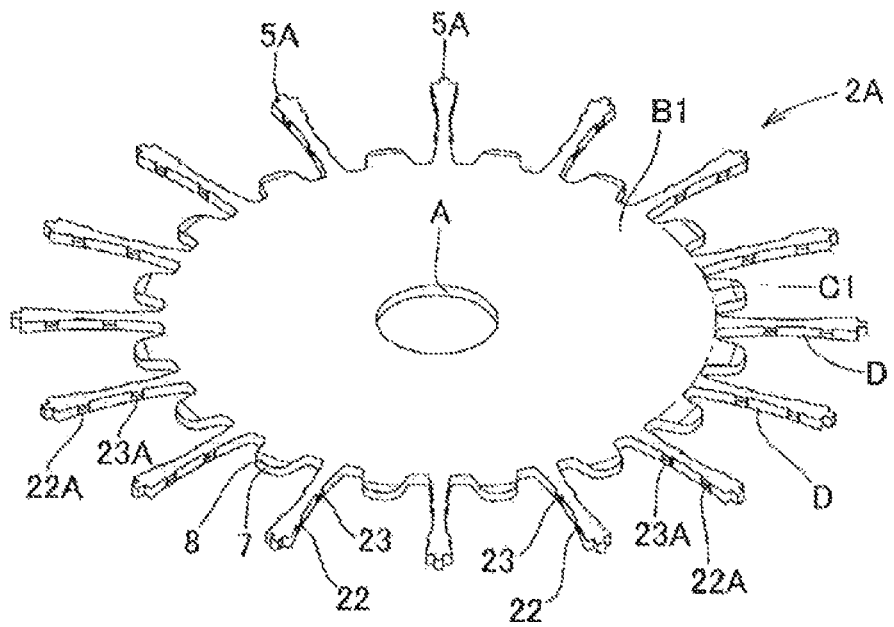
FIG. 63 is a perspective view of the base body blank processed at a rough surface pressing step and an inclined surface (small diameter-side end surface receiver surface) forming step.
Figure 64:
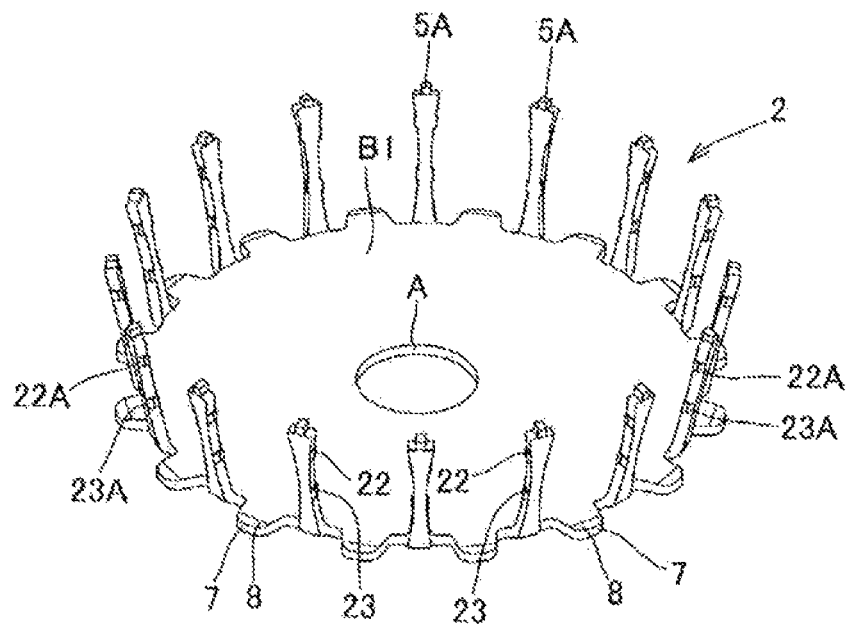
FIG. 64 is a perspective view of the base body blank processed at a folding step.
Figure 65:
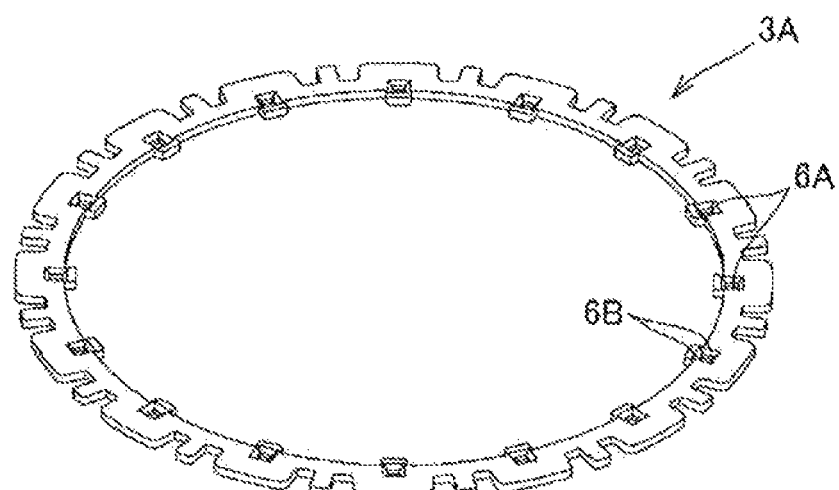
FIG. 65 is a perspective view of a connection body blank processed at a connection body blank cutting step.
Figure 66:
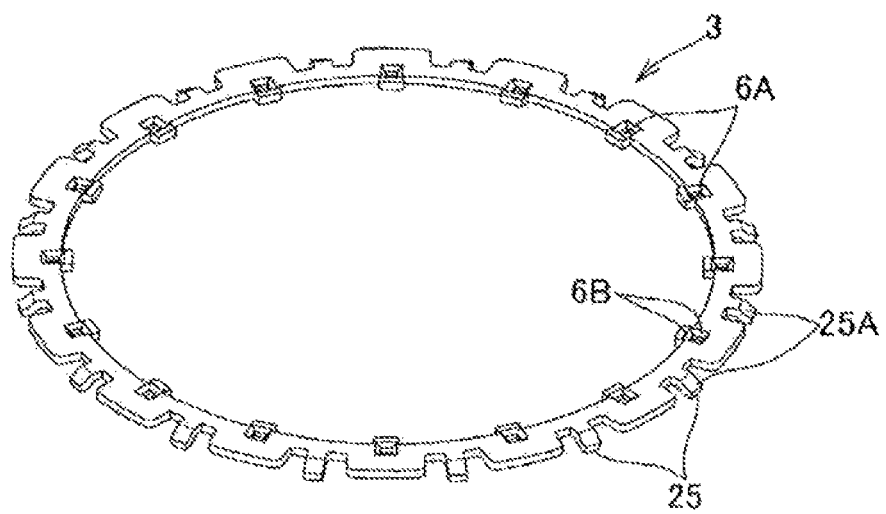
FIG. 66 is a perspective view of the connection body blank processed at a large diameter-side end surface receiver forming step.

Specifically, a base body blank cutting step shown in the perspective view of FIG. 62 is the same as that in the sixth embodiment shown in FIG. 51, a rough surface pressing step and an inclined surface (small diameter-side end surface receiver surfaces) forming step shown in the perspective view of FIG. 63 are the same as those in the sixth embodiment shown in FIG. 52, a folding step shown in the perspective view of FIG. 64 is the same as that in the sixth embodiment shown in FIG. 53, and a connection body blank cutting step shown in the perspective view of FIG. 65 is the same as that in the sixth embodiment shown in FIG. 54.

At the large diameter-side end surface receiver forming step, press surfaces 25A, 25A, . . . (refer to FIG. 66) as opposite surfaces of the outer diameter-side end portions opposed to the large diameter-side end surfaces T1, T1, . . . of the spherical rollers RB, RB . . . of the connection body blank 3A shown in FIG. 65 are pressed and pawl-like projection pieces are folded to form projections 25, 25, . . . as large diameter-side end surface receivers shown in FIG. 61(b), thereby obtaining the connection body 3 shown in the perspective view of FIG. 66.

Figure 67:
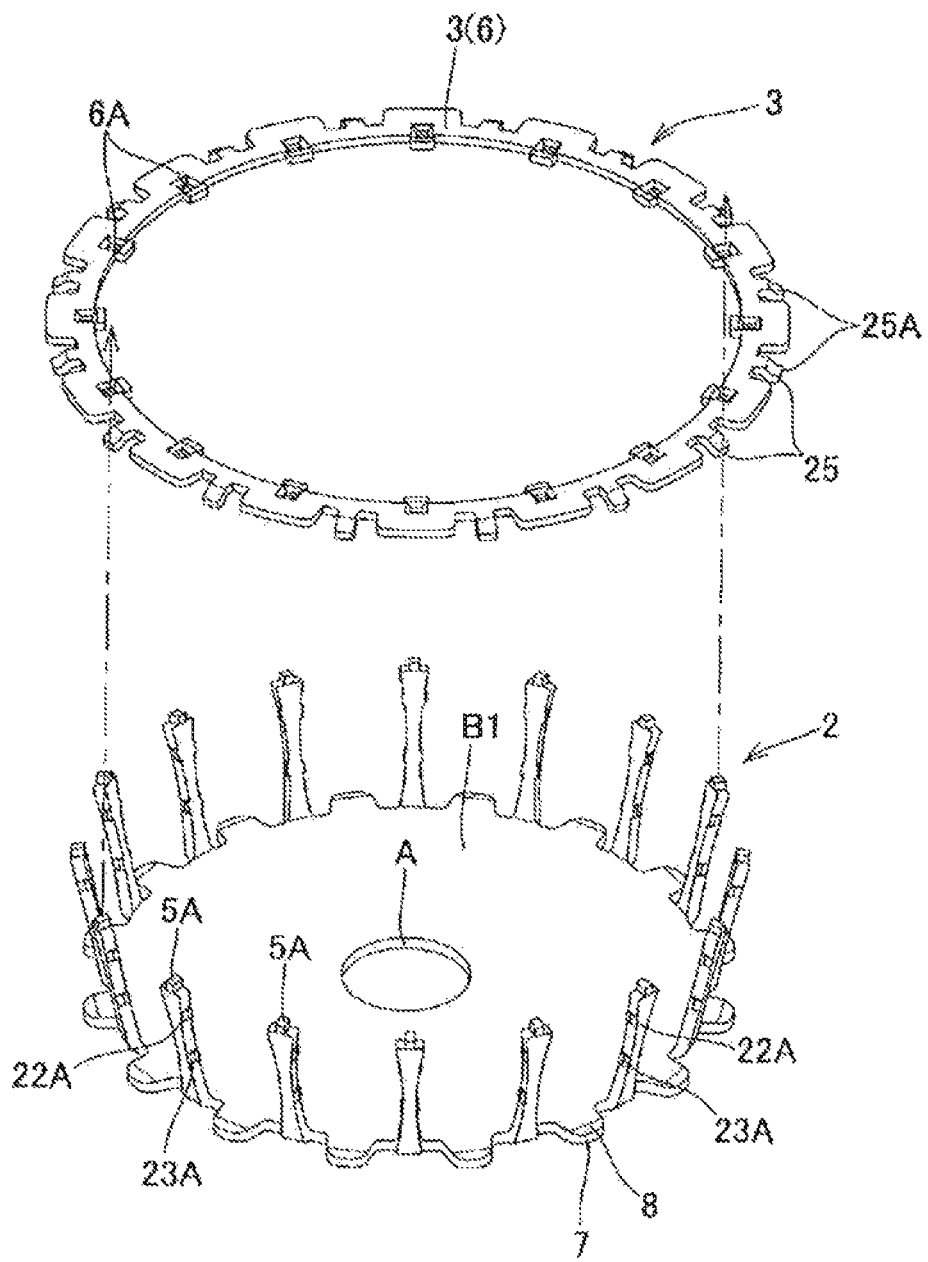
FIG. 67 is a perspective diagram showing a joining and fixing step.
Figure 68:
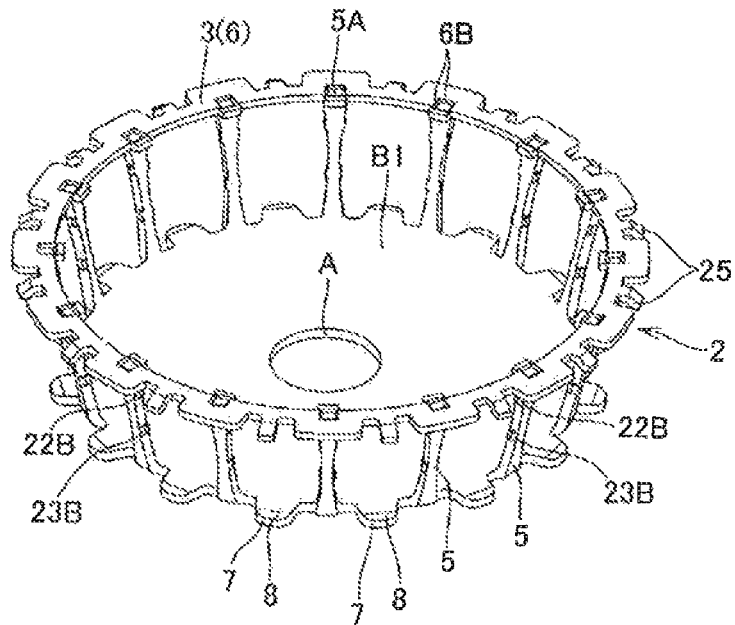
FIG. 68 is a perspective view of the two bodies processed at a finished surface pressing step.
Figure 69:
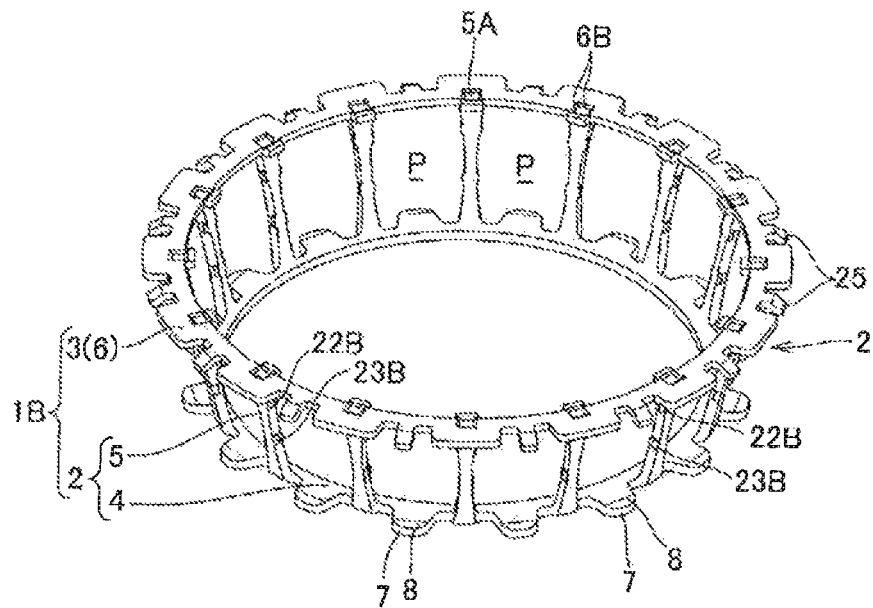
FIG. 69 is a perspective view of the two bodies processed at an inner-diameter removing step.

In addition, a joining and fixing step shown in the perspective diagram of FIG. 67 is the same as that in the sixth embodiment shown in FIG. 56, a finished surface pressing step shown in the perspective view of FIG. 68 is the same as that in the sixth embodiment shown in FIG. 57, and an inner-diameter removing step shown in the perspective view of FIG. 69 is the same as that in the sixth embodiment shown in FIG. 58.

When the rotation center axes G of the spherical rollers RB are located at the outer-diameter side across the column parts 5 as in the seventh embodiment, it is necessary to set the distance between the inner wall surfaces of the square holes 6A of the large-diameter ring part 6 and the inner diameter-side end portions of the large-diameter ring part 6 to be 1 to 1.5 times larger than the plate thickness of the large-diameter ring part 6 for assurance of strength.

Thus, if the inner-diameter surface of the large-diameter ring part 6 is made uniform in accordance with the square holes 6A, 6A, . . . , the inner-diameter surface of the large-diameter ring part 6 interferes with the large diameter-side end surfaces T1 of the spherical rollers RB, and thus it is necessary to avoid that interference.

Figure 61:
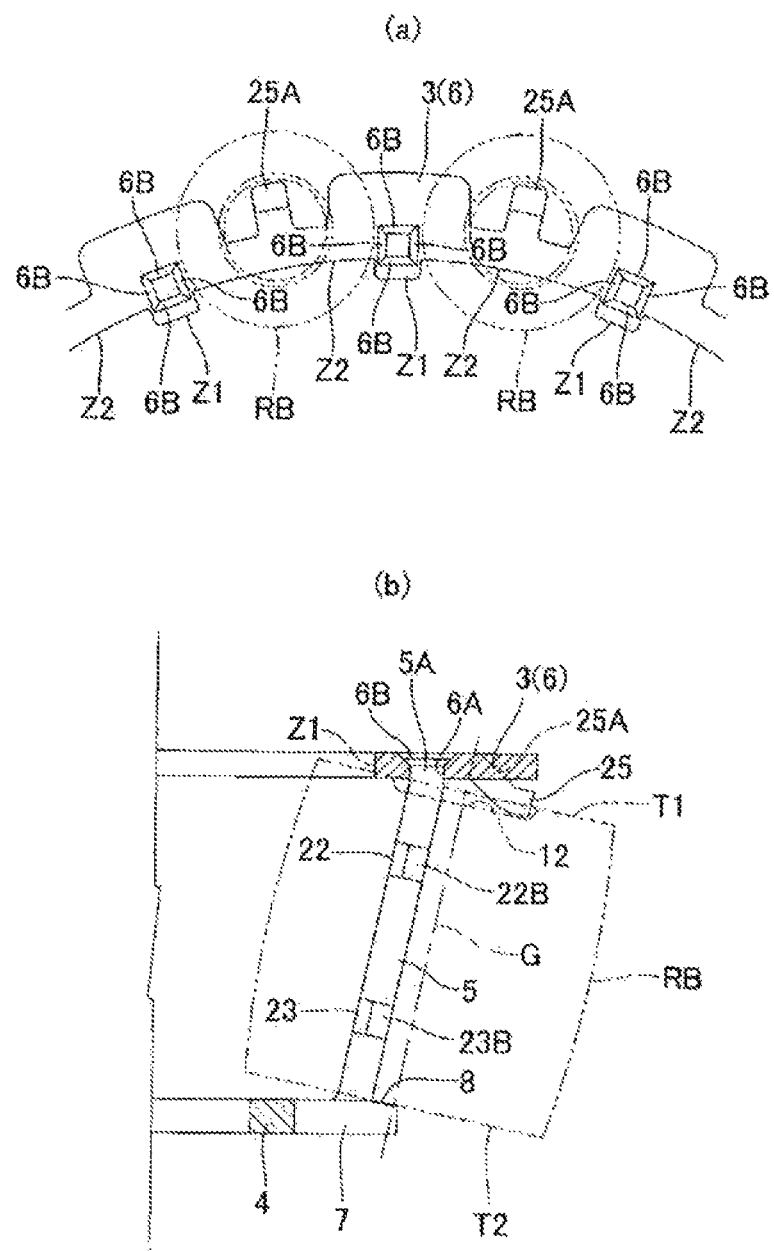
FIG. 61(a) is an enlarged plane view of major components of a connection body (large-diameter ring part)
FIG. 61(b) is an enlarged longitudinal sectional front view of major components of the roller bearing cage.

Therefore, as shown in the enlarged plane view of major components of FIG. 61(*a*), escape portions Z2, Z2, . . . that are larger in inner diameter than inner diameter-side end surfaces Z1, Z1, . . . corresponding to the square holes 6A, 6A, . . . (refer to FIG. 61(*b*)) positioned inside of the chamfered portions 6B, 6B, . . . are provided between the adjacent square holes 6A, 6A at the inner-diameter side.

In the spherical roller bearing cage 1B in the seventh embodiment of the present invention, the large-diameter ring part 6 (connection body 3) is fabricated separately from the base body 2, and thus it is easy to form the escape portions Z2, Z2, . . . at formation of the connection body blank 3A shown in FIG. 65 through laser cutting or the like.

According to the configuration of the spherical roller bearing cage 1B in the seventh embodiment, when the rotation center axes G of the spherical rollers RB are located at the outer-diameter side across the column parts 5 as in conventional outward flange-type cages, in the case of a supersized spherical roller cage in particular, it is not necessary to form a thinner large diameter-side outward flange (equivalent to the large-diameter ring part 6) by pressing by a press machine with a high pressing force or form a large diameter-side outward flange (equivalent to the large-diameter ring part 6) by a press machine with extra-large press capacity, unlike in the case of the conventional outward flange-type cages. Accordingly, it is possible to solve the manufacturing and facility problems with the conventional outward flange-type cages.

According to the spherical roller bearing cages 1B in the sixth and seventh embodiments as described above, the base body 2 and the connection body 3 as separate members are assembled into a cage, the materials for and the shapes of the base body 2 and the connection body 3 can be easily changed, which facilitates acquisition of desired strength and rigidity and provides a sufficient load capacity to even the supersized spherical roller cage.

In addition, the base body 2 and the connection body 3 are manufactured based on their respective blanks 2A, 3A obtained by cutting and processing steel plates through laser-cutting or the like, which eliminates the need to perform a large number of pressing processes unlike in the case of conventional integrated outward flange-type cages. This makes it possible to reduce metal mold costs and manufacturing costs.

Further, the base body 2 and the connection body 3 are manufactured as separate bodies, which eliminate the need for a metal mold for punching pocket holes P, P, . . . at manufacture of the supersized spherical cage and facilitates assurance of shape accuracy.

REFERENCE SIGNS LIST

A Central hole
B1 Disc-shaped member
B2 Annular ring-shaped member
C1 Outer peripheral portion
C2 Inner peripheral portion
D Portion to be column part
E Base-end portion side
F Free-end portion side
G Rotation center axis
G1 Rotation axis center
G2 Axis center of column part
H Protrusion height
I Swage margin
J Thickness of swaged portion (flange portion)
K Radial length of press-fit portion
L Radial length of introduction portion
M Radial length of free-fit portion
N Chamfered portion
O Thickness of large-diameter ring part
P Pocket hole
Q Thrust force
RA Conical roller (rolling element)
RB Spherical roller (rolling element)
S Inner ring
T Torque
T1 Large diameter-side end surface
T2 Small diameter-side end surface
t Plate thickness
U1 Height of protrusion piece
U2 Protrusion length of protrusion piece
V Clearance between protrusion pieces
W1, W2 Circumferential width dimension
X Edge portion
Y Corner portion
Z1 Inner diameter-side end surface corresponding to square hole
Z2 Escape portion
1A Conical roller bearing cage
1B Spherical roller bearing cage
2 Base body
2A Base body blank
3 Connection body
3A Connection body blank
4 Small-diameter ring part
4A Square hole
4B Round hole
5 Column part
6A Square columnar convex
6 Large-diameter ring part
6A Square hole
6B Chamfered portion
7 Tongue piece
8 Inclined surface
9A, 9B Concave
10A, 10B Inclined surface
11 Retaining projection
11A Press surface
12 Retaining concave
13 Washer
14 Nut
15 Swaging machine
16 Head part
17 Swing swaging jig
18 Table
19 Inclination stage
19A Positioning step portion
20 Protrusion piece
20A Upper surface
20B Lower surface
21 Receiver
22, 23 Convex
22A, 23A Inclined surface after rough surface pressing step
22B, 23B Inclined surface after finished surface pressing step
24, 26 Projection (large diameter-side end surface receiver)
24A, 25A Press surface

The invention claimed is:

1. A roller bearing cage configured such that a pair of ring parts axially separated from each other is connected by a plurality of column parts sliding on outer peripheral surfaces of conical rollers or spherical rollers as rolling elements, and a plurality of pocket holes is evenly formed in a peripheral wall portion in a circumferential direction to store and hold the rolling elements,
wherein a base body including one of the ring parts and the column parts with square columnar convexes at leading ends thereof and a connection body including the other ring part with square holes for fitting with the square columnar convexes of the column parts are set as separate members,
wherein these members are manufactured based on blanks obtained by cutting and processing steel plates,
wherein the column parts of the base body are formed by folding along an outer peripheral portion of the ring part of the base body or are formed by folding along an inner peripheral portion of the ring part of the base body,
wherein when the column parts of the base body are formed by folding along the outer peripheral portion of the ring part of the base body, tongue pieces are formed so as to be protruded from the outer peripheral portion of the ring part of the base body to between the column parts, and inclined surfaces to be in surface contact with end surfaces of the rolling elements are formed in the tongue pieces,
wherein when the column parts of the base body are formed by folding along the inner peripheral portion of the ring part of the base body, tongue pieces are formed so as to be protruded from the inner peripheral portion of the ring part of the base body to between the column parts, and inclined surfaces to be in surface contact with the end surfaces of the rolling elements are formed in the tongue pieces, and
wherein the base body and the connection body are joined and fixed together while the square columnar convexes of the base body are fitted into the square holes of the connection body.

2. The roller bearing cage according to claim 1, wherein the inclined surfaces are formed by a press process after the base body and the connection body are integrated.

3. The roller bearing cage according to claim 1, wherein the ring part of the connection body is formed in a disc-spring shape so as to be orthogonal to the column parts of the base body.

4. The roller bearing cage according to claim 1, wherein press-fit portions to be press-fitted into the square holes of the connection body are formed at the base end-side portions on both circumferential side surfaces of the square columnar convexes of the base body.

5. The roller bearing cage according to claim 1, wherein protrusion pieces protruded from circumferential front-back surfaces are formed at the
base-end sides of the square columnar convexes in the column parts of the base body, and
a clearance is formed between a pair of protrusion pieces protruded from one to the other of the adjacent column parts.

6. The roller bearing cage according to claim 5, wherein circumferential width dimension of the square columnar convexes is set equal to or larger than circumferential width dimension of the column parts at the base-end sides across the protrusion pieces.

7. The roller bearing cage according to claim 1, wherein the rolling elements are spherical rollers, and
retaining projections to be inserted into retaining concaves in end surfaces of the spherical rollers are formed at the ring part of the base body or the ring part of the connection body.

8. The roller bearing cage according to claim 1, wherein the base body and the connection body are joined and fixed together by inserting the square columnar convexes of the base body into the square holes of the connection body, and protruding leading ends of the square columnar convexes from the surface of the connection body, and then performing a swing swaging process on the leading ends of the square columnar convexes for plastic deformation to increase the square columnar convexes in diameter, and
swaged portions are evenly formed in the circumferential direction, which are protruded from the surface of the connection body and are approximately rectangular in shape as seen from the axial direction.

9. A roller bearing cage configured such that a pair of a small-diameter ring part and a large-diameter ring part axially separated from each other is connected by a plurality of column parts sliding on outer peripheral surfaces of spherical rollers as rolling elements, and a plurality of pocket holes is evenly formed in a circumferential direction to store and hold the rolling elements in a bowl-shaped or inverted cone-shaped peripheral wall portion while the small-diameter ring part is on the lower side and an axial direction is vertically located,
wherein a base body including the small-diameter ring part and the column parts with square columnar convexes at leading ends thereof and a connection body including the large-diameter ring part with square holes for fitting with the square columnar convexes of the column parts are set as separate members,
wherein these members are manufactured based on blanks obtained by cutting and processing steel plates, and
wherein the large-diameter ring part is provided with large diameter-side end surface receivers that slide on large diameter-side end surfaces of the rolling elements to guide the rolling elements.

10. The roller bearing cage according to claim 9, wherein inclined surfaces to be in surface contact with the large diameter-side end surfaces of the rolling elements are formed in the large diameter-side end surface receivers.

11. The roller bearing cage according to claim 9, wherein tongue pieces are fanned so as to be protruded from the outer peripheral portion of the small-diameter ring part of the base body to between the column parts, and
inclined surfaces to be in surface contact with small diameter-side end surfaces of the rolling elements are formed in the tongue pieces.

12. The roller bearing cage according to claim 9, wherein rotation center axes of the spherical rollers are located at the inner-diameter side across the column parts, and
the large diameter-side end surface receivers are formed at an inner diameter-side end portion of the large-diameter ring part or at the inner diameter-side end portion and outer diameter-side end portion of the large-diameter ring part.

13. The roller bearing cage according to claim 9, wherein the rotation center axes of the spherical rollers are located at the outer-diameter side across the column parts, and
the large diameter-side end surface receivers are formed at the outer diameter-side end portion of the large-diameter ring part.

14. The roller bearing cage according to claim 9, wherein the base body and the connection body are joined and fixed together by inserting the square columnar convexes of the base body into the square holes of the connection body, and protruding leading ends of the square columnar convexes from the surface of the connection body, and then performing a swing swaging process on the leading ends of the square columnar convexes for plastic deformation to increase the square columnar convexes in diameter, and swaged portions are evenly formed in the circumferential direction, which are protruded from the surface of the connection body and are approximately rectangular in shape as seen from the axial direction.

* * * * *